US010116159B1

(12) United States Patent
Li et al.

(10) Patent No.: US 10,116,159 B1
(45) Date of Patent: Oct. 30, 2018

(54) FAMILY OF ISOLATED BATTERY ENERGY STORAGE SYSTEM (BESS) WITH MULTIPLE FUNCTIONS FOR DC GRID APPLICATION

(71) Applicant: The Florida State University Research Foundation, Inc., Tallahassee, FL (US)

(72) Inventors: Hui Li, Tallahassee, FL (US); Rui Li, Tallahassee, FL (US); Yanjun Shi, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 32 days.

(21) Appl. No.: 15/171,480

(22) Filed: Jun. 2, 2016

Related U.S. Application Data

(60) Provisional application No. 62/170,016, filed on Jun. 2, 2015.

(51) Int. Cl.
*H02J 1/00* (2006.01)
*H02J 7/00* (2006.01)

(52) U.S. Cl.
CPC .................. *H02J 7/0068* (2013.01)

(58) Field of Classification Search
CPC .................................................. H02J 7/0068
See application file for complete search history.

(56) References Cited

U.S. PATENT DOCUMENTS

| 5,642,275 | A | 6/1997 | Peng et al. |
| 8,760,122 | B2 | 6/2014 | Demetriades |
| 2012/0153729 | A1 | 6/2012 | Song et al. |
| 2012/0188803 | A1* | 7/2012 | Trainer ............... H02M 1/4233 363/37 |
| 2015/0171726 | A1* | 6/2015 | Singh Riar ........... H02M 7/487 363/65 |
| 2015/0180350 | A1* | 6/2015 | Huang .................. H02J 7/0068 307/66 |
| 2017/0085193 | A1* | 3/2017 | Akagi ..................... H02M 1/42 |

FOREIGN PATENT DOCUMENTS

| WO | 2013075735 A1 | 5/2013 |
| WO | 2014017902 A2 | 1/2014 |

* cited by examiner

*Primary Examiner* — Jared Fureman
*Assistant Examiner* — Duc M Pham
(74) *Attorney, Agent, or Firm* — Molly L. Sauter; Smith & Hopen, P.A.

(57) ABSTRACT

This invention presents a family of isolated BESS topologies with multiple functions, which are suitable for high voltage and high power DC grid application. A battery energy storage system (BESS) for direct current (DC) grid applications is provided, including an alternating current (AC) transformer having a primary side and a secondary side, at least one primary side arm coupled to the primary side of the AC transformer, the at least one primary side arm comprising a plurality of cascade connected voltage source converter sub-modules and a plurality of energy storage battery units and at least one secondary side arm coupled between the secondary side of the AC transformer and a DC grid voltage bus, the at least one secondary side arm comprising a plurality of cascade connected voltage source converter sub-modules. Modulation and control strategies for the various topologies are also provided.

20 Claims, 88 Drawing Sheets

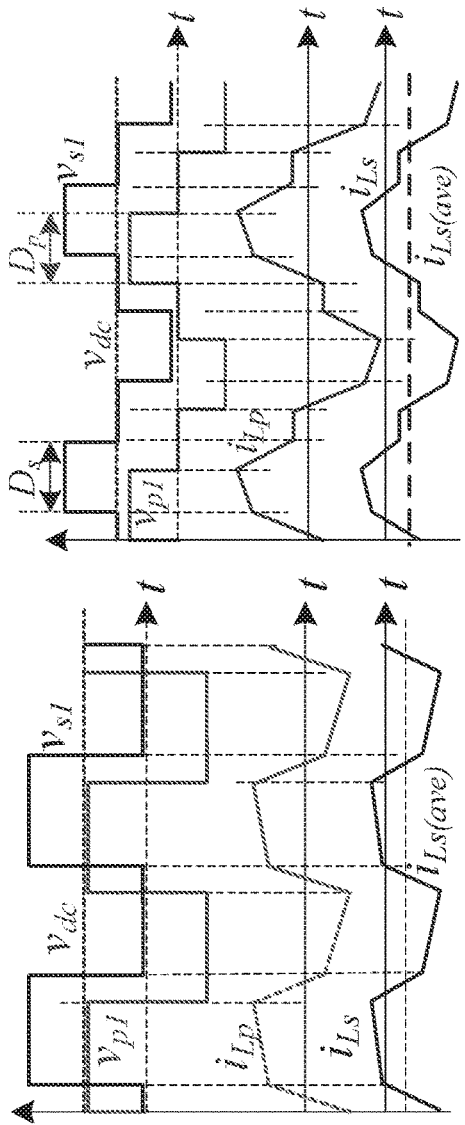
Fig. 3A
Fig. 3B
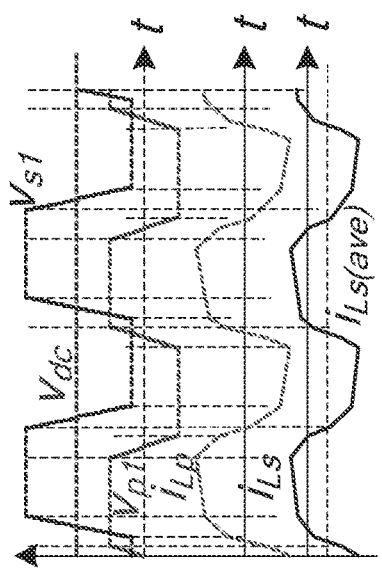
Fig. 3C
Fig. 3D

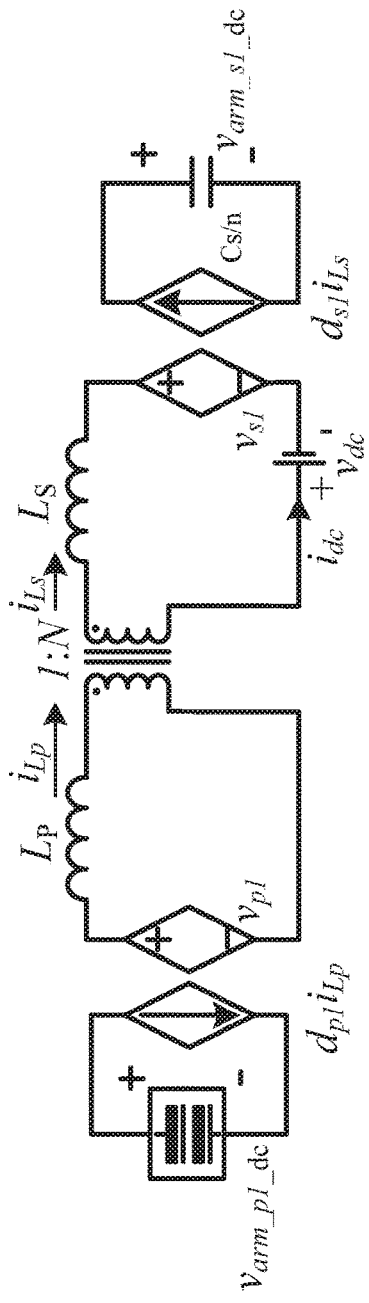
Fig. 4
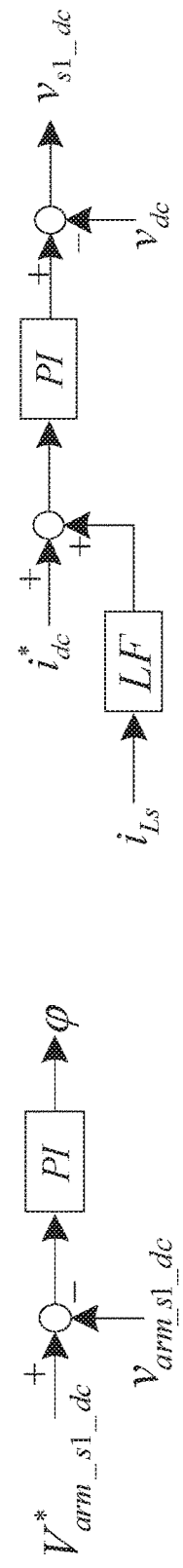
Fig. 5B
Fig. 5A

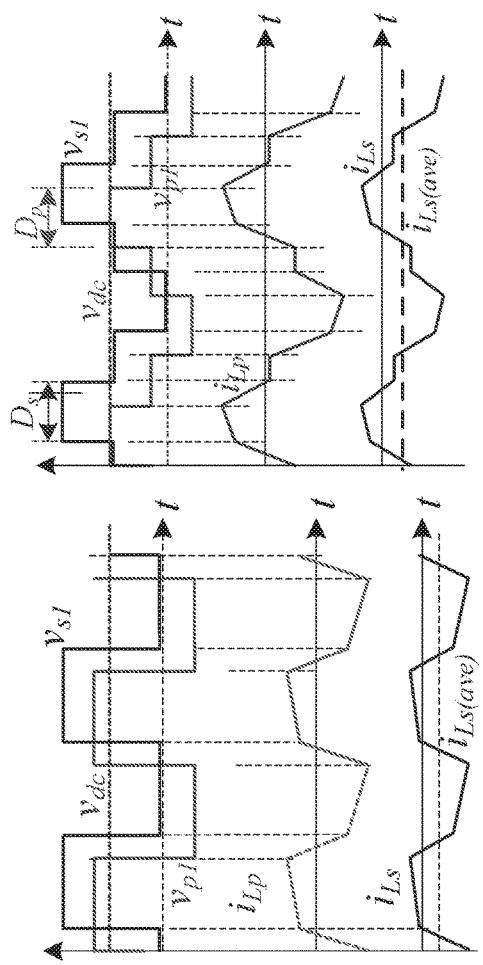
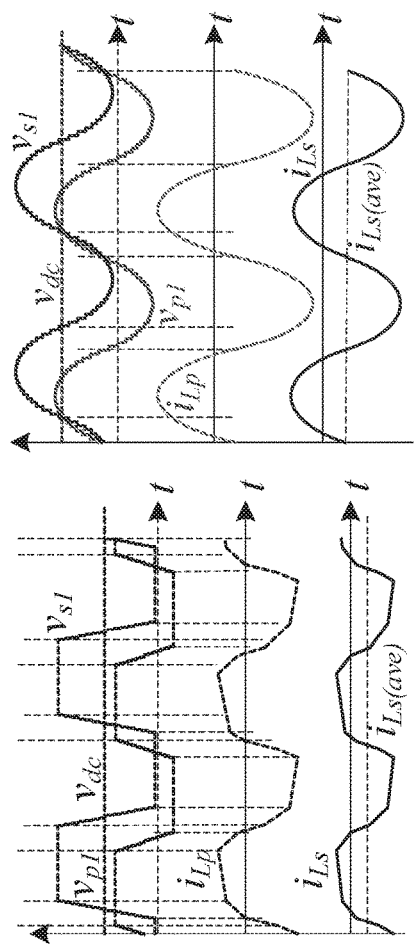
Fig. 8A
Fig. 8B
Fig. 8C
Fig. 8D

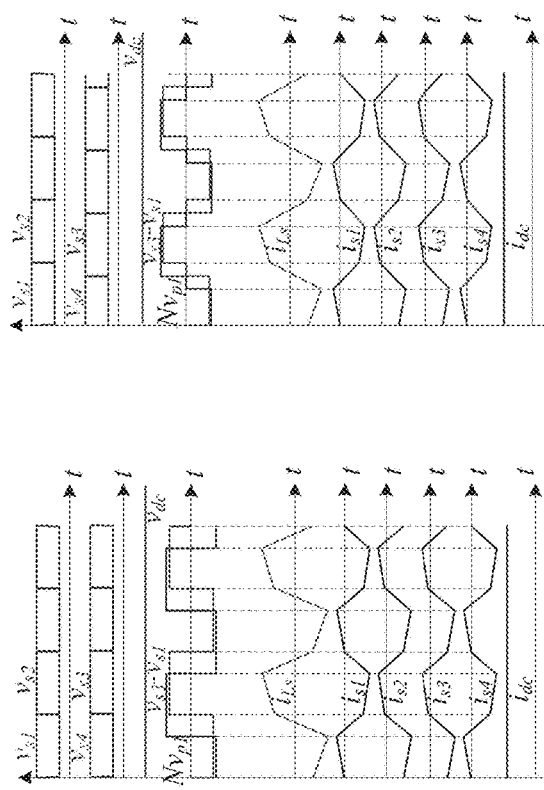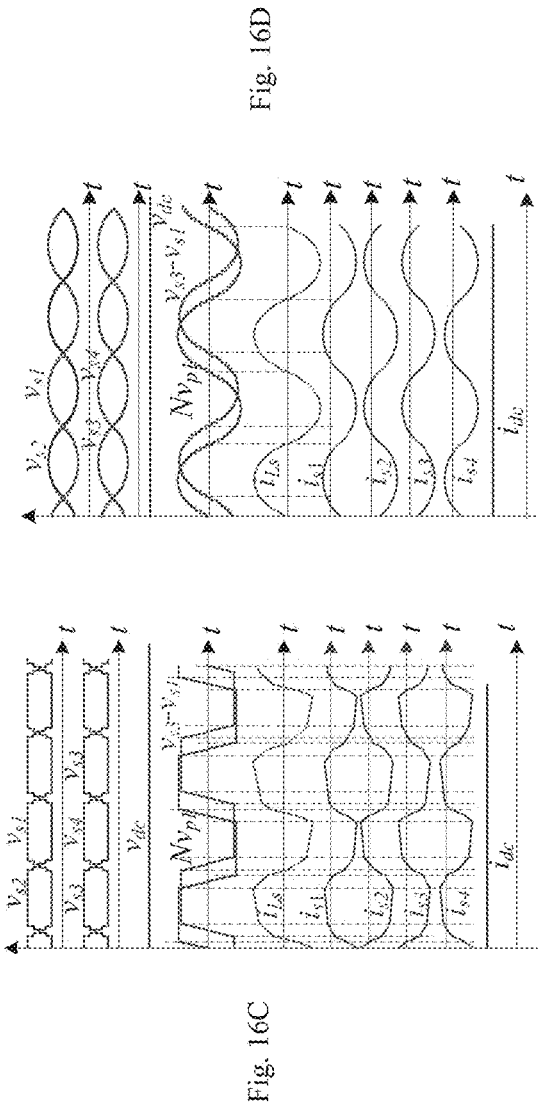
Fig. 16A Fig. 16B Fig. 16C Fig. 16D

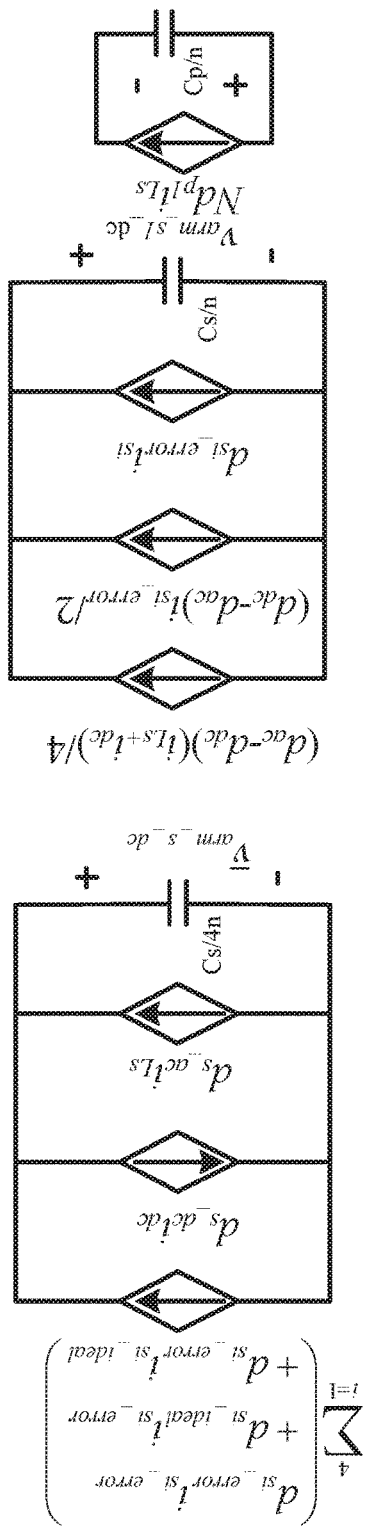
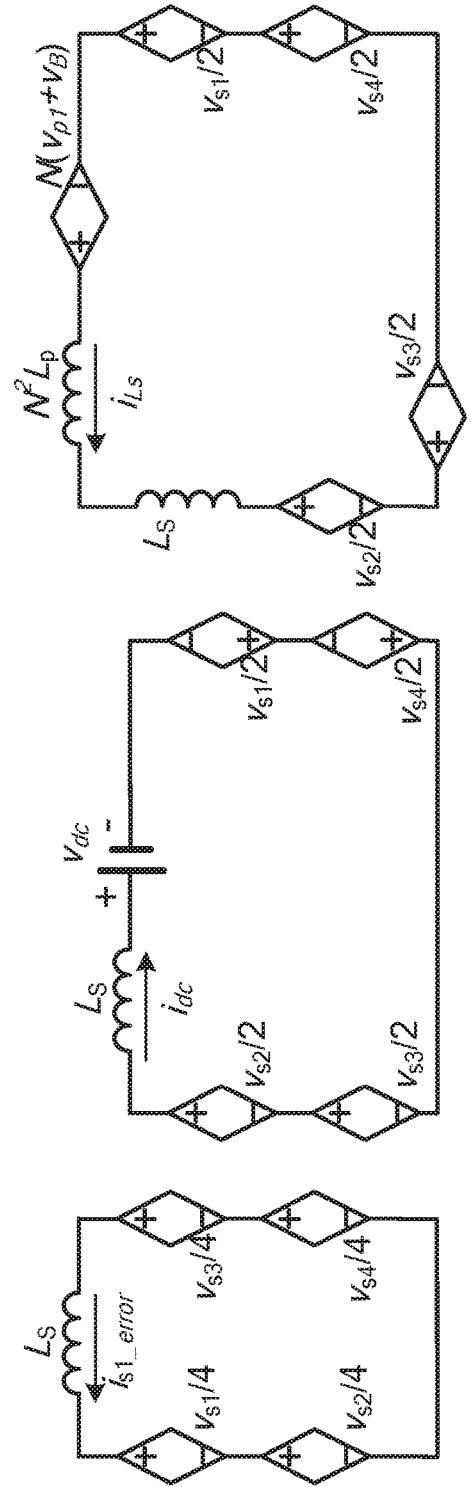
Fig. 21A
Fig. 21B

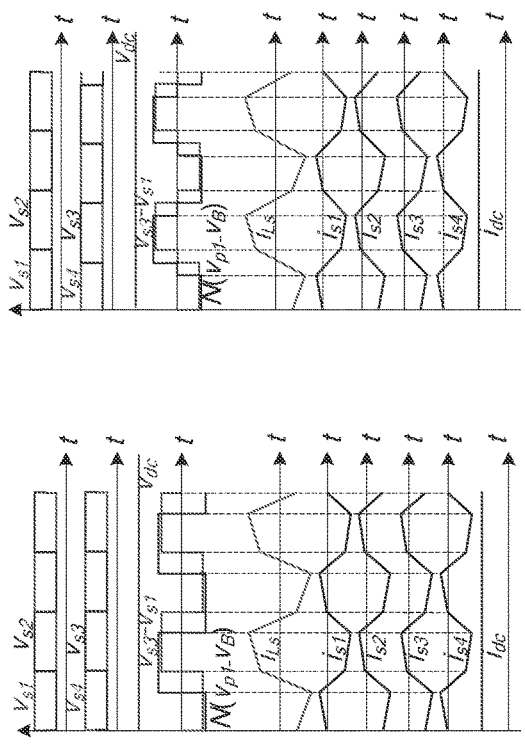
Fig. 22A
Fig. 22B
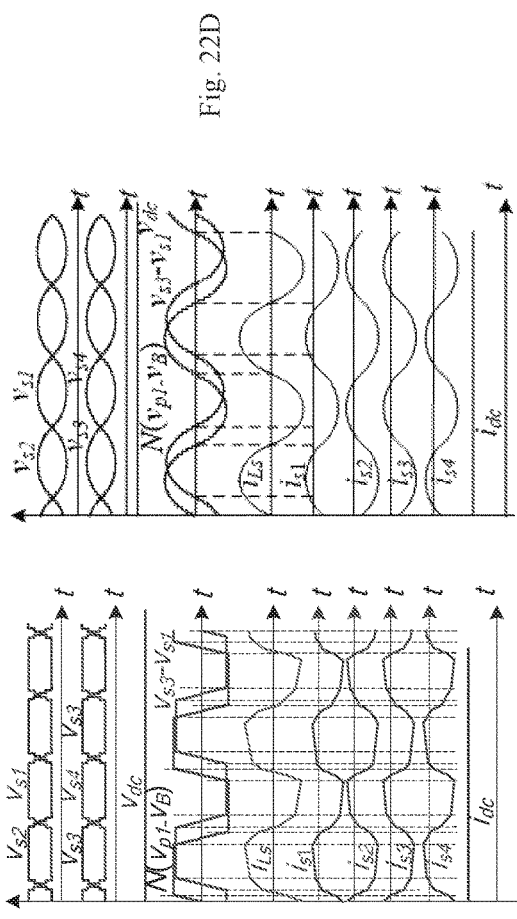
Fig. 22C
Fig. 22D

FAMILY OF ISOLATED BATTERY ENERGY STORAGE SYSTEM (BESS) WITH MULTIPLE FUNCTIONS FOR DC GRID APPLICATION

CROSS-REFERENCE TO RELATED APPLICATIONS

This application claims priority to U.S. Provisional Patent Application 62/170,016, filed Jun. 2, 2015 and entitled "A Family Of Isolated Battery Energy Storage System (Bess) With Multiple Functions For Dc Grid Application", which is herein incorporated by reference in its entirety.

BACKGROUND OF THE INVENTION

A Battery Energy Storage System (BESS) is an indispensable part of the Direct Current (DC) grid. For example, in the case of a High-Voltage Direct Current (HVDC) off shore wind farm, the wind energy penetrations are very high and the wind power fluctuations may affect the stability of the system. In this situation, a BESS can be incorporated into the system to smooth the intermittency and the short term wind power fluctuations. In Medium-Voltage Direct Current (MVDC) systems, normally there are a wide variety of loads which include high power propulsion loads and pulsed loads. These loads are connected to the MVDC bus through power converters, which are known to introduce a great deal of pulsed current and ripple current into the MVDC system. These two kinds of current exhibit a wide frequency range, which may lead to voltage oscillations on the MVDC bus. A BESS incorporating active filter functions is a good choice to overcome this power-quality issue. As low voltage fault and grounding fault issues commonly exist in the DC grid, low voltage fault ride through functions and current limiting functions are also needed in a BESS for DC grid applications.

As illustrated with reference to FIG. 1, a traditional BESS is mainly focused on the Alternating Grid (AC) grid application. In the traditional system, an energy storage battery bank is connected to the AC grid through a bidirectional DC-AC converter. As a result of the low battery cell voltage (e.g., LiFePO battery's cell voltage is 3.2V), in order to build a high voltage battery bank, hundreds of battery cells need to be connected in series in the battery bank. In order to ensure safe operation of this battery bank system, the state of charge (SOC) of each battery cell in the same series battery branch must be balanced with each other, utilizing a battery management system (BMS). The more battery cells that are connected in a series battery branch, the higher the complexity, the higher the failure rate and greater the cost of the BMS. As a consequence, the overall energy storage battery bank voltage is typically lower than 1000V. In a medium or high voltage rated AC grid utilization, the line frequency transformer works as an interface between the BESS and the AC grid. Unfortunately, line frequency transformers are not suitable for DC grid applications.

While the Battery Energy Storage System (BESS) is an indispensable component of the DC grid, the power rating and voltage rating of battery energy storage converters currently known in the art are not suitable for Medium Voltage Direct Current (MVDC) or High Voltage Direct Current (HVDC) applications.

Accordingly, what is needed in the art is a Battery Energy Storage System (BESS) that is compatible with Medium Voltage Direct Current (MVDC) or High Voltage Direct Current (HVDC) applications.

SUMMARY OF INVENTION

This invention presents a family of isolated BESS topologies with multiple functions, which are suitable for high voltage and high power DC grid application. A battery energy storage system (BESS) for direct current (DC) grid applications is provided, including an alternating current (AC) transformer having a primary side and a secondary side, at least one primary side arm coupled to the primary side of the AC transformer, the at least one primary side arm comprising a plurality of cascade connected voltage source converter sub-modules and a plurality of energy storage battery units and at least one secondary side arm coupled between the secondary side of the AC transformer and a DC grid voltage bus, the at least one secondary side arm comprising a plurality of cascade connected voltage source converter sub-modules. Modulation and control strategies for the various topologies are also provided.

In one embodiment, a battery energy storage system (BESS) for direct current (DC) grid applications in provided, including an alternating current (AC) transformer having a primary side and a secondary side, at least one primary side arm coupled to the primary side of the AC transformer, the at least one primary side arm comprising a plurality of cascade connected voltage source converter sub-modules and a plurality of energy storage battery units and at least one secondary side arm coupled between the secondary side of the AC transformer and a DC grid voltage bus, the at least one secondary side arm comprising a plurality of cascade connected voltage source converter sub-modules.

In an additional embodiment, a battery energy storage system (BESS) for direct current (DC) grid applications is provided, including an alternating current (AC) transformer having a primary side and a secondary side, at least one primary side arm coupled to the primary side of the AC transformer, the at least one primary side arm comprising a plurality of cascade connected voltage source converter sub-modules and a plurality of energy storage battery units, a primary side filter inductor connected to the primary side of the AC transformer, a secondary side filter inductor connected to the secondary side of the AC transformer and at least one secondary side arm coupled between the secondary side of the AC transformer and a DC grid voltage bus, the at least one secondary side arm comprising a plurality of cascade connected voltage source converter sub-modules.

In another embodiment, a method for battery energy storage in a direct current (DC) grid application is provided, including coupling at least one primary side arm to a primary side of an AC transformer, the at least one primary side arm comprising a plurality of cascade connected voltage source converter sub-modules and a plurality of energy storage battery units, coupling at least one secondary side arm between the secondary side of the AC transformer and a DC grid voltage bus, the at least one secondary side arm comprising a plurality of cascade connected voltage source converter sub-modules and providing a DC voltage to the DC grid voltage bus from the at least one secondary side arm.

As such, the present invention provides a Battery Energy Storage System (BESS) that is compatible with Medium Voltage Direct Current (MVDC) or High Voltage Direct Current (HVDC) applications.

BRIEF DESCRIPTION OF THE DRAWINGS

For a fuller understanding of the invention, reference should be made to the following detailed description, taken in connection with the accompanying drawings, in which:

FIG. 3A is an illustration of a square wave modulation scheme of the 1st BESS topology, in accordance with an embodiment of the present invention.

FIG. 3B is an illustration of a rectangular wave modulation scheme of the 1st BESS topology, in accordance with an embodiment of the present invention FIG. 3C is an illustration of a quasi square wave modulation scheme of the 1st BESS topology, in accordance with an embodiment of the present invention FIG. 3D is an illustration of a sinusoidal wave modulation scheme of the 1st BESS topology, in accordance with an embodiment of the present invention FIG. 4 is an illustration of the average model for the 1st BESS topology, in accordance with an embodiment of the present invention.

FIG. 5A is an illustration of a phase shift angle generation for the 1st BESS topology, in accordance with an embodiment of the present invention.

FIG. 5B is an illustration of a transformer secondary side arm DC voltage modulation signal generation for the 1st BESS topology, in accordance with an embodiment of the present invention.

FIG. 8A is an illustration of a square wave modulation scheme of the 2nd BESS topology, in accordance with an embodiment of the present invention.

FIG. 8B is an illustration of a rectangular wave modulation scheme of the 2nd BESS topology, in accordance with an embodiment of the present invention FIG. 8C is an illustration of a quasi square wave modulation scheme of the 2nd BESS topology, in accordance with an embodiment of the present invention FIG. 8D is an illustration of a sinusoidal wave modulation scheme of the 2nd BESS topology, in accordance with an embodiment of the present invention

FIG. 16A is an illustration of a square wave modulation scheme of the 3rd BESS topology, in accordance with an embodiment of the present invention.

FIG. 16B is an illustration of a rectangular wave modulation scheme of the 3rd BESS topology, in accordance with an embodiment of the present invention FIG. 16C is an illustration of a quasi square wave modulation scheme of the 3rd BESS topology, in accordance with an embodiment of the present invention FIG. 16D is an illustration of a sinusoidal wave modulation scheme of the 3rd BESS topology, in accordance with an embodiment of the present invention

FIG. 21A is an illustration of the capacitor voltage simplified average model for the 4th BESS topology, in accordance with an embodiment of the present invention.

FIG. 21B is an illustration of the inductor current simplified average model for the 4th BESS topology, in accordance with an embodiment of the present invention.

FIG. 22A is an illustration of a square wave modulation scheme of the 4th BESS topology, in accordance with an embodiment of the present invention.

FIG. 22B is an illustration of a rectangular wave modulation scheme of the 4th BESS topology, in accordance with an embodiment of the present invention FIG. 22C is an illustration of a quasi square wave modulation scheme of the 4th BESS topology, in accordance with an embodiment of the present invention FIG. 22D is an illustration of a sinusoidal wave modulation scheme of the 4th BESS topology, in accordance with an embodiment of the present invention

DETAILED DESCRIPTION OF THE INVENTION

The proposed invention provides a family of BESS topologies with multiple functions for medium or high voltage rating DC grid applications. The present invention provides an energy storage function, active filter function, low voltage fault ride through function and current limiting function. As a result of the modular design of the present invention, low voltage rated energy storage battery units and low voltage rated power devices can be used in the high voltage and high power application of the present invention.

In the present invention, energy storage battery units can not only be integrated with each of the individual sub-modules in each of the energy storage arms, but can also be concentrated and arranged in the primary side of the transformer. With the energy storage battery bank topology in the primary side of the transformer, low voltage rated energy storage battery banks are enough to realize functions with low system loss and low system cost. Hybrid energy storage systems, integrating battery and ultra-capacitors, can also be realized in the proposed topologies. Because there are multiple energy storage cells in each primary arm, various modulation methods are possible in the proposed BESS, including square wave modulation, rectangular wave modulation, quasi square wave modulation and sinusoidal wave modulation.

Figure 1:
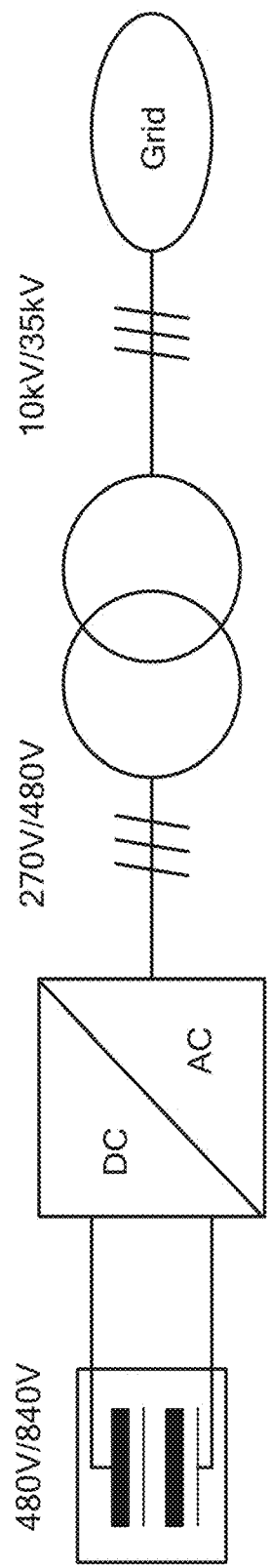
FIG. 1 is block diagram illustrating a prior art traditional BESS topology in an AC grid application.
Figure 2:
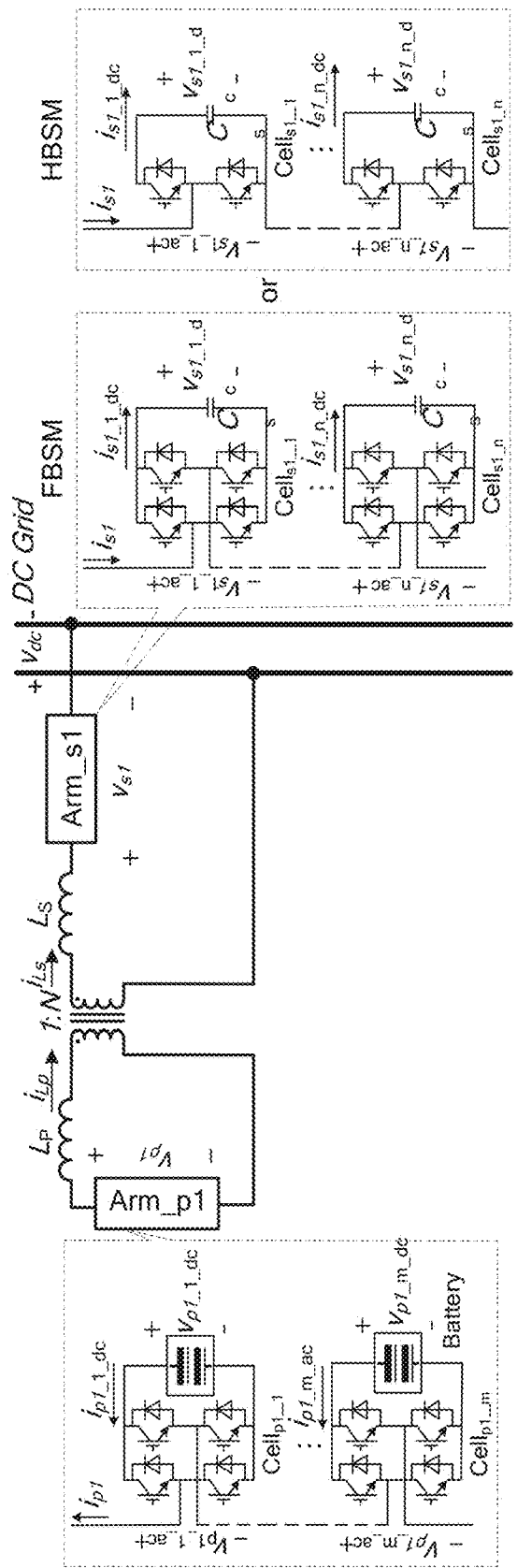
FIG. 2 is a schematic illustration of a first ($1^{st}$) topology of a BESS, in accordance with an embodiment of the present invention.

The proposed invention provides a family of battery energy storage system topologies with multiple functions for medium or high voltage rated DC grid applications, the first topology of which is shown in FIG. 2. In the BESS 200 of FIG. 2, at least one primary side arm (Arm_p1) 210 with corresponding filter inductor $L_p$ 250 is connected to the primary side of a high frequency AC transformer 205 and at least one secondary side arm (Arm_s1) 230 with corresponding filter inductor Ls 255 is connected between the DC grid voltage bus 260 and the secondary side of the transformer 205. In this embodiment, Arm_p1 210 comprises a plurality of cascade connected voltage source converter sub-modules 215 and Arm_s1 230 comprises a plurality of cascade connected voltage source sub-modules, wherein the plurality of cascade connected voltage source sub-modules of the secondary side arm may be full-bridge sub-modules 235 or half-bridge submodules 240. In this embodiment, energy storage battery units 220, 225 are connected to the DC side of each of the primary side sub-modules 215, separately, in Arm_p1 210. Due to the modularization of the design of the BESS, low voltage rated power devices can be used in this topology, thereby reducing the cost of the device, lowering the associated loss and providing a higher switching frequency.

As shown with reference to FIG. 3A-FIG. 3D, because there are multiple energy storage cells 220, 225 in each primary side arm 210, there are multiple modulation freedoms in this topology, including square wave modulation (FIG. 3A), rectangular wave modulation (FIG. 3B), quasi square wave modulation (FIG. 3C) and sinusoidal wave modulation (FIG. 3D). According to the number of sub-modules, voltage rating and power devices characteristics of the voltage source converter, trade-off analysis regarding loss, cost and control characteristics can be performed to choose the proper modulation scheme.

The voltage and current equation for the topology of FIG. 2 are shown in equations (1)-(4), $$v_{p1} = \sum_{i=1}^{m} v_{p1\_i\_ac} = \sum_{i=1}^{m} d_{p1\_i} V_{p1\_i\_dc} = d_{p1} \sum_{i=1}^{m} v_{p1\_i\_dc} = \quad (1)$$
$$d_{p1} v_{arm\_p1\_dc} = (d_{p1\_dc} + d_{p1\_ac}) v_{arm\_p1\_dc} = v_{p1\_dc} + v_{p1\_ac}$$

$$v_{s1} = \sum_{i=1}^{n} v_{s1\_i\_ac} = \sum_{i=1}^{m} d_{s1\_i} v_{s1\_i\_dc} = d_{s1} \sum_{i=1}^{m} v_{s1\_i\_dc} = \quad (2)$$
$$d_{s1} v_{arm\_s1\_dc} = (d_{s1\_dc} + d_{s1\_ac}) v_{arm\_s1\_dc} = v_{s1\_dc} + v_{s1\_ac}$$

$$i_{p1\_dc} = \frac{1}{m}\sum_{i=1}^{m} i_{p1\_i\_dc} = \frac{1}{m}\sum_{i=1}^{m} d_{p1\_i} i_{p1\_i\_ac} = d_{p1} i_{p1} = d_{p1} i_{Lp} \quad (3)$$

$$i_{s1\_dc} = \frac{1}{n}\sum_{i=1}^{n} i_{s1\_i\_dc} = \frac{1}{n}\sum_{i=1}^{n} d_{s1\_i} i_{s1\_i\_ac} = d_{s1} i_{s1} = d_{s1} i_{Ls} \quad (4)$$

where $v_{p1\_i\_dc}$ and $v_{s1\_i\_dc}$ denote energy storage battery unit's voltage and DC capacitor's voltage in each sub-module of Arm_p1 210 and Arm_s1 230, respectively, $v_{p1\_i\_ac}$ and $v_{s1\_i\_ac}$ denote the output voltage in each sub-module of Arm_p1 210 and Arm_s1 230, respectively, $i_{p1\_i\_dc}$ and $i_{s1\_i\_dc}$ denote energy storage battery unit's current and DC capacitor's current in each sub-module of Arm_p11 210 and Arm_s1 230, respectively, $i_{p1\_i\_ac}$ and is $i_{s1\_i\_ac}$ denote the output voltage in each sub-module of Arm_p1 210 and Arm_s1 230, respectively, $d_{p1\_i}$ and $d_{s1\_i}$ denote average duty cycle in each sub-module of Arm_p1 210 and Arm_s1 230, respectively, $v_{arm\_p1\_dc}$ denotes the voltage sum of energy storage battery unit in each sub-module of Arm_p1 210, $v_{arm\_s1\_dc}$ denotes the voltage sum of DC capacitor in each sub-module of Arm_s1 230, $v_{p1\_dc}$ and $v_{p1\_ac}$ denote the DC component and AC component of Arm_p1's 210 output voltage, respectively, and $v_{s1\_dc}$ and $v_{s1\_ac}$ denote the DC component and AC component of Arm_s1's 230 output voltage, respectively.

According to the voltage and current equations which are shown in (1) to (4), the average model of FIG. 2's topology can be derived as illustrated with reference to FIG. 4. The state equation of which can be derived as, $$N\left(d_{p1} v_{arm\_p1\_dc} - L_p \frac{di_p}{dt}\right) - L_S \frac{di_s}{dt} = d_{s1} v_{arm\_s1\_dc} - v_{dc} \quad (1)$$

$$\frac{C}{n} \frac{dv_{arm\_s1\_dc}}{dt} = d_{s1} i_{Ls} \quad (6)$$

According to the modulation schemes which are shown in FIG. 5A-FIG. 5D, two kinds of control strategies are proposed according to the different modulation waves. For example, for square wave modulation, rectangular wave modulation and quasi square wave modulation which are shown in FIG. 3A, FIG. 3B and FIG. 3C, respectively, the phase shift angle φ between the transformer primary side square wave (rectangular wave) and transformer secondary side square wave (rectangular wave) should be the variable of control. In sinusoidal wave modulation, which is shown in FIG. 3D, the output voltage of Arm_p1 210 can be used as the variable of control, accordingly, sinusoidal wave control is accompanied by a sinusoidal wave modulation scheme.

According to the circuit average model in FIG. 4, the phase shift control diagram can be obtained, which is shown in FIG. 5A and FIG. 5B. As shown in FIG. 5A, the average value of the transformer secondary side sub-module DC capacitor voltage is controlled by modulating the phase shift angle φ between the transformer primary side square wave (rectangular wave or quasi square wave) and as shown in FIG. 5B, the transformer secondary side square wave (rectangular wave or quasi square wave), and the average value of the transformer secondary side current is controlled by modulating the transformer secondary side sub-module output voltage's DC composition.

Figure 6A:
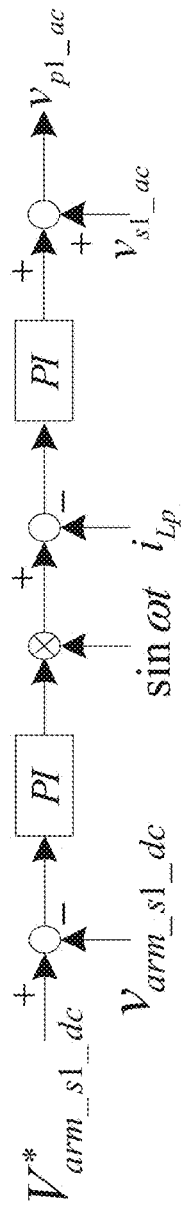
FIG. 6A is an illustration of a transformer primary side arm voltage modulation signal generation of the sinusoidal wave control diagram for the $1^{st}$ BESS topology, in accordance with an embodiment of the present invention.
Figure 6B:
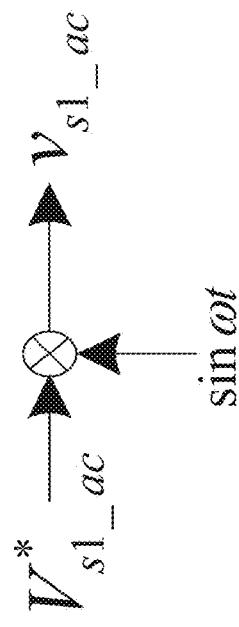
FIG. 6B is an illustration of a transformer secondary side arm ac voltage modulation signal generation of the sinusoidal wave control diagram for the $1^{st}$ BESS topology, in accordance with an embodiment of the present invention.
Figure 6C:
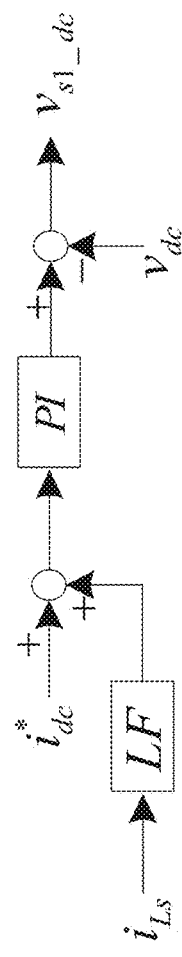
FIG. 6C is an illustration of a transformer secondary side arm dc voltage modulation signal generation of the sinusoidal wave control diagram for the $1^{st}$ BESS topology, in accordance with an embodiment of the present invention.

The control diagram for sinusoidal wave modulation is shown in FIG. 6A-FIG. 6C, wherein the average value of the transformer secondary side current $i_{L_s}$ is controlled by modulating the transformer secondary side sub-module output voltage's DC composition, as shown in FIG. 6A, the average value of transformer secondary side sub-module DC capacitor voltage $v_{arm\_s1\_dc}$ is controlled by modulating the transformer primary side current, as shown in FIG. 6B, and the transformer primary side current is controlled by modulating the transformer primary side arm voltage $v_{p1\_ac}$, as shown in FIG. 6C.

In accordance with the proposed modulation strategy and control diagram of the present invention, BESS's DC grid side current can be controlled precisely, and as such, not only the energy storage function, but also the active filter function and current limiting function can be realized in the proposed BESS topology.

As mentioned above, both full bridge sub-module (FBSM) 235 and half bridge sub-module (HBSM) 240 can serve as Arm_s1's 230 sub-module topology. The output voltage of the half bridge sub-module always contains a direct current component, which is equal to half of the HBSM output voltage's peak-to-peak value. According to the circuit average model in FIG. 4, regardless of whether the power directional of the converter is positive or negative, as long as there is real power transfer, there is a direct current component that exists in the transformer secondary side current $i_{Ls}$, which is also known as the average value of $i_{dc}$. Combining FIG. 6C, the average value of $i_{dc}$ is controlled through control the DC component of Arm_s1's output voltage $v_{s1\_dc}$. In the circuit steady state, $v_{s1\_dc}$ should be similar to $v_{dc}$, which means that in DC grid low voltage fault condition, at least part of Arm_s1's sub-module should be full bridge sub-module (FBSM). This is because in a DC grid low voltage fault condition, the DC grid voltage is very low, even to zero. According to the analysis above, to control the transformer secondary side current $i_{Ls}$ under low voltage fault condition, $v_{s1\_dc}$ should be similar to $v_{dc}$. If all the Arm_s1's sub-module topology is HBSM, $v_{s1\_dc}$ is always half of $v_{s1}$'s peak-to-peak value, then the transformer secondary side current $i_{Ls}$ cannot be controlled. Of course, if a low voltage fault ride through function is not a required function, Arm_s1 can be composed of only HBSMs.

Figure 7:
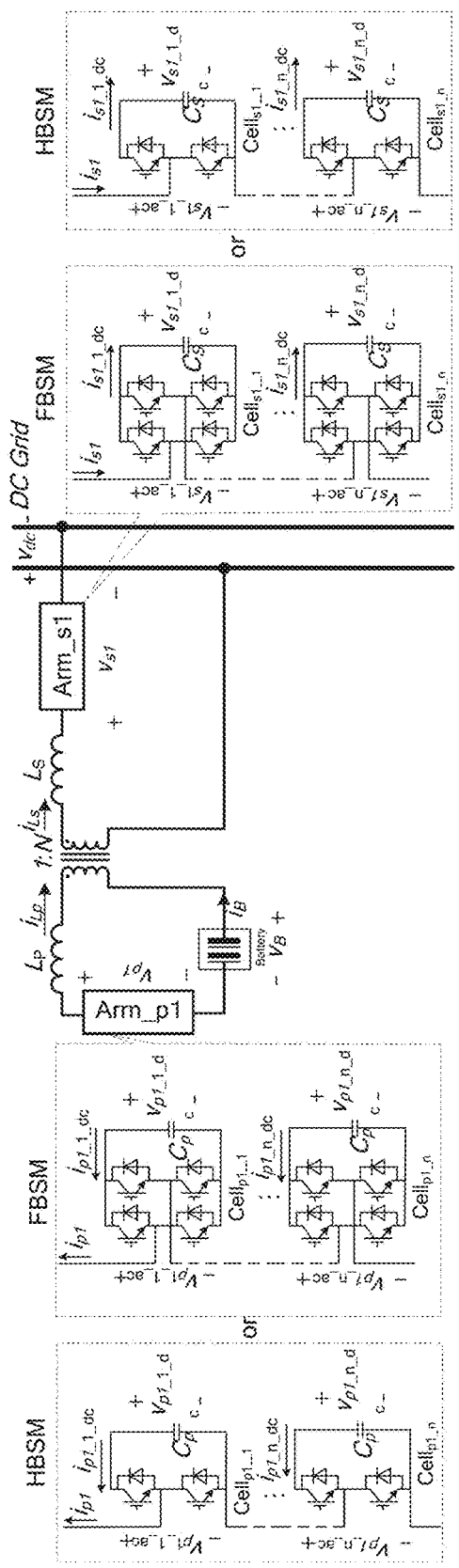
FIG. 7 is a schematic illustration of a second (2nd) topology of a BESS, in accordance with an embodiment of the present invention.

The second BESS topology 300 proposed is shown in FIG. 7. In this topology 300, Arm_p1 315 with corresponding filter inductor Lp 350 and energy storage battery units 322 is connected to the primary side of high frequency AC transformer 305, Arm_s1 330 with Ls 355 is connected between DC grid voltage bus 360 and the secondary side of the AC transformer 305. Arm_p1 310 is comprised of multiple sub-module cascaded branches 315, 317 and Arm_s1 330 are comprised of multiple sub-module cascaded branches 335, 340. In topology of FIG. 7, energy storage battery units 322 are connected between Arm_p1 310 and the primary side of high frequency AC transformer 305. In this embodiment, when additional batteries or ultra-capacitors 370, 372, 374, 376 are also connected to the DC side of each sub-module 315, 317 in Arm_p1 310, a hybrid energy storage system can be realized. In the topology of FIG. 7, each sub-module's 315, 317, 335, 340 can be either a full bridge sub-module (FBSM) or a half bridge sub-module (HBSM).

As shown with reference to FIG. 8A-FIG. 8D, because there are multiple energy storage cells 322 in each primary side of the transformer, there are multiple modulation freedoms in this topology, including square wave modulation (FIG. 8A), rectangular wave modulation (FIG. 8B), quasi square wave modulation (FIG. 8C) and sinusoidal wave modulation (FIG. 8D). According to the number of sub-modules, voltage rating and power devices characteristics of the voltage source converter, trade-off analysis regarding loss, cost and control characteristics can be performed to choose the proper modulation scheme.

The voltage and current equation for the topology of FIG. 7 are shown in equations (7)-(10), $$v_{p1} = \sum_{i=1}^{m} v_{p1\_i\_ac} = \sum_{i=1}^{m} d_{p1\_i} v_{p1\_i\_dc} = d_{p1} \sum_{i=1}^{m} v_{p1\_i\_dc} = \\ d_{p1} v_{arm\_p1\_dc} = (d_{p1\_dc} + d_{p1\_ac}) v_{arm\_p1\_dc} = v_{p1\_dc} + v_{p1\_ac} \quad (7)$$

$$v_{s1} = \sum_{i=1}^{n} v_{s1\_i\_ac} = \sum_{i=1}^{m} d_{s1\_i} v_{s1\_i\_dc} = d_{s1} \sum_{i=1}^{m} v_{s1\_i\_dc} = \\ d_{s1} v_{arm\_s1\_dc} = (d_{s1\_dc} + d_{s1\_ac}) v_{arm\_s1\_dc} = v_{s1\_dc} + v_{s1\_ac} \quad (8)$$

$$i_{p1\_dc} = \frac{1}{m} \sum_{i=1}^{m} i_{p1\_i\_dc} = \frac{1}{m} \sum_{i=1}^{m} d_{p1\_i} i_{p1\_i\_ac} = d_{p1} i_{p1} = d_{p1} i_{Lp} \quad (9)$$

$$i_{s1\_dc} = \frac{1}{n} \sum_{i=1}^{n} i_{s1\_i\_dc} = \frac{1}{n} \sum_{i=1}^{n} d_{s1\_i} i_{s1\_i\_ac} = d_{s1} i_{s1} = d_{s1} i_{Ls} \quad (10)$$

where $v_{p1\_i\_dc}$ and $v_{s1\_i\_dc}$ denote energy storage battery unit's voltage and DC capacitor's voltage in each sub-module of Arm_p1 310 and Arm_s1 330, respectively, $v_{p1\_i\_ac}$ and $v_{s1\_i\_ac}$ denote the output voltage in each sub-module of Arm_p1 310 and Arm_s1 330, respectively, $i_{p1\_i\_dc}$ and $i_{s1\_i\_dc}$ denote energy storage battery unit's current and DC capacitor's current in each sub-module of Arm_p1 310 and Arm_s1 330, respectively, $i_{p1\_i\_ac}$ and $i_{s1\_i\_ac}$ denote the output voltage in each sub-module of Arm_p1 310 and Arm_s1 330, respectively, $d_{p1\_i}$ and $d_{s1\_i}$ denote average duty cycle in each sub-module of Arm_p1 310 and Arm_s1 330, respectively, $v_{arm\_p1\_dc}$ denotes the voltage sum of energy storage battery unit in each sub-module of Arm_p1 310, $v_{arm\_s1\_dc}$ denotes the voltage sum of DC capacitor in each sub-module of Arm_s1 330, $v_{p1\_dc}$ and $v_{p1\_ac}$ denote the DC component and AC component of Arm_p1's 310 output voltage, respectively, and $v_{s1\_dc}$ and $v_{s1\_ac}$ denote the DC component and AC component of Arm_s1's 330 output voltage, respectively.

Figure 9:
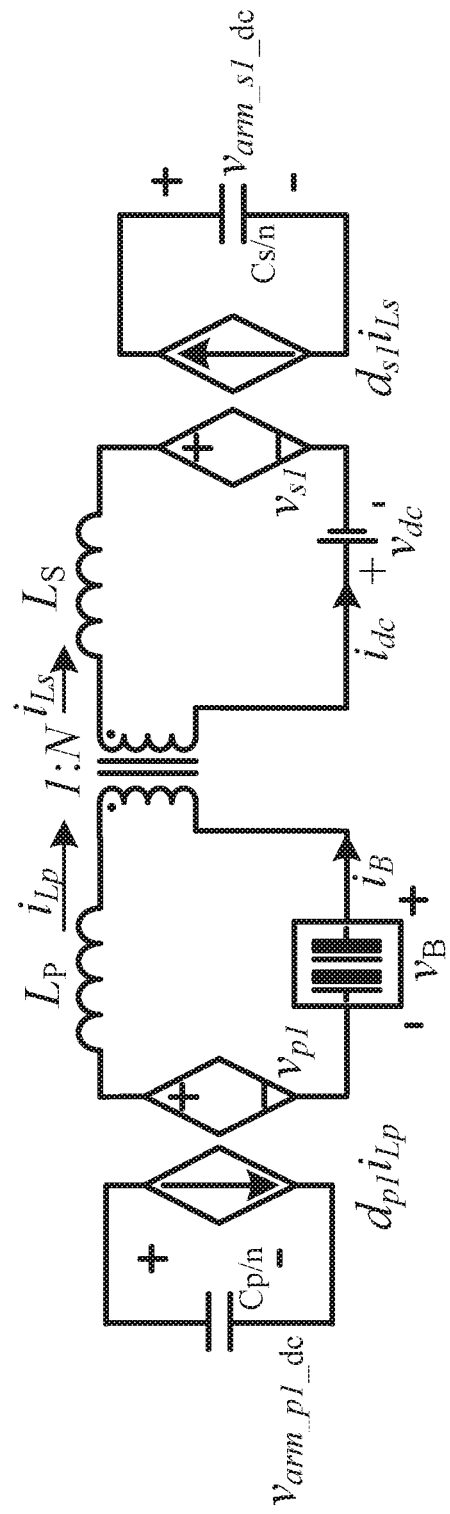
FIG. 9 is an illustration of the average model for the 2nd BESS topology, in accordance with an embodiment of the present invention.

According to the voltage and current equation which are shown in (7)-(10), the average model of the topology of FIG. 7 can be derived, as illustrated in FIG. 9. The state equation of which can be derived as, $$N\left(d_{p1} v_{arm\_p1\_dc} - v_B - L_p \frac{di_p}{dt}\right) - L_s \frac{di_s}{dt} = d_{s1} v_{arm\_s1\_dc} - v_{dc} \quad (11)$$

$$\frac{C_S}{n} \frac{dv_{arm\_s1\_dc}}{dt} = d_{S1} i_{Ls} \quad (12)$$

$$\frac{C_P}{n} \frac{dv_{arm\_p1\_dc}}{dt} = d_{p1} i_{Lp} \quad (13)$$

Figure 10A:
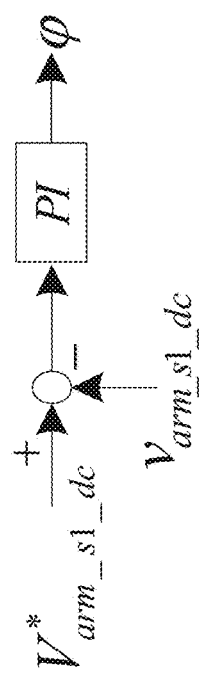
FIG. 10A is an illustration of a phase shift angle generation for the 2nd BESS topology, in accordance with an embodiment of the present invention.
Figure 10B:
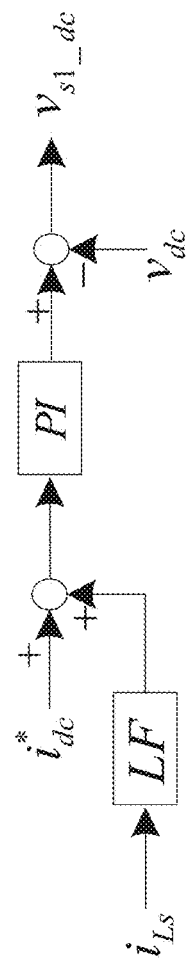
FIG. 10B is an illustration of a transformer secondary side arm DC voltage modulation signal generation for the 2nd BESS topology, in accordance with an embodiment of the present invention.
Figure 10C:
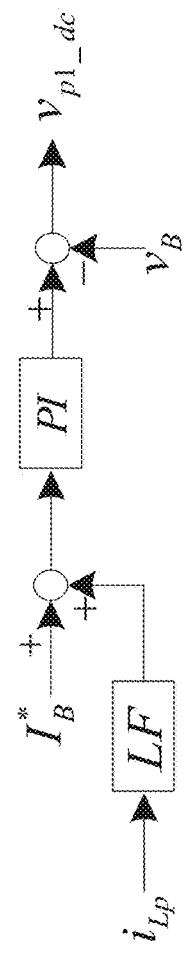
FIG. 10C is an illustration of a transformer primary side arm DC voltage modulation signal generation for the 2nd BESS topology, in accordance with an embodiment of the present invention.

According to the circuit average model in FIG. 9, the phase shift control diagram can be obtained, which is shown in FIG. 10A-FIG. 10C. As shown in FIG. 10A, the average value of the transformer secondary side sub-module DC capacitor voltage is controlled by modulating the phase shift angle φ between the transformer primary side square wave (rectangular wave or quasi square wave) and as shown in FIG. 10B, the average value of the transformer secondary side is controlled by modulating the transformer secondary side sub-module output voltage's DC composition and as shown in FIG. 10C, the average value of battery charging or discharging current is controlled by modulating Arm_p1 output voltage's DC composition.

Figure 11A:
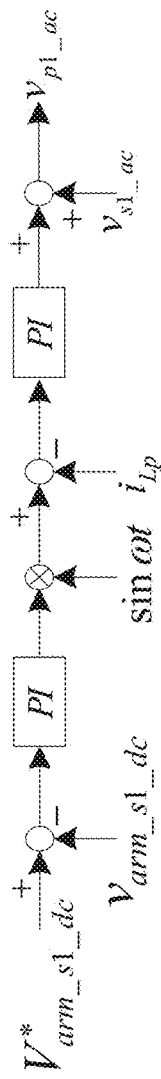
FIG. 11A is an illustration of a transformer primary side arm voltage modulation signal generation of the sinusoidal wave control diagram for the 2nd BESS topology, in accordance with an embodiment of the present invention.
Figure 11B:
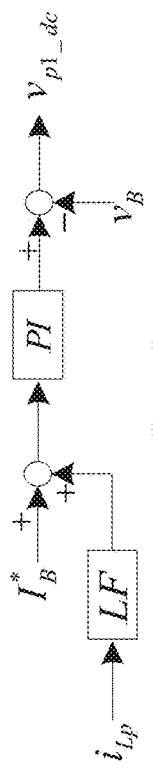
FIG. 11B is an illustration of a transformer secondary side arm DC voltage modulation signal generation of the sinusoidal wave control diagram for the 2nd BESS topology, in accordance with an embodiment of the present invention.
Figure 11C:
FIG. 11C is an illustration of a transformer secondary side arm AC voltage modulation signal generation of the sinusoidal wave control diagram for the 2nd BESS topology, in accordance with an embodiment of the present invention.
Figure 11D:
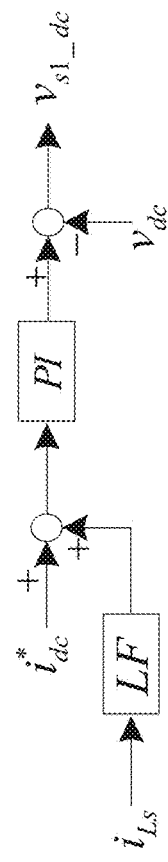
FIG. 11D is an illustration of a transformer secondary side arm DC voltage modulation signal generation of the sinusoidal wave control diagram for the 2nd BESS topology, in accordance with an embodiment of the present invention.

The control diagram of sinusoidal wave modulation is shown in FIG. 11A-FIG. 11C, wherein the average value of transformer secondary side current $i_{Ls}$ is controlled by modulating the transformer secondary side sub-module output voltage's DC composition, as shown in FIG. 11A, the average value of transformer secondary side sub-module DC capacitor voltage $v_{arm\_s1\_dc}$ is controlled by modulating the transformer primary side current $i_{Lp}$, as shown in FIG. 11B and the transformer primary side current is controlled by modulating the transformer primary side arm voltage $v_{p1\_ac}$, as shown in FIG. 11C. Accordingly, with the proposed modulation strategy and control diagram, BESS's DC grid side current can be controlled precisely. In addition, the energy storage function, the active filter function, the low voltage fault ride through function and the current limiting function can also be realized in the proposed BESS topology illustrated in FIG. 7. As with the first embodiment shown in FIG. 2, in the embodiment of FIG. 7, both full-bridge sub-module (FBSM) and half bridge sub-module (HBSM) can serve as Arm_s1's sub-module topology. Under DC grid low voltage fault condition, in order to realize the low voltage fault ride through function, at least part of Arm_s1's sub-module should be a full bridge sub-module (FBSM).

A third BESS topology 400 is illustrated with reference to FIG. 12. In this topology, Arm_p1 410 with corresponding filter inductor Lp 450 is connected to the primary side of a high frequency AC transformer 405, Arm_s1 430, Arm_s2 434, Arm_s3 432 and Arm_s4 436, along with their corresponding inductors Ls 455, 456, 457, 458 are connected between the DC grid voltage bus 460 and the secondary side of the transformer 405. Arm_p1 410 and Arm_si 430, 433, 434, 436 are comprised of sub-module cascaded branches, 415, 435, 440, respectively. In this embodiment, energy storage battery units 420, 425 are connected to the DC side of each sub-modules 415 separately in Arm_p1 410. In the transformer secondary side, each sub-module's topology can be either a full bridge sub-module (FBSM) 435 or a half bridge sub-module (HBSM) 440. As a result of the modularized design, low voltage rated power devices can be used in this topology, thereby enabling lower cost, lower loss and higher switching frequency in the device.

$$v_{p1} = \sum_{i=1}^{m} v_{p1\_i\_ac} = \sum_{i=1}^{m} d_{p1\_i} v_{p1\_i\_dc} = d_{p1} \sum_{i=1}^{m} v_{p1\_i\_dc} = d_{p1} v_{arm\_p1\_dc} = \\ d_{p1\_dc} v_{arm\_p1\_dc} + d_{p1\_ac} v_{arm\_p1\_dc} = v_{p1\_dc} + v_{p1\_ac} \quad (14)$$

$$v_{si(i=1...4)} = \sum_{k=1}^{n} v_{si\_k\_ac} = \sum_{k=1}^{m} d_{si\_k} v_{si\_k\_dc} = d_{si} \sum_{k=1}^{m} v_{si\_k\_dc} = \\ d_{si} v_{arm\_si\_dc} = (d_{si\_dc} + d_{si\_ac}) v_{arm\_si\_dc} = v_{si\_dc} + v_{si\_ac} \quad (15)$$

$$i_{p1\_dc} = \frac{1}{m} \sum_{i=1}^{m} i_{p1\_i\_dc} = \frac{1}{m} \sum_{i=1}^{m} d_{p1\_i} i_{p1\_i\_ac} = d_{p1} i_{p1} = d_{p1} i_{Lp} \quad (16)$$

$$i_{si(i=1...4)\_dc} = \frac{1}{n} \sum_{i=1}^{n} i_{si(i=1...4)\_k\_dc} = \\ \frac{1}{n} \sum_{i=1}^{n} d_{si(i=1...4)\_k} i_{si(i=1...4)\_k\_ac} = d_{si(i=1...4)} i_{si(i=1...4)} \quad (17)$$

Figure 12:
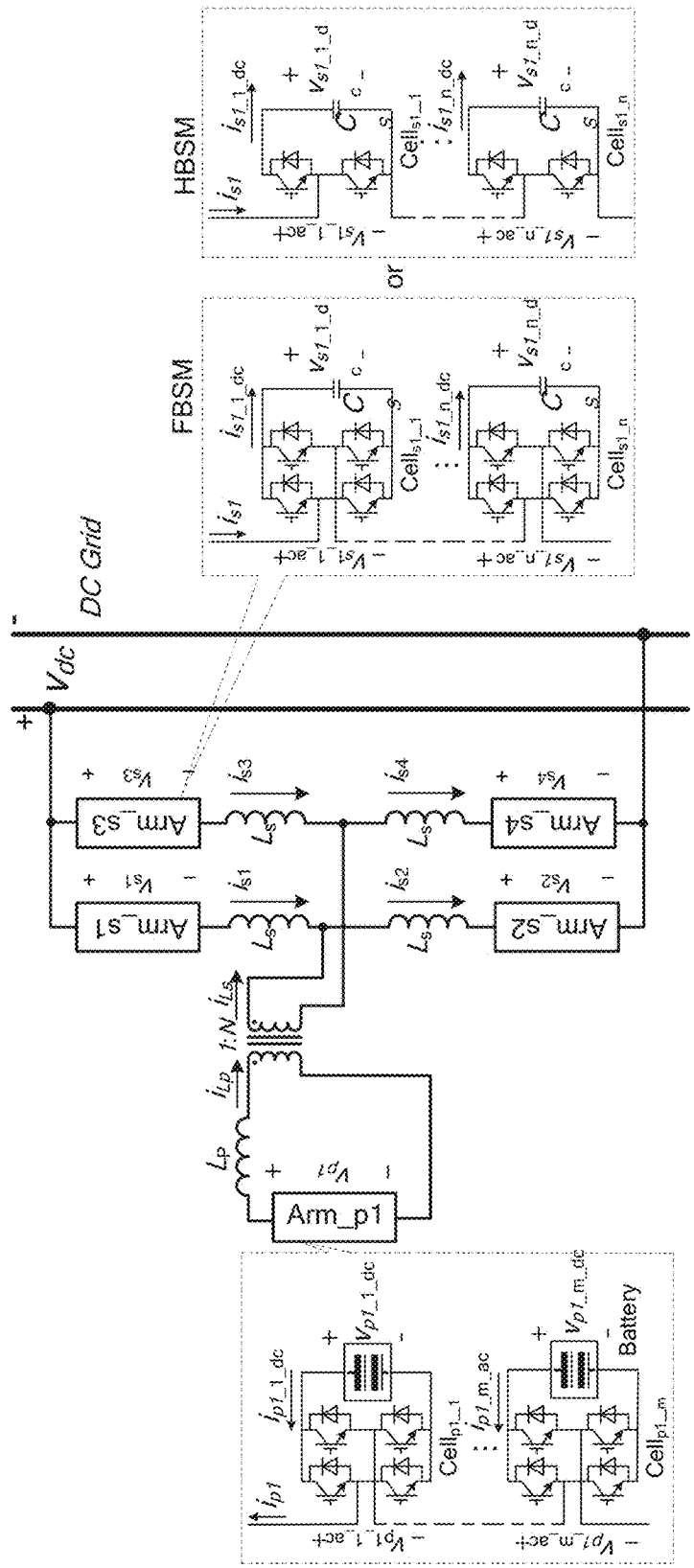
FIG. 12 is a schematic illustration of a third (3rd) topology of a BESS, in accordance with an embodiment of the present invention.

The voltage and current equations for the topology illustrated in FIG. 12 are shown in equations (14) to (18), where $v_{p1\_i\_dc}$ and $v_{s1\_i\_dc}$ denote energy storage battery unit's voltage and DC capacitor's voltage in each sub-module of Arm_p1 410 and Arm_s1 430, respectively, $v_{p1\_i\_ac}$ and $v_{s1\_i\_ac}$ denote the output voltage in each sub-module of Arm_p1 410 and Arm_s1 430, respectively, $i_{p1\_i\_dc}$ and $i_{s1\_i\_dc}$ denote energy storage battery unit's current and DC capacitor's current in each sub-module of Arm_p1 410 and Arm_s1 430, respectively, $i_{p1\_i\_ac}$ and $i_{s1\_i\_ac}$ denote the output voltage in each sub-module of Arm_p1 410 and Arm_s1 430, respectively, $d_{p1\_i}$ and $d_{s1\_i}$ denote average duty cycle in each sub-module of Arm_p1 410 and Arm_s1 430, respectively, $v_{arm\_p1\_dc}$ denotes the voltage sum of energy storage battery unit in each sub-module of Arm_p1 410, $v_{arm\_s1\_dc}$ denotes the voltage sum of DC capacitor in each sub-module of Arm_s1 430, $v_{p1\_dc}$ and $v_{p1\_ac}$ denote the DC component and AC component of Arm_p1's 410 output voltage, respectively, and $v_{s1\_dc}$ and $v_{s1\_ac}$ denote the DC component and AC component of Arm_s1's 430 output voltage, respectively.

Figure 13:
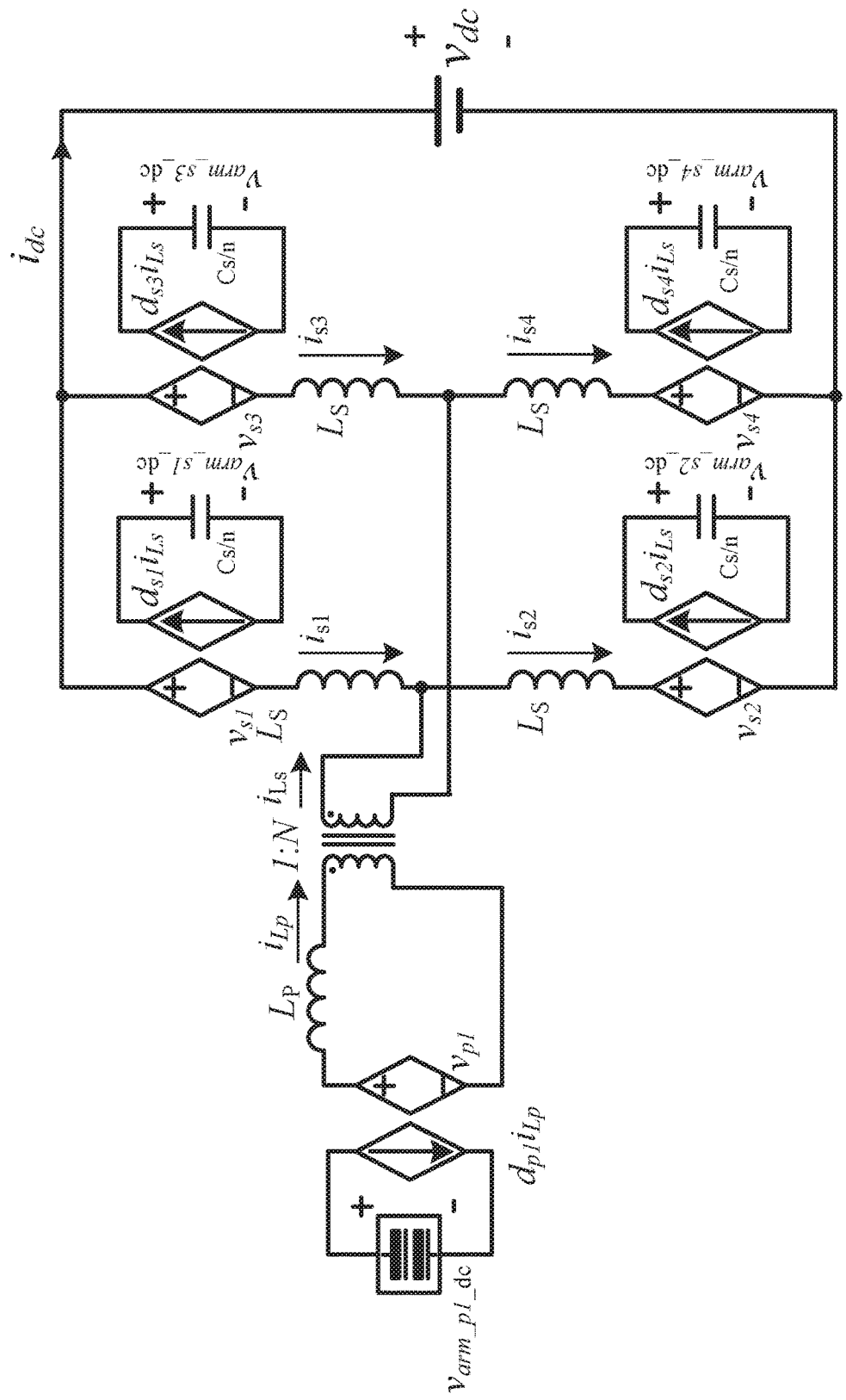
FIG. 13 is an illustration of the average model for the 3rd BESS topology, in accordance with an embodiment of the present invention.

According to the voltage and current equation which are shown in equations (14)-(17), the average model of for the embodiment of the topology illustrated in FIG. 12 can be derived as shown in FIG. 13. Considering ideal transformer's characteristic, the average model can be simplified as shown in FIG. 14.

Figure 14:
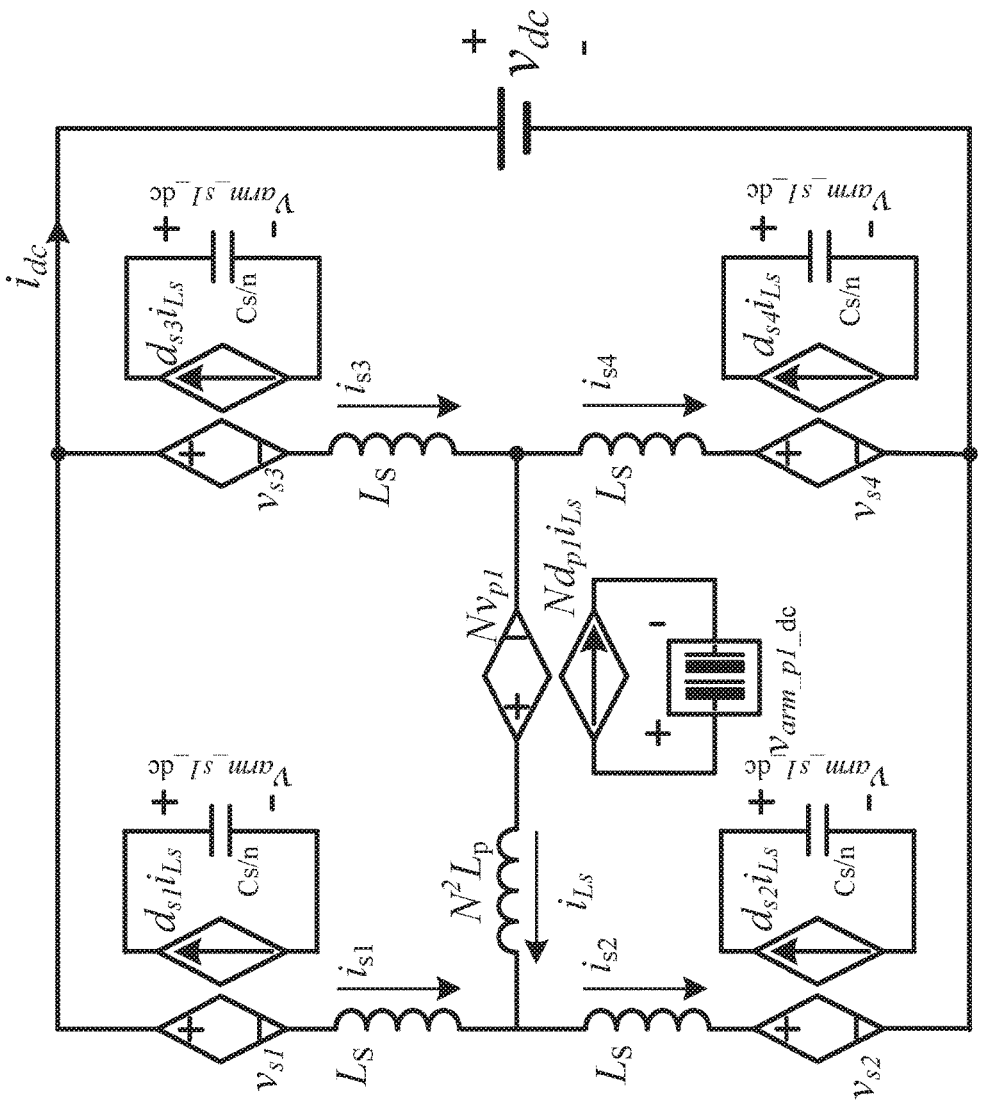
FIG. 14 is an illustration of the simplified average model for the 3rd BESS topology, in accordance with an embodiment of the present invention.

The state equation of the model shown in FIG. 14 can be derived as, $$\begin{cases} \frac{di_{Ls}}{dt} = \frac{1}{(L_S + N^2 L_p)} \left( \frac{v_{s1} - v_{s2} - v_{s3} - v_{s4}}{2} + N v_{p1} \right) \\ \frac{di_{dc}}{dt} = \frac{1}{L_S} \left( \frac{v_{s1} + v_{s2} + v_{s3} + v_{s4}}{2} - v_{dc} \right) \\ \frac{di_{s1}}{dt} = \frac{1}{2L_S}(v_{dc} - v_{s1} - v_{s2}) - \frac{1}{2(L_S + N^2 L_p)} \\ \left( \frac{v_{s1} - v_{s2} - v_{s3} - v_{s4}}{2} + N v_{p1} \right) \\ \frac{C_S}{n} \frac{dv_{arm\_si\_dc}}{dt} = d_{si} i_{si} \quad i = 1 \dots 4 \end{cases} \quad (18)$$

When the converter is under ideal control, the arm current should be, $$\begin{cases} i_{s1\_ideal} = -\frac{i_{dc} + i_{Ls}}{2} \\ i_{s2\_ideal} = -\frac{i_{dc} - i_{Ls}}{2} \\ i_{s3\_ideal} = -\frac{i_{dc} - i_{Ls}}{2} \\ i_{s4\_ideal} = -\frac{i_{dc} + i_{Ls}}{2} \end{cases} \quad (19)$$

Then the error current between the actual current and ideal current in each arm can be defined as, $$\begin{cases} i_{s1\_error} = i_{s1} - i_{s1\_ideal} = i_{s1} + \frac{i_{dc} + i_{Ls}}{2} \\ i_{s2\_error} = i_{s2} - i_{s2\_ideal} = i_{s2} + \frac{i_{dc} - i_{Ls}}{2} \\ i_{s3\_error} = i_{s3} - i_{s3\_ideal} = i_{s3} + \frac{i_{dc} - i_{Ls}}{2} \\ i_{s4\_error} = i_{s4} - i_{s4\_ideal} = i_{s4} + \frac{i_{dc} + i_{Ls}}{2} \end{cases} \quad (20)$$

Considering, $$\begin{cases} i_{s2} = i_{s1} + i_{Ls} \\ i_{s4} = i_{s3} - i_{Ls} \\ i_{s1} + i_{s3} = -i_{dc} \end{cases} \quad (21)$$

Then, $$\begin{cases} i_{s1\_error} = i_{s2\_error} \\ i_{s3\_error} = i_{s4\_error} \\ i_{s1\_error} = -i_{s3\_error} \end{cases} \quad (22)$$

Combining (18) and (20), the state equation of FIG. 14's model can be derived as, $$\begin{cases} \dfrac{di_{Ls}}{dt} = \dfrac{1}{(L_S + N^2 L_p)} \left( \dfrac{v_{s1} - v_{s2} - v_{s3} + v_{s4}}{2} + N v_{p1} \right) \\ \dfrac{di_{dc}}{dt} = \dfrac{1}{L_S} \left( \dfrac{v_{s1} + v_{s2} + v_{s3} + v_{s4}}{2} - v_{dc} \right) \\ \dfrac{di_{s1\_error}}{dt} = \dfrac{1}{L_S} \left( \dfrac{-v_{s1} - v_{s2} + v_{s3} + v_{s4}}{4} \right) \\ \dfrac{C_S}{n} \dfrac{dv_{arm\_si\_dc}}{dt} = d_{Si}(i_{si\_error} + i_{si\_ideal}) \quad i = 1 \ldots 4 \end{cases} \quad (23)$$

Combining (15), (18) and (20), the duty cycle in each arm can be derived as, $$\begin{cases} d_{s1} = d_{s1\_dc} - d_{s1\_ac} = d_{s1\_error} + d_{s1\_ideal} = d_{s1\_error} + \dfrac{d_{dc} - d_{ac}}{2} \\ d_{s2} = d_{s2\_dc} + d_{s2\_ac} = d_{s2\_error} + d_{s2\_ideal} = d_{s2\_error} + \dfrac{d_{dc} + d_{ac}}{2} \\ d_{s3} = d_{s3\_dc} + d_{s3\_ac} = d_{s3\_error} + d_{s3\_ideal} = d_{s3\_error} + \dfrac{d_{dc} + d_{ac}}{2} \\ d_{s4} = d_{s4\_dc} - d_{s4\_ac} = d_{s4\_error} + d_{s4\_ideal} = d_{s4\_error} + \dfrac{d_{dc} - d_{ac}}{2} \end{cases} \quad (24)$$

Combining (23) and (24), the state equation of arm capacitor voltage can be expressed as, $$\dfrac{C_s}{n} \dfrac{dv_{arm\_s1\_dc}}{dt} = (d_{si\_error} + d_{si\_ideal})(i_{si\_error} + i_{si\_ideal}) = \quad (25)$$

$$\dfrac{d_{ac} \cdot i_{Ls} + d_{ac} \cdot i_{dc} - d_{dc} \cdot i_{dc} - d_{dc} \cdot i_{Ls}}{4} +$$

$$\dfrac{d_{dc} - d_{ac}}{2} i_{si\_error} + d_{si\_error} i_{si}$$

$$\dfrac{C_s}{n} \dfrac{d \sum_{i=1}^{4} v_{arm\_si\_dc}}{dt} = \dfrac{C_s}{4n} \dfrac{d\bar{v}_{arm\_s\_dc}}{dt} = \quad (26)$$

$$\sum_{i=1}^{4} (d_{si\_error} + d_{si\_ideal})(i_{si\_error} + i_{si\_ideal}) = d_{s\_ac} \cdot i_{Ls} - d_{s\_dc} \cdot i_{dc} +$$

$$\sum_{j=1}^{4} (d_{si\_error} i_{si\_error} + d_{si\_ideal} i_{si\_error} + d_{si\_error} i_{si\_ideal})$$

Figure 15A:
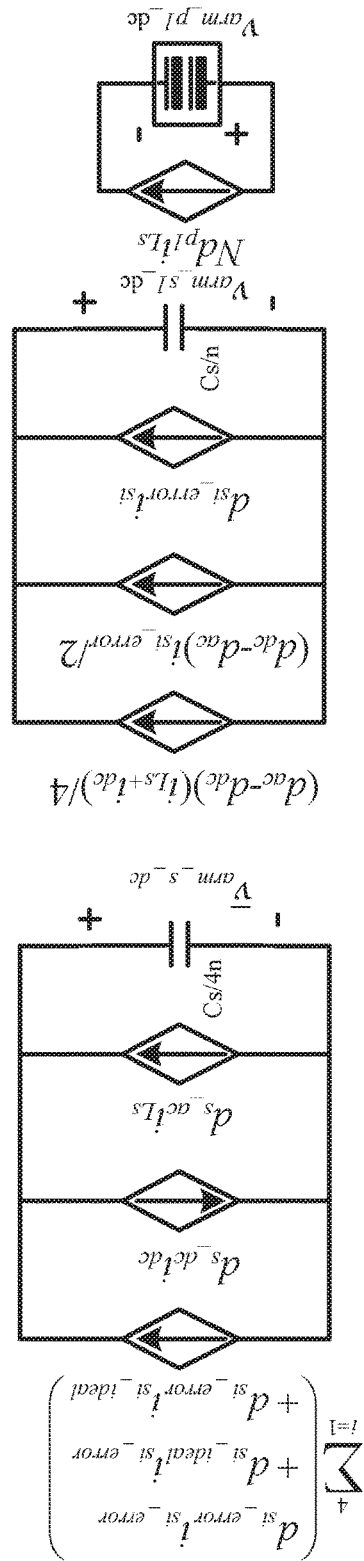
FIG. 15A is an illustration of the capacitor voltage simplified average model for the 3rd BESS topology, in accordance with an embodiment of the present invention.
Figure 15B:
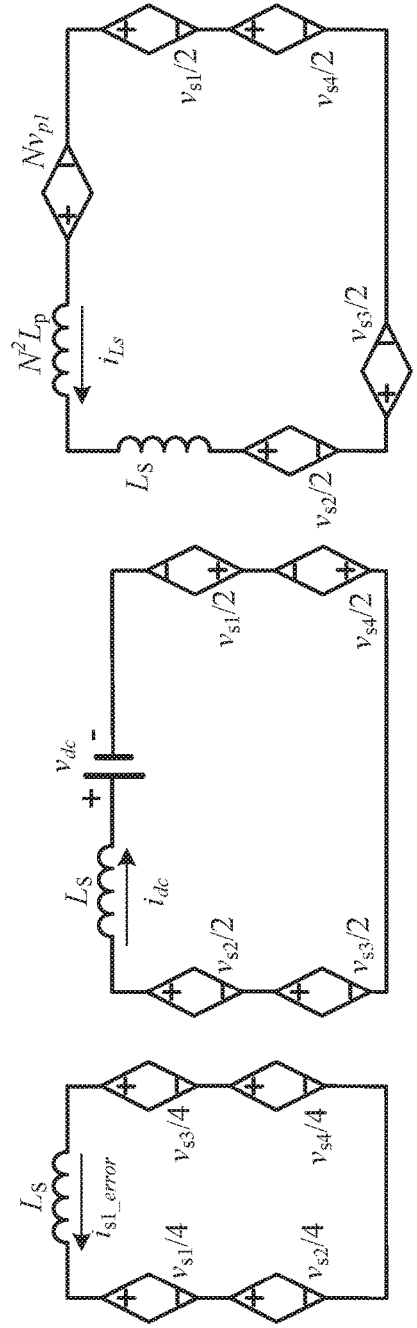
FIG. 15B is an illustration of the inductor current simplified average model for the 3rd BESS topology, in accordance with an embodiment of the present invention.

Then the average model can be re-expressed in shown in FIG. 15A and FIG. 15B, wherein FIG. 15A illustrates the simplified average capacitor voltage model and FIG. 15B illustrates the simplified average inductor current model.

Because there are a plurality of energy storage cells in each arm, there are also many modulation freedoms in this topology, including square wave modulation, rectangular wave modulation, quasi square wave modulation and sinusoidal wave modulation, which are shown with reference to FIG. 16A, FIG. 16B, FIG. 16C and FIG. 16D, respectively.

Figure 17A:
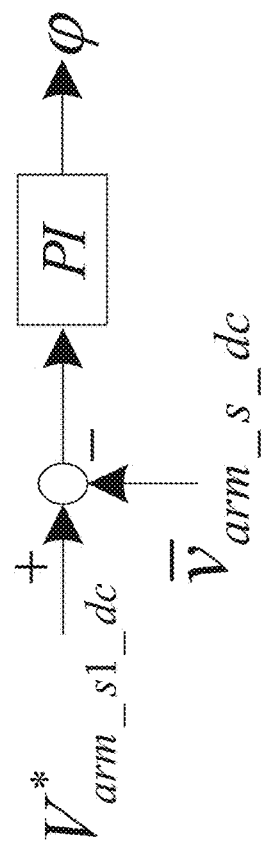
FIG. 17A is an illustration of a phase shift control diagram for the 3rd BESS topology, in accordance with an embodiment of the present invention.
Figure 17B:
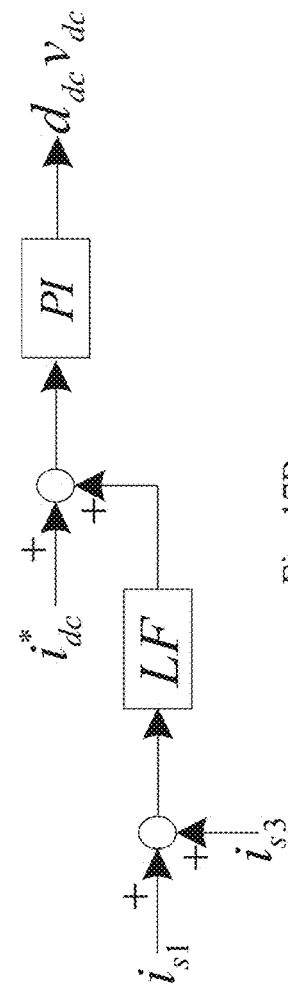
FIG. 17B is an illustration of a transformer secondary side arm DC voltage modulation signal generation for the 3rd BESS topology, in accordance with an embodiment of the present invention.

Depending upon the number of sub-modules, voltage rating and power device characteristics of the converter, trade-off analysis regarding loss, cost and control characteristics can be performed to select the proper modulation scheme. It can be seen from FIG. 16A-FIG. 16C that square wave modulation, rectangular wave modulation and quasi square wave modulation are accompanied by a phase shift control strategy. The phase shift control diagram is shown with reference to FIG. 17A, wherein the average value of the transformer secondary side sub-module DC capacitor voltage is controlled by modulating the phase shift angle φ between the transformer primary side square wave (rectangular wave or quasi square wave) and the transformer secondary side square wave (rectangular wave or quasi square wave). In addition, as shown in FIG. 17B, the average value of the transformer secondary side current is controlled by modulating the transformer secondary side sub-module output voltage's DC composition.

Figure 18A:
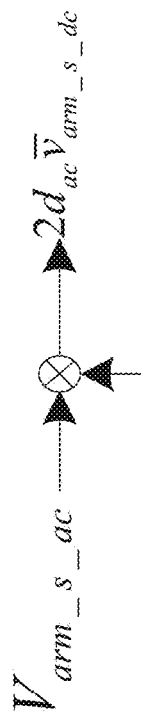
FIG. 18A is an illustration of a transformer primary side arm voltage modulation signal generation of the sinusoidal wave control diagram for the 3rd BESS topology, in accordance with an embodiment of the present invention.
Figure 18B:
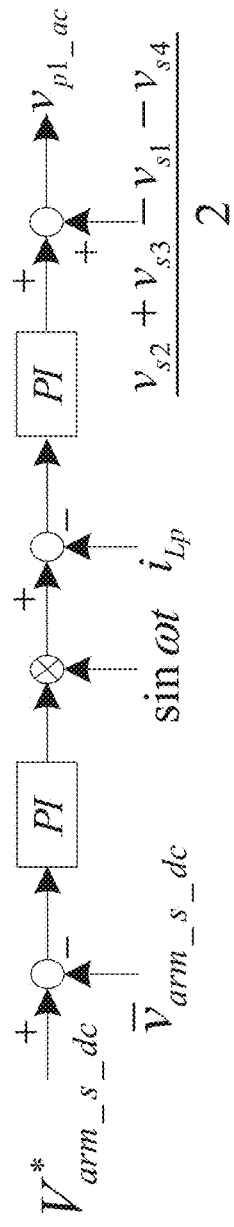
FIG. 18B is an illustration of a transformer secondary side arm ac voltage modulation signal generation of the sinusoidal wave control diagram for the 3rd BESS topology, in accordance with an embodiment of the present invention.
Figure 18C:
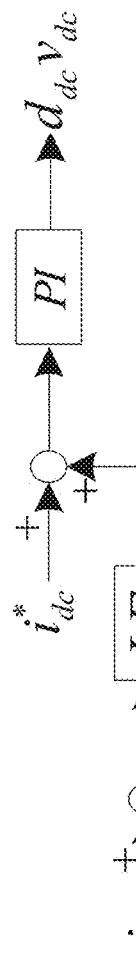
FIG. 18C is an illustration of a transformer secondary side arm dc voltage modulation signal generation of the sinusoidal wave control diagram for the 3rd BESS topology, in accordance with an embodiment of the present invention.

The control diagram for sinusoidal wave modulation is shown in FIG. 18A-FIG. 18C, wherein the average value of dc grid current $i_{dc}$ is controlled by modulating the transformer secondary side sub-module output voltage's dc composition, as shown in FIG. 18A, the average value of transformer secondary side sub-module dc capacitor voltage $v_{arm\_s1\_dc}$ is controlled by modulating the transformer primary side current $i_{Lp}$, as shown in FIG. 18B, and the transformer primary side current is controlled by modulating the transformer primary side arm voltage $v_{p1\_ac}$, as shown in FIG. 18C. Accordingly, with the proposed modulation strategy and control diagram, BESS's DC grid side current can be controlled precisely. In addition, not only the energy storage function, but also the active filter function, low voltage fault ride through function and current limiting function can be realized in the proposed BESS topology. As previously described with reference to the embodiment illustrated in FIG. 2, both full bridge sub-modules (FBSM) and half bridge sub-modules (HBSM) can serve as Arm_s1's sub-module topology. Under DC grid low voltage fault condition, in order to realize a low voltage fault ride through function, at least part of Arm_s1's sub-module should be a full bridge sub-module (FBSM).

Figure 19:
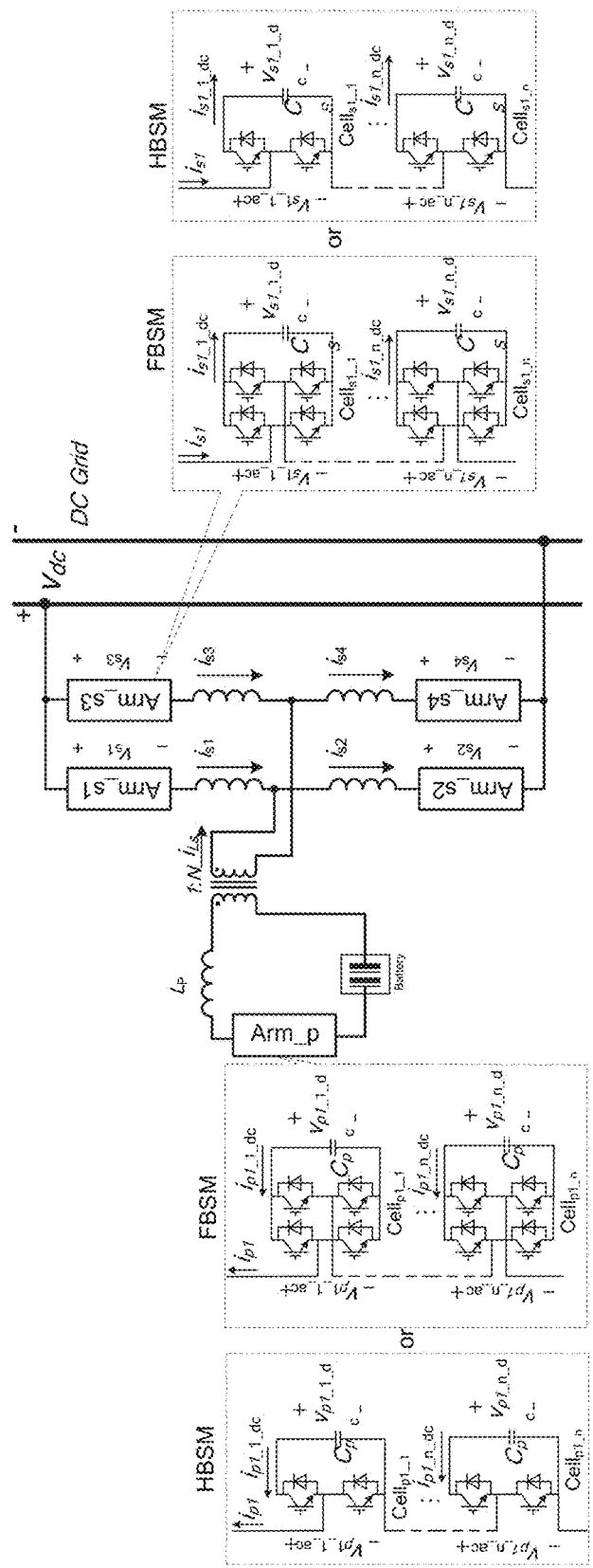
FIG. 19 is a schematic illustration of a fourth (4th) topology of a BESS, in accordance with an embodiment of the present invention.

A forth BESS topology 500 is illustrated, with reference to FIG. 19, which also achieves both energy storage and active filter functions. In the embodiment illustrated in FIG. 19, Arm_p1 510 with corresponding filter inductor Lp 550 and energy storage battery units 522 are connected to the primary side of high frequency AC transformer 505, Arm_s1 530, Arm_s2 532, Arm_s3 534 and Arm_s4 536 with their corresponding inductors Ls 555, 556, 557, 558 are connected between the DC grid voltage bus 560 and the secondary side of the transformer 505, respectively. Arm_p1 510 and Arm_si 532, 534, 536, 538 are comprised of sub-module cascaded branches 515, 517 and 535, 540, respectively. Each sub-module's topology 515, 517 and 535, 540 in both transformer primary side and secondary side can be not only full bridge sub-module (FBSM), but also half bridge sub-module (HBSM). Due to the modularized design, low voltage rated power devices can be used in this topology, which provide for a lower cost, lower loss and higher switching frequency. Like the embodiment illustrated in FIG. 7, when batteries or ultra-capacitors 570, 572, 574, 576 are also connected to the DC side of each sub-module 515, 517 separately in Arm_p1 510, hybrid energy storage system can be realized.

$$v_{p1} = \tag{27}$$
$$v_{p1\_dc} + v_{p1\_ac} = \sum_{i=1}^{m} v_{p1\_i\_ac} = \sum_{i=1}^{m} d_{p1\_i} v_{p1\_i\_dc} = d_{p1} \sum_{i=1}^{m} v_{p1\_i\_dc} =$$
$$d_{p1} v_{arm\_p1\_dc} = d_{p1\_dc} v_{arm\_p1\_dc} + d_{p1\_ac} v_{arm\_p1\_dc}$$

$$v_{si(i=1\ldots 4)} = v_{si\_dc} + v_{si\_ac} = \sum_{k=1}^{n} v_{si\_k\_ac} = \sum_{k=1}^{m} d_{si\_k} v_{si\_k\_dc} = \tag{28}$$
$$d_{si} \sum_{k=1}^{m} v_{si\_k\_dc} = d_{si} v_{arm\_si\_dc} = (d_{si\_dc} + d_{si\_ac}) v_{arm\_si\_dc}$$

$$i_{p1\_dc} = \frac{1}{m} \sum_{i=1}^{m} i_{p1\_i\_dc} = \frac{1}{m} \sum_{i=1}^{m} d_{p1\_i} i_{p1\_i\_ac} = d_{p1} i_{p1} = d_{p1} i_{Lp} \tag{29}$$

$$i_{si(i=1\ldots 4)\_dc} = \frac{1}{n} \sum_{k=1}^{n} i_{si(i=1\ldots 4)\_k\_dc} = \tag{30}$$
$$\frac{1}{n} \sum_{k=1}^{n} d_{si(i=1\ldots 4)\_k} i_{si(i=1\ldots 4)\_k\_ac} = d_{si(i=1\ldots 4)} i_{si(i=1\ldots 4)}$$

The voltage and current equation of the embodiment illustrated with reference to FIG. 19 are shown in equations (27) to (30), where $v_{p1\_i\_dc}$ and $v_{s1\_i\_dc}$ denote energy storage battery unit's voltage and DC capacitor's voltage in each sub-module of Arm_p1 510 and Arm_s1 530, respectively, $v_{p1\_i\_ac}$ and $v_{s1\_i\_ac}$ denote the output voltage in each sub-module of Arm_p1 510 and Arm_s1 530, respectively, $i_{p1\_i\_dc}$ and $i_{s1\_i\_dc}$ denote energy storage battery unit's current and DC capacitor's current in each sub-module of Arm_p1 510 and Arm_s1 530, respectively, $i_{p1\_i\_ac}$ and $i_{s1\_i\_ac}$ denote the output voltage in each sub-module of Arm_p1 510 and Arm_s1 530, respectively, $d_{p1\_i}$ and $d_{s1\_i}$ denote average duty cycle in each sub-module of Arm_p1 510 and Arm_s1 530, respectively, $v_{arm\_p1\_dc}$ denotes the voltage sum of energy storage battery unit in each sub-module of Arm_p1 510, $v_{arm\_s1\_dc}$ denotes the voltage sum of DC capacitor in each sub-module of Arm_s1 530, $v_{p1\_dc}$ and $v_{p1\_ac}$ denote the DC component and AC component of Arm_p1's 410 output voltage, respectively, and $v_{s1\_dc}$ and $v_{s1\_ac}$ denote the DC component and AC component of Arm_s1's 430 output voltage, respectively.

Figure 20:
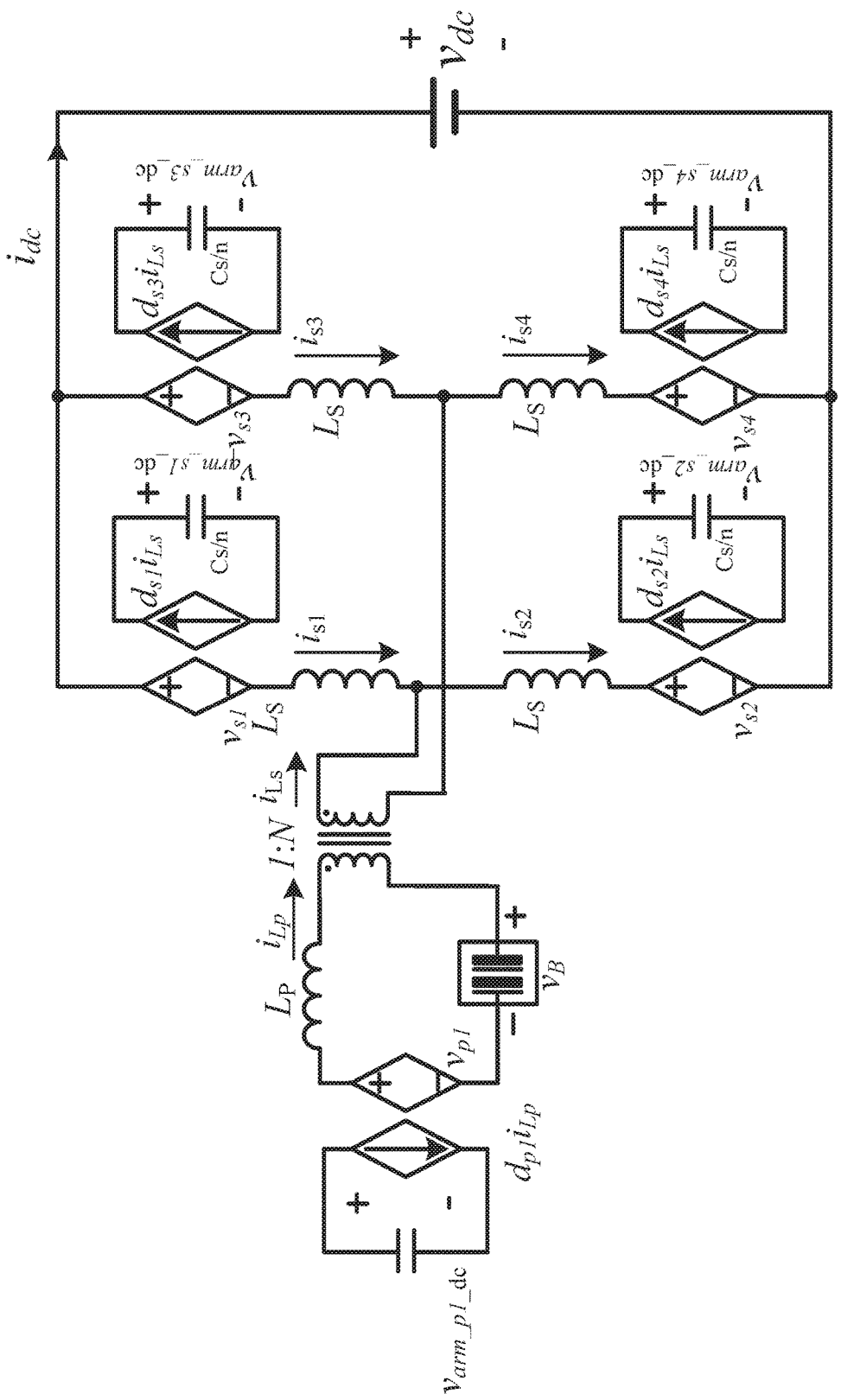
FIG. 20 is an illustration of the average model for the 4th BESS topology, in accordance with an embodiment of the present invention.

According to the voltage and current equation which are shown in (27) to (30), the average model of the forth topology can be derived as shown in FIG. 20. The state equation of which can be derived as, $$\begin{cases} \frac{di_{Ls}}{dt} = \frac{1}{(L_S + N^2 L_p)} \left( \frac{v_{s1} - v_{s2} - v_{s3} + v_{s4}}{2} + N v_{p1} - N v_B \right) \\ \frac{di_{dc}}{dt} = \frac{1}{L_S} \left( \frac{v_{s1} + v_{s2} + v_{s3} + v_{s4}}{2} - v_{dc} \right) \\ \frac{di_{s1}}{dt} = \frac{1}{2L_S}(v_{dc} - v_{s1} - v_{s2}) - \frac{1}{2(L_S + N^2 L_p)} \\ \quad \left( \frac{v_{s1} - v_{s2} - v_{s3} + v_{s4}}{2} + N v_{p1} - N v_B \right) \\ \frac{C_S}{n} \frac{dv_{arm\_si\_dc}}{dt} = d_{Si} i_{Si} \quad i = 1 \ldots 4 \end{cases} \tag{31}$$

When the converter is under ideal control, the arm current should be, $$\begin{cases} i_{s1\_ideal} = -\frac{i_{dc} + i_{Ls}}{2} \\ i_{s2\_ideal} = -\frac{i_{dc} - i_{Ls}}{2} \\ i_{s3\_ideal} = -\frac{i_{dc} - i_{Ls}}{2} \\ i_{s4\_ideal} = -\frac{i_{dc} + i_{Ls}}{2} \end{cases} \tag{32}$$

Then the error current between the actual current and ideal current in each arm can be defined as, $$\begin{cases} i_{s1\_error} = i_{s1} - i_{s1\_ideal} = i_{s1} + \frac{i_{dc} + i_{Ls}}{2} \\ i_{s2\_error} = i_{s2} - i_{s2\_ideal} = i_{s2} + \frac{i_{dc} - i_{Ls}}{2} \\ i_{s3\_error} = i_{s3} - i_{s3\_ideal} = i_{s3} + \frac{i_{dc} - i_{Ls}}{2} \\ i_{s4\_error} = i_{s4} - i_{s4\_ideal} = i_{s4} + \frac{i_{dc} + i_{Ls}}{2} \end{cases} \tag{33}$$

Considering, $$\begin{cases} i_{s2} = i_{s1} + i_{Ls} \\ i_{s4} = i_{s3} - i_{Ls} \\ i_{s1} + i_{s3} = -i_{dc} \end{cases} \tag{34}$$

Then, $$\begin{cases} i_{s1\_error} = i_{s2\_error} \\ i_{s3\_error} = i_{s4\_error} \\ i_{s1\_error} = -i_{s3\_error} \end{cases} \tag{35}$$

Combining (31) and (33), the state equation of FIG. 20 can be derived as, $$\begin{cases} \frac{di_{Ls}}{dt} = \frac{1}{(L_S + N^2 L_p)} \left( \frac{v_{s1} - v_{s2} - v_{s3} + v_{s4}}{2} + N v_{p1} - N v_B \right) \\ \frac{di_{dc}}{dt} = \frac{1}{L_S} \left( \frac{v_{s1} + v_{s2} + v_{s3} + v_{s4}}{2} - v_{dc} \right) \\ \frac{di_{s1\_error}}{dt} = \frac{1}{L_S} \left( \frac{-v_{s1} - v_{s2} + v_{s3} + v_{s4}}{4} \right) \\ \frac{C_S}{n} \frac{dv_{arm\_si\_dc}}{dt} = d_{Si}(i_{si\_error} + i_{si\_ideal}) \quad i = 1 \ldots 4 \end{cases} \tag{36}$$

Combining (28), (31) and (33), the duty cycle in each arm can be derived as, $$\begin{cases} d_{s1} = d_{s1\_dc} - d_{s1\_ac} = d_{s1\_error} + d_{s1\_ideal} = d_{s1\_error} + \dfrac{d_{dc} - d_{ac}}{2} \\ d_{s2} = d_{s2\_dc} + d_{s2\_ac} = d_{s2\_error} + d_{s2\_ideal} = d_{s2\_error} + \dfrac{d_{dc} + d_{ac}}{2} \\ d_{s3} = d_{s3\_dc} + d_{s3\_ac} = d_{s3\_error} + d_{s3\_ideal} = d_{s3\_error} + \dfrac{d_{dc} + d_{ac}}{2} \\ d_{s4} = d_{s4\_dc} + d_{s4\_ac} = d_{s4\_error} + d_{s4\_ideal} = d_{s4\_error} + \dfrac{d_{dc} - d_{ac}}{2} \end{cases} \quad (37)$$

Combining (36) and (37), the state equation of arm capacitor voltage can be expressed as, $$\frac{C_s}{n} \frac{dv_{arm\_s1\_dc}}{dt} = (d_{si\_error} + d_{si\_ideal})(i_{si\_error} + i_{si\_ideal}) = \quad (38)$$

$$\frac{d_{ac} \cdot i_{Ls} + d_{ac} \cdot i_{dc} - d_{dc} \cdot i_{dc} - d_{dc} \cdot i_{Ls}}{4} +$$

$$\frac{d_{dc} - d_{ac}}{2} i_{si\_error} + d_{si\_error} i_{si}$$

$$\frac{C_s}{n} \frac{d \sum_{i=1}^{4} v_{arm\_si\_dc}}{dt} = \frac{C_s}{4n} \frac{d\bar{v}_{arm\_s\_dc}}{dt} = \quad (39)$$

$$\sum_{i=1}^{4} (d_{si\_error} + d_{si\_ideal})(i_{si\_error} + i_{si\_ideal}) = d_{s\_ac} \cdot i_{Ls} - d_{s\_dc} \cdot i_{dc} +$$

$$\sum_{j=1}^{4} (d_{si\_error} i_{si\_error} + d_{si\_ideal} i_{si\_error} + d_{si\_error} i_{si\_ideal})$$

Then the average model can be re-expressed as shown in FIG. 21A and FIG. 21B, wherein FIG. 21A illustrates the simplified average capacitor voltage model and FIG. 21B illustrates the simplified average inductor current model.

Because there are a plurality of energy storage cells in each arm, there are also many modulation freedoms in this topology, including square wave modulation, rectangular wave modulation, quasi square wave modulation and sinusoidal wave modulation, which are shown with reference to FIG. 22A, FIG. 22B, FIG. 22C and FIG. 22D, respectively.

Figure 23A:
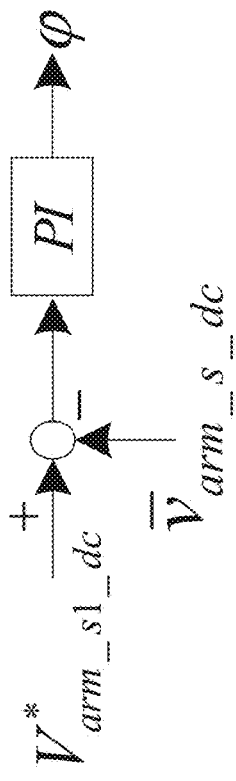
FIG. 23A is an illustration of a phase shift angle generation for the 4th BESS topology, in accordance with an embodiment of the present invention.
Figure 23B:
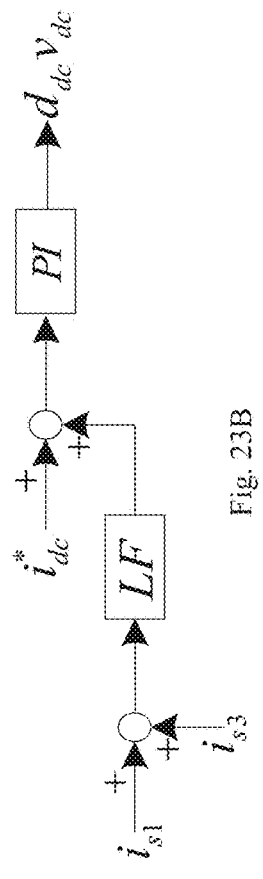
FIG. 23B is an illustration of a transformer secondary side arm DC voltage modulation signal generation for the 4th BESS topology, in accordance with an embodiment of the present invention.
Figure 23C:
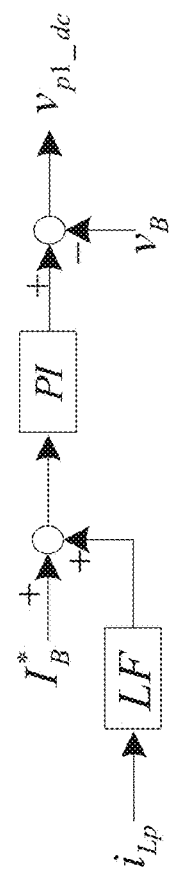
FIG. 23C is an illustration of a transformer primary side arm DC voltage modulation signal generation for the 4th BESS topology, in accordance with an embodiment of the present invention.

Depending upon the number of sub-modules, voltage rating and power device characteristics of the converter, trade-off analysis regarding loss, cost and control characteristics can be performed to select the proper modulation scheme. It can be seen from FIG. 22A-FIG. 22C that square wave modulation, rectangular wave modulation and quasi square wave modulation are accompanied by a phase shift control strategy. The phase shift control diagram is shown with reference to FIG. 23A, wherein the average value of the transformer secondary side sub-module DC capacitor voltage is controlled by modulating the phase shift angle φ between the transformer primary side square wave (rectangular wave or quasi square wave) and the transformer secondary side square wave (rectangular wave or quasi square wave). In addition, as shown in FIG. 23B, the average value of the transformer secondary side current is controlled by modulating the transformer secondary side sub-module output voltage's DC composition and, as shown in FIG. 23C, the average value of battery charging or discharging current is controlled by modulating Arm_p1 output voltage's DC composition.

Figure 24A:
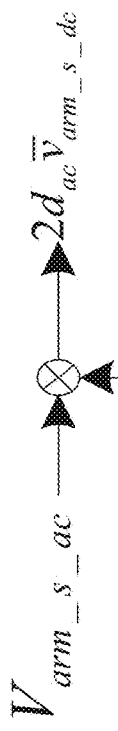
FIG. 24A is an illustration of a transformer secondary side arm AC voltage modulation signal generation of the sinusoidal wave control diagram for the 4th BESS topology, in accordance with an embodiment of the present invention.
Figure 24B:
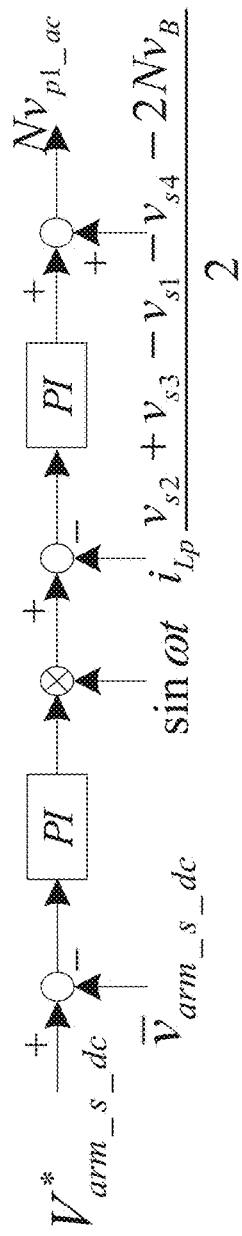
FIG. 24B is an illustration of a primary side arm voltage modulation signal generation of the sinusoidal wave control diagram for the 4th BESS topology, in accordance with an embodiment of the present invention.
Figure 24C:
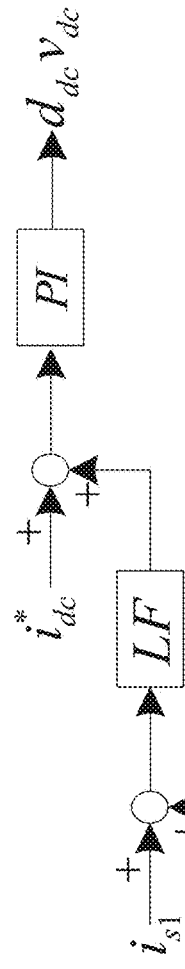
FIG. 24C is an illustration of a transformer secondary side arm DC voltage modulation signal generation of the sinusoidal wave control diagram for the 4th BESS topology, in accordance with an embodiment of the present invention.

The control diagram for sinusoidal wave modulation is shown in FIG. 24A-FIG. 24C, wherein the average value of DC grid current $i_{dc}$ is controlled by modulating the transformer secondary side sub-module output voltage's dc com-position, as shown in FIG. 24A, the average value of transformer secondary side sub-module dc capacitor voltage $v_{arm\_si\_dc}$ is controlled by modulating the transformer primary side current $i_{Lp}$, as shown in FIG. 24B, and the transformer primary side current is controlled by modulating the transformer primary side arm voltage $v_{p1\_ac}$, as shown in FIG. 24C. Accordingly, with the proposed modulation strategy and control diagram, BESS's DC grid side current can be controlled precisely. In addition, not only the energy storage function, but also the active filter function, low voltage fault ride through function and current limiting function can be realized in the proposed BESS topology. As previously described with reference to the embodiment illustrated in FIG. 2, both full bridge sub-modules (FBSM) and half bridge sub-modules (HBSM) can serve as Arm_s1's sub-module topology. Under DC grid low voltage fault condition, in order to realize a low voltage fault ride through function, at least part of Arm_s1's sub-module should be a full bridge sub-module (FBSM).

Figure 25:
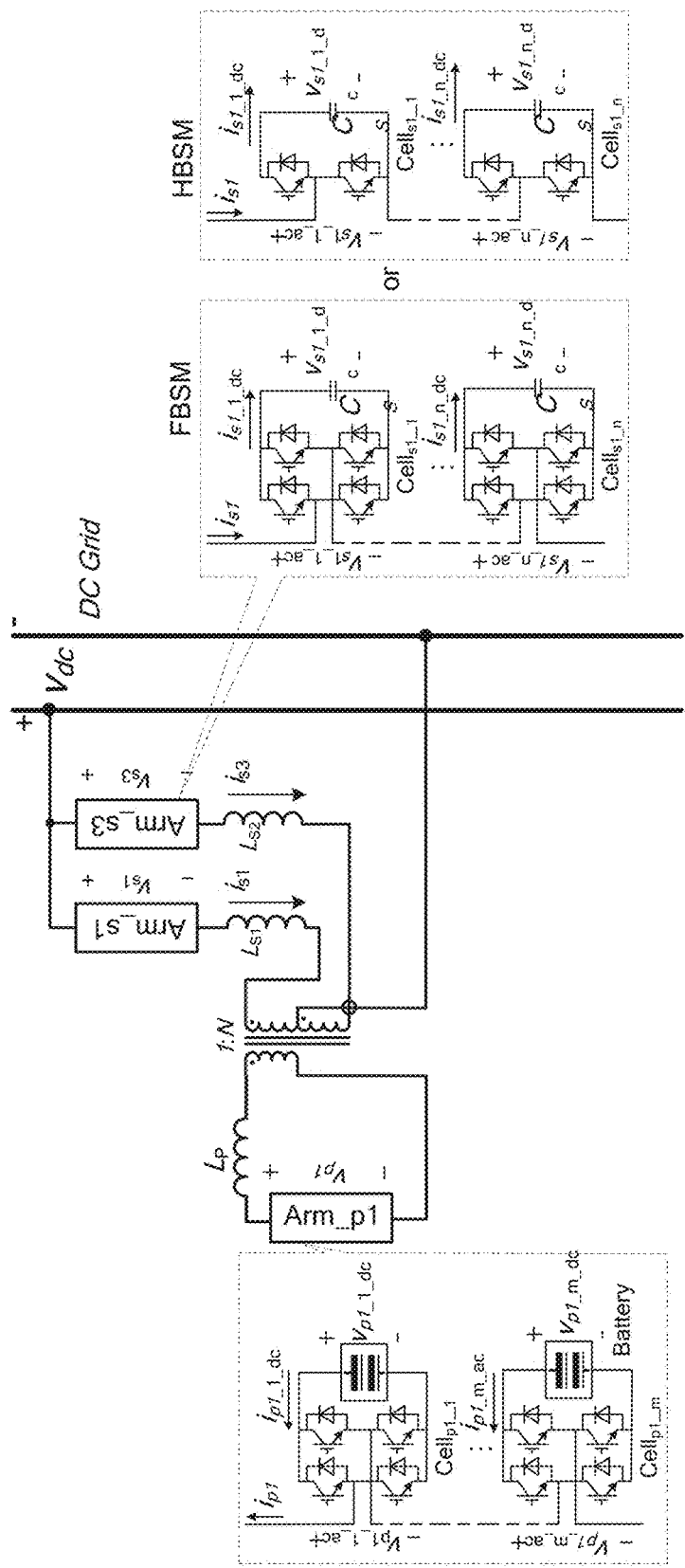
FIG. 25 is a schematic illustration of a fifth ($5^{th}$) topology of a BESS, in accordance with an embodiment of the present invention.
Figure 26:
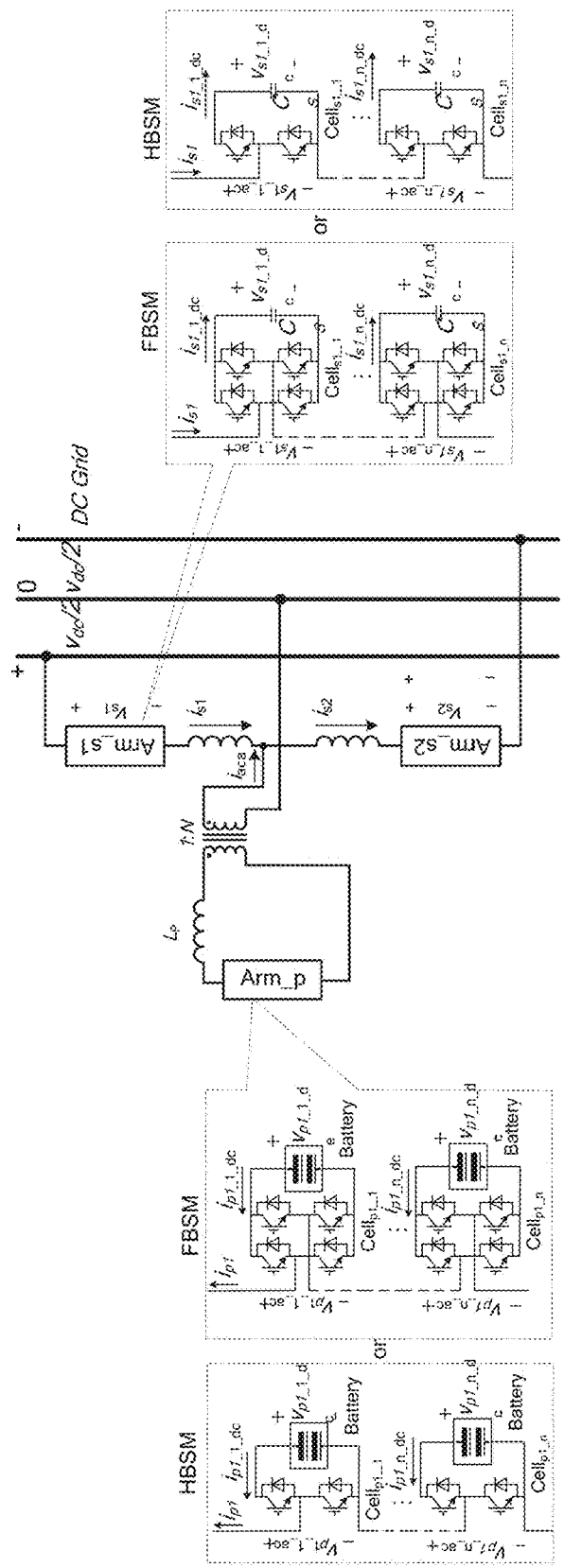
FIG. 26 is a schematic illustration of a $6^{th}$ topology for a BESS, in accordance with an embodiment of the present invention.
Figure 27:
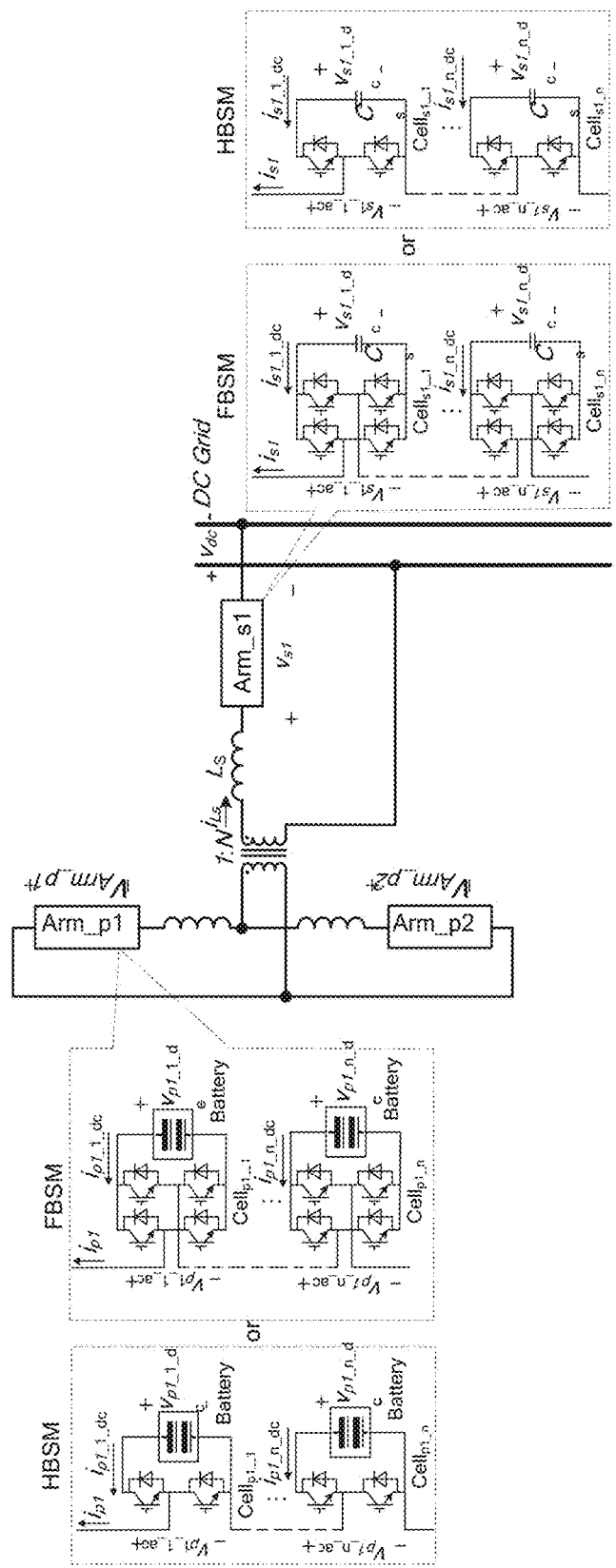
FIG. 27 is a schematic illustration of a $7^{th}$ topology for a BESS, in accordance with an embodiment of the present invention.
Figure 28:
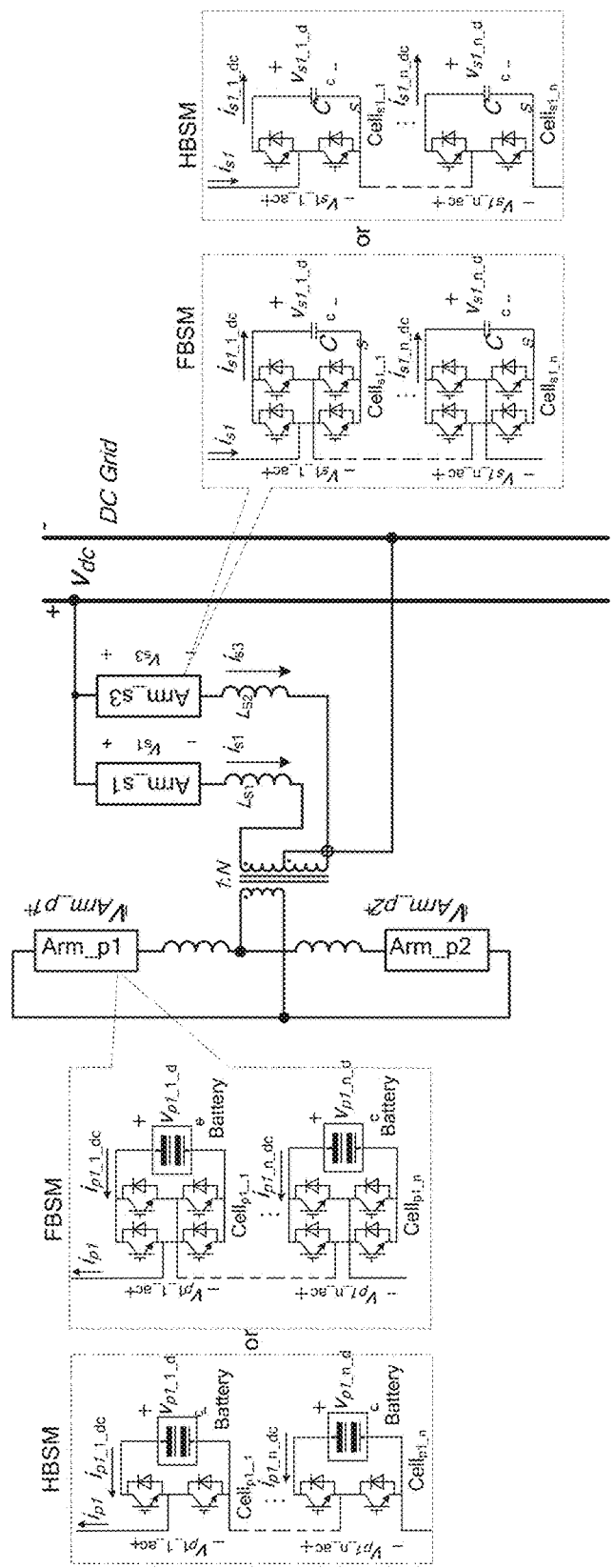
FIG. 28 is a schematic illustration of a $8^{th}$ topology for a BESS, in accordance with an embodiment of the present invention.
Figure 29:
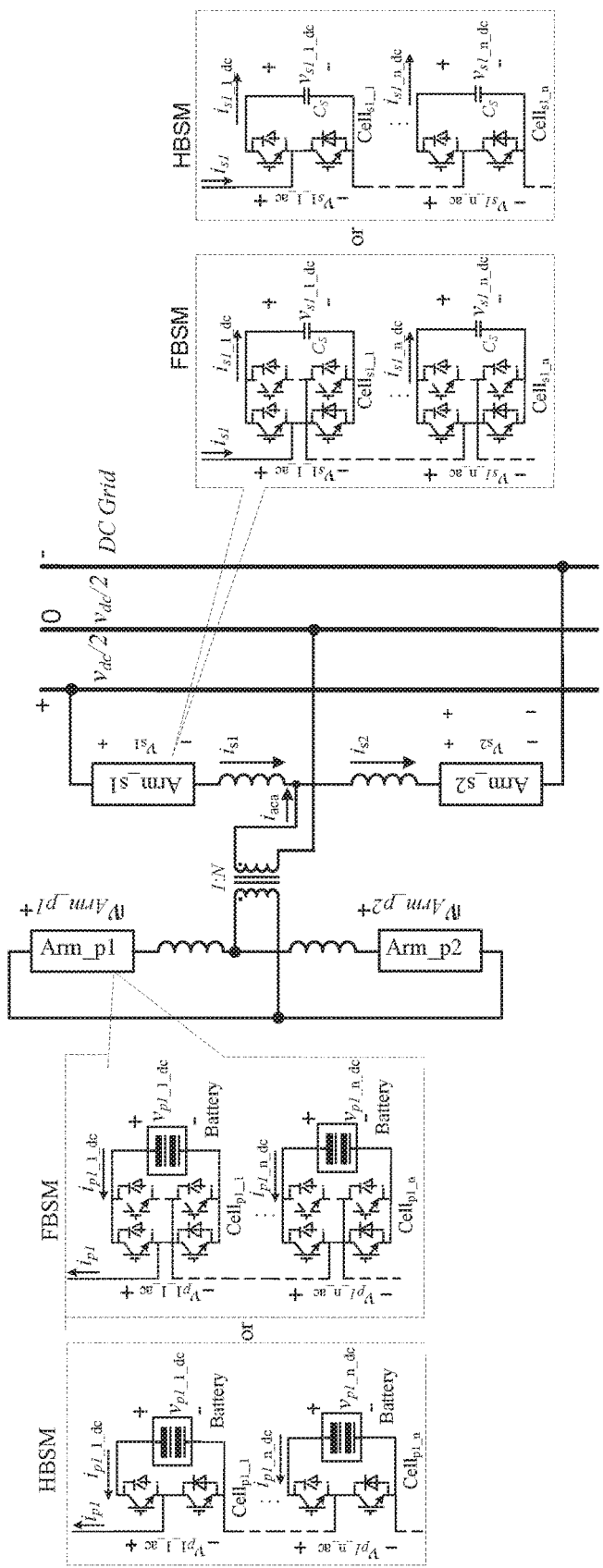
FIG. 29 is a schematic illustration of a $9^{th}$ topology for a BESS, in accordance with an embodiment of the present invention.
Figure 30:
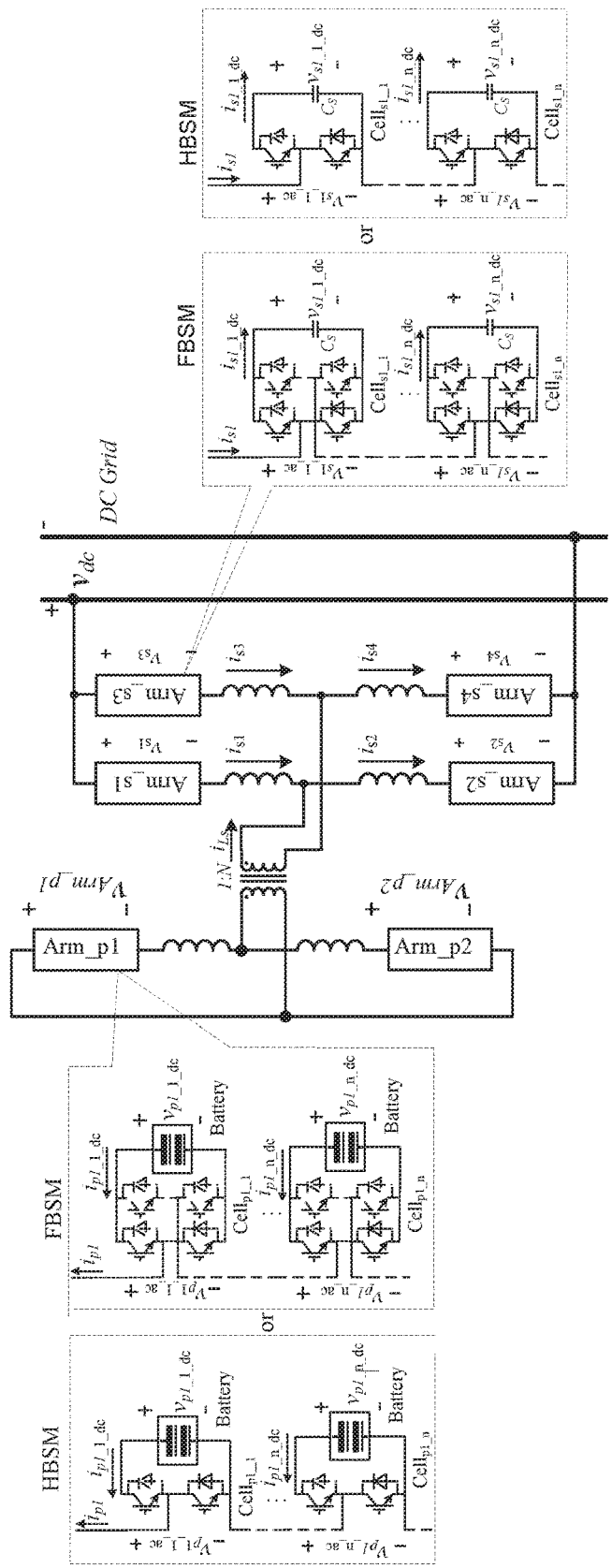
FIG. 30 is a schematic illustration of a $10^{th}$ topology for a BESS, in accordance with an embodiment of the present invention.
Figure 31:
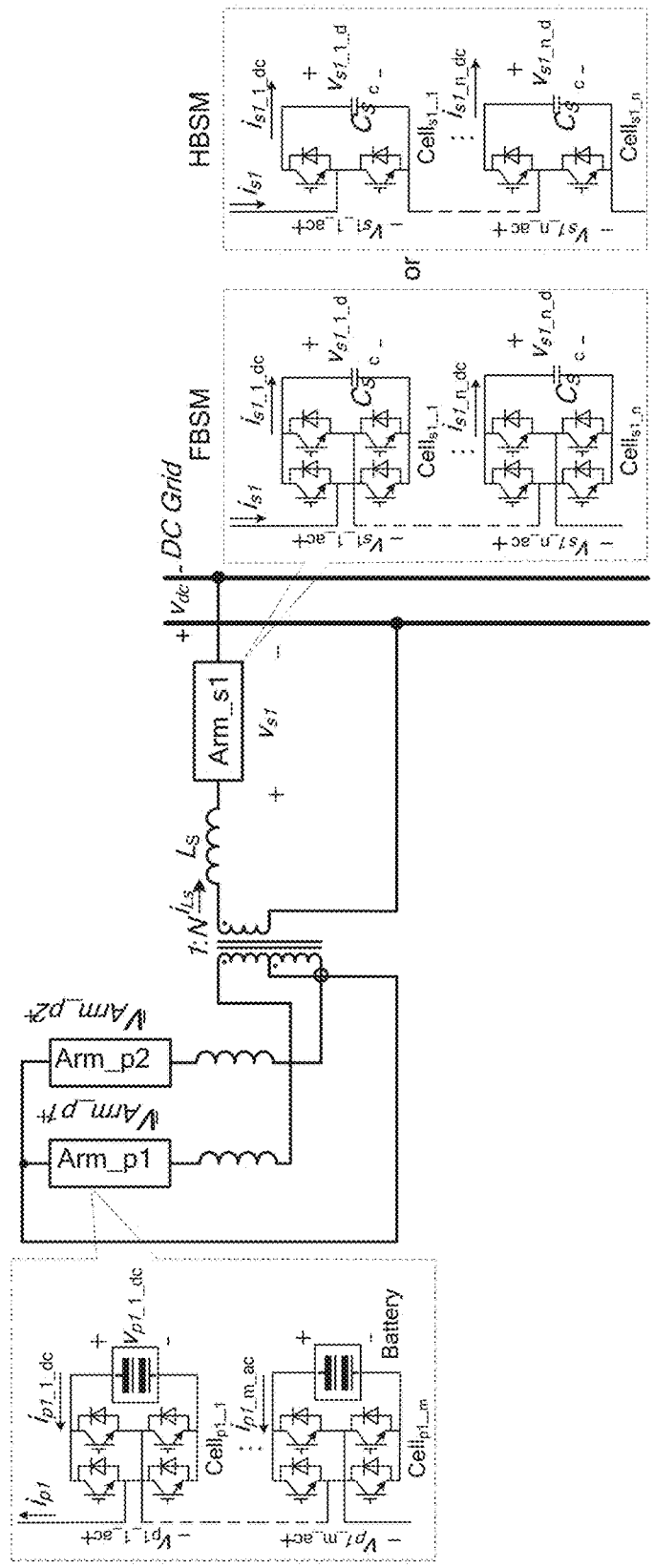
FIG. 31 is a schematic illustration of a $11^{th}$ topology for a BESS, in accordance with an embodiment of the present invention.
Figure 32:
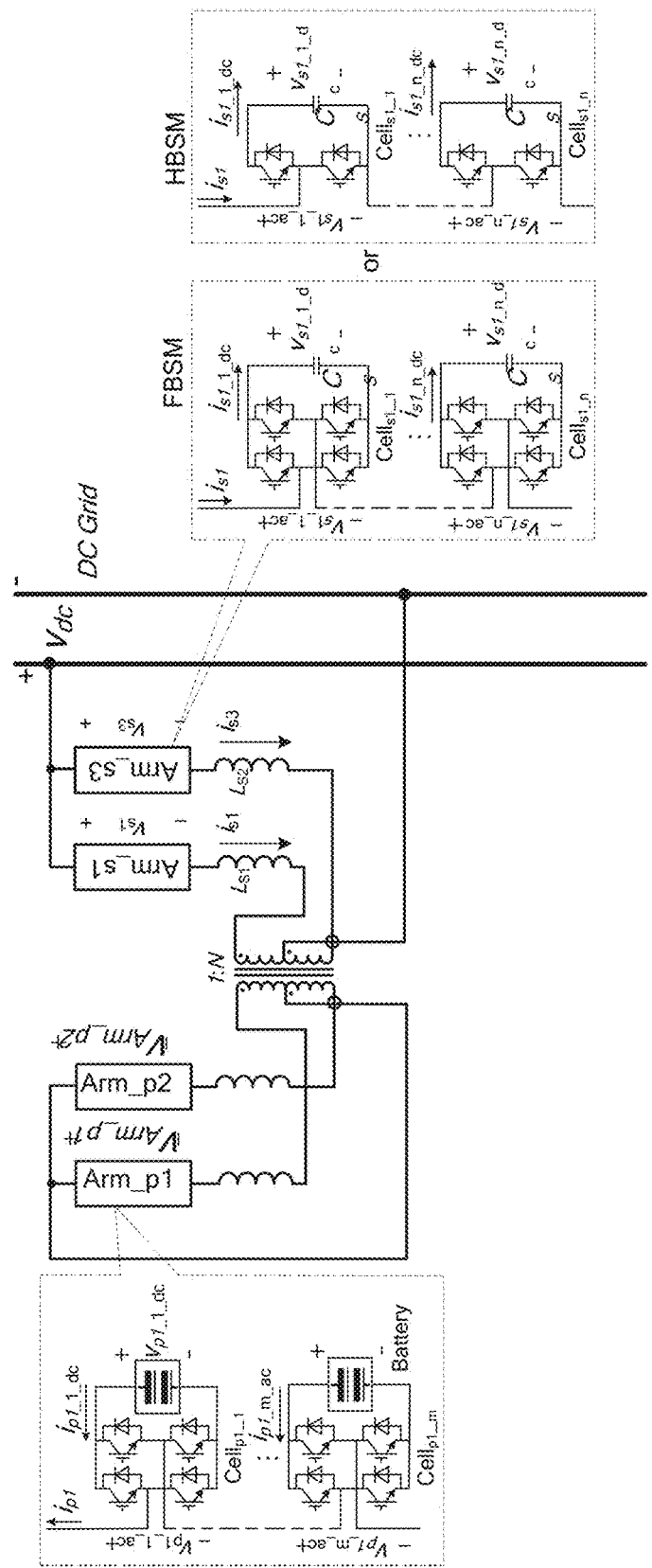
FIG. 32 is a schematic illustration of a $12^{th}$ topology for a BESS, in accordance with an embodiment of the present invention.
Figure 33:
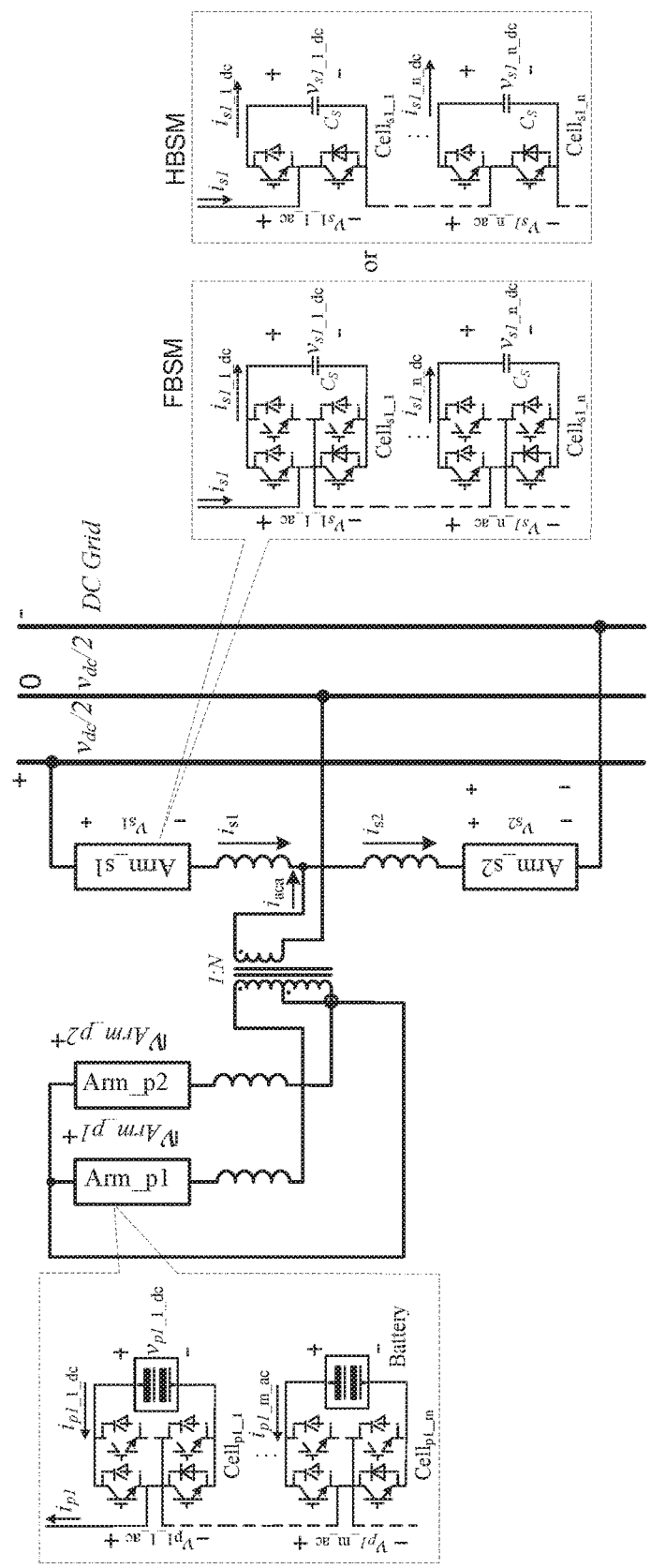
FIG. 33 is a schematic illustration of a $13^{th}$ topology for a BESS, in accordance with an embodiment of the present invention.
Figure 34:
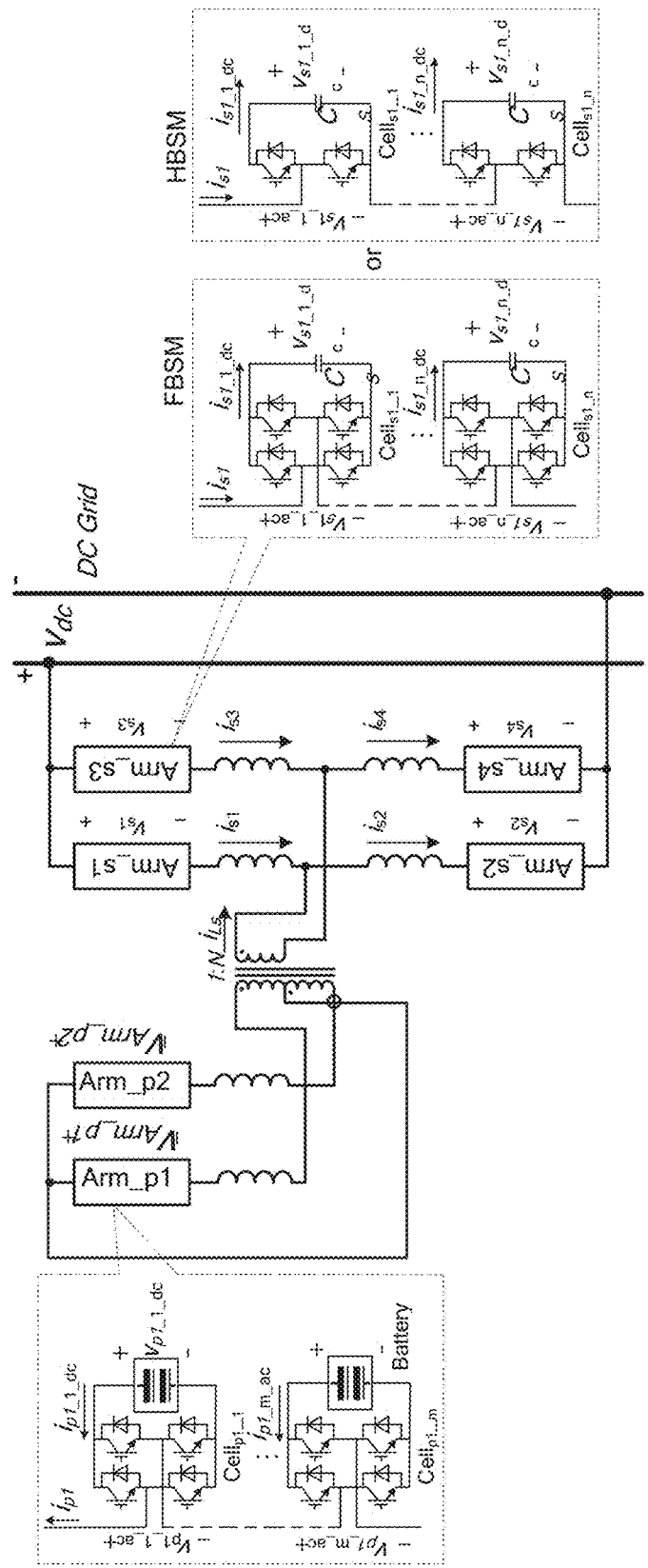
FIG. 34 is a schematic illustration of a $14^{th}$ topology for a BESS, in accordance with an embodiment of the present invention.
Figure 35:
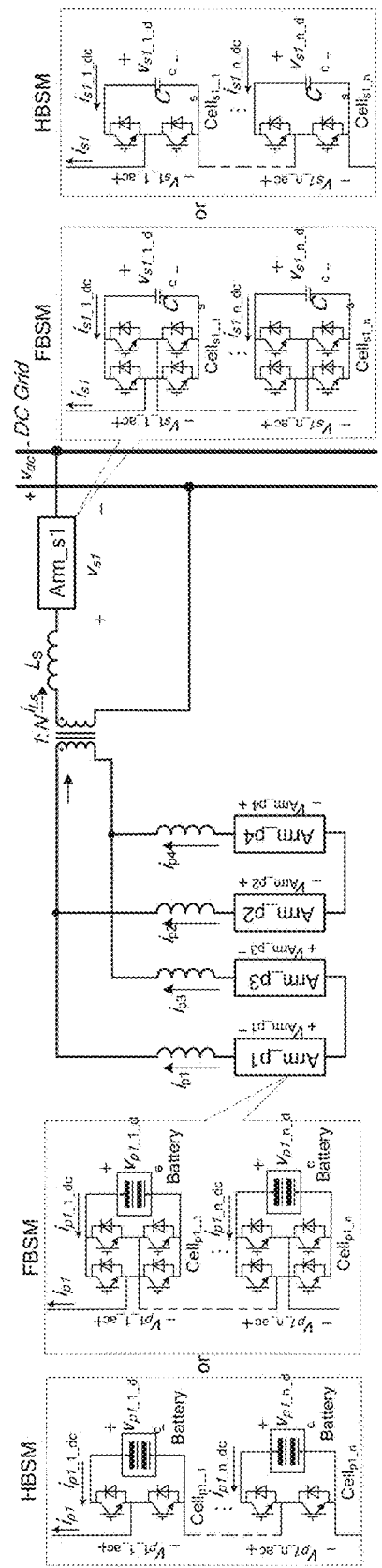
FIG. 35 is a schematic illustration of a $15^{th}$ topology for a BESS, in accordance with an embodiment of the present invention.
Figure 36:
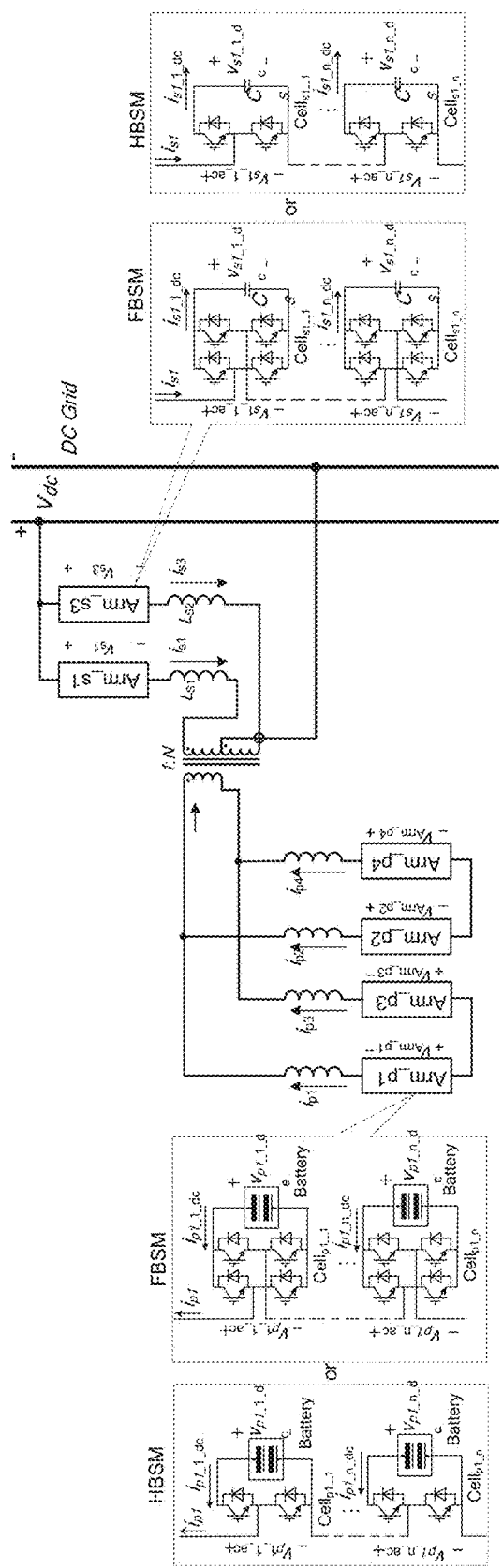
FIG. 36 is a schematic illustration of a $16^{th}$ topology for a BESS, in accordance with an embodiment of the present invention.
Figure 37:
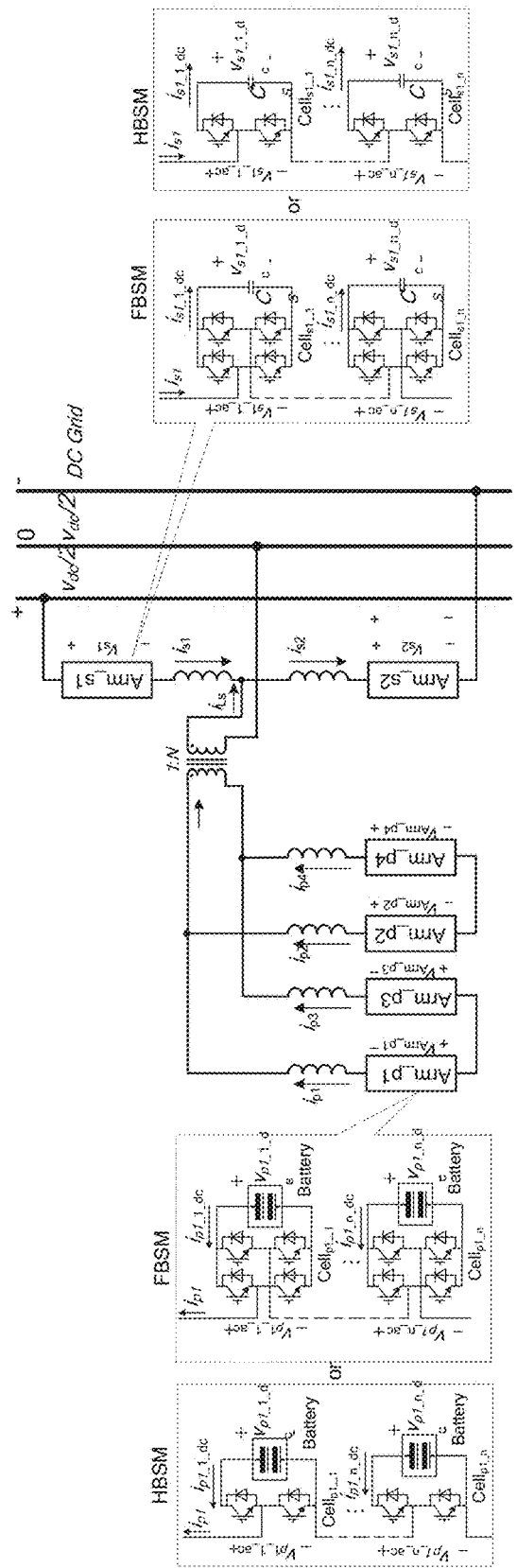
FIG. 37 is a schematic illustration of a $17^{th}$ topology for a BESS, in accordance with an embodiment of the present invention.
Figure 38:
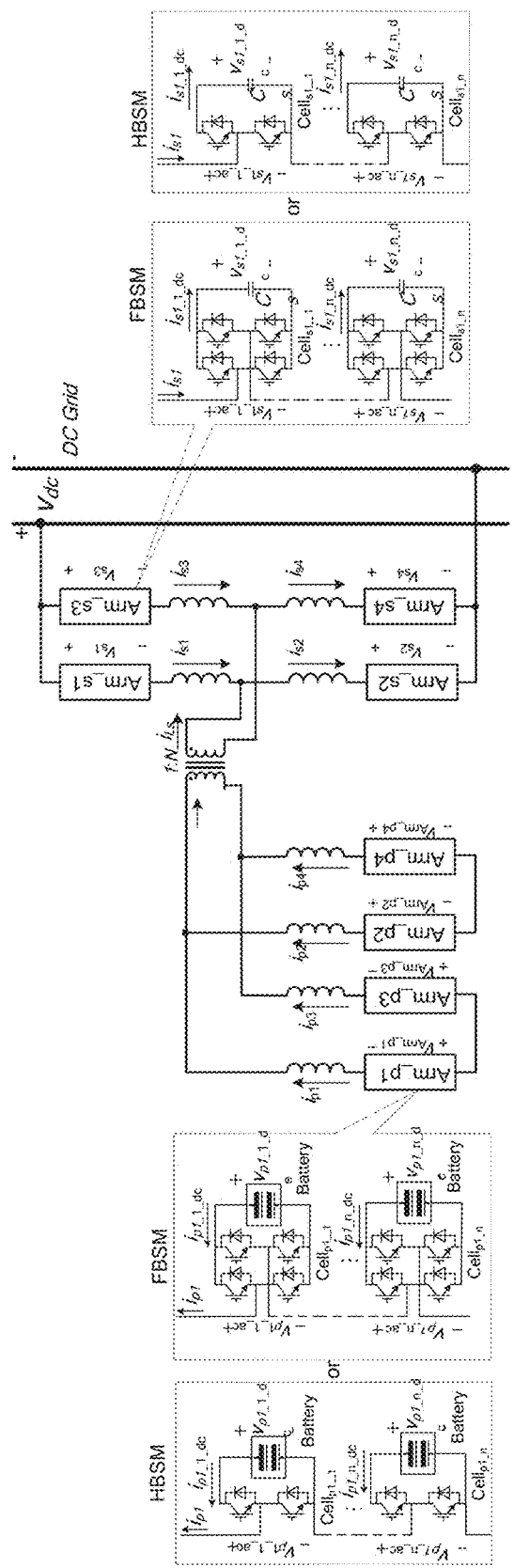
FIG. 38 is a schematic illustration of a $18^{th}$ topology for a BESS, in accordance with an embodiment of the present invention.
Figure 39:
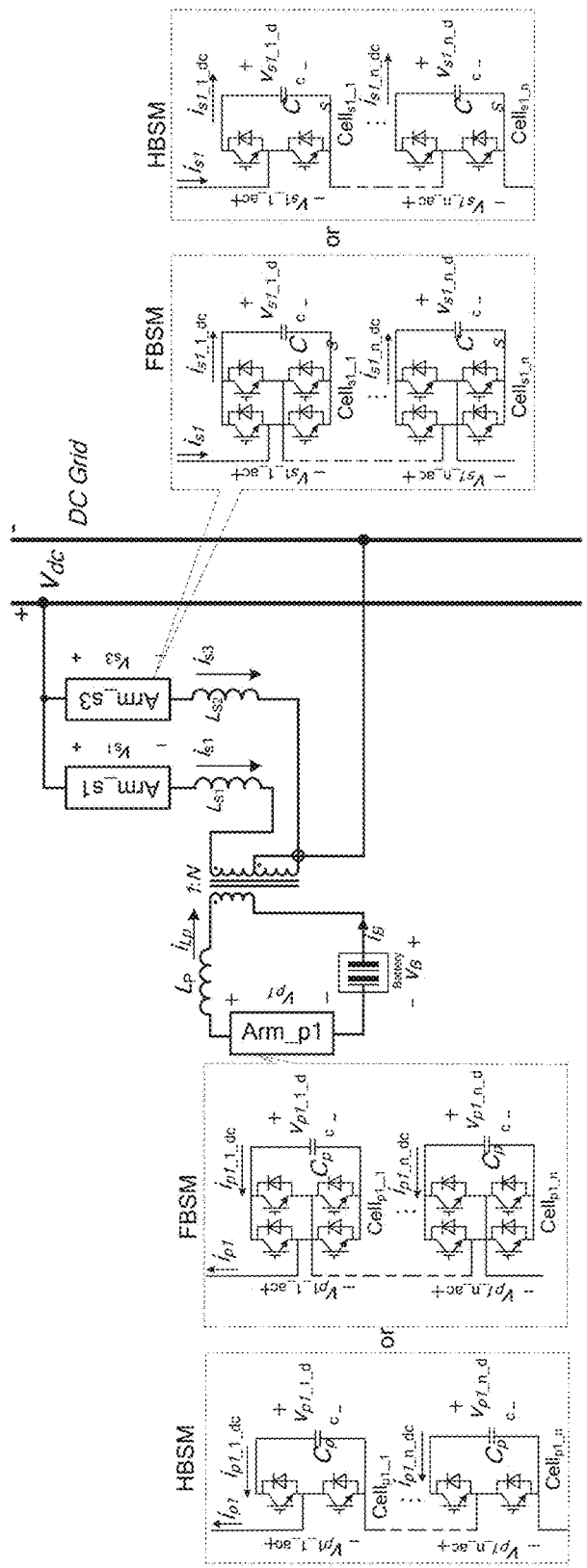
FIG. 39 is a schematic illustration of a $19^{th}$ topology for a BESS, in accordance with an embodiment of the present invention.
Figure 40:
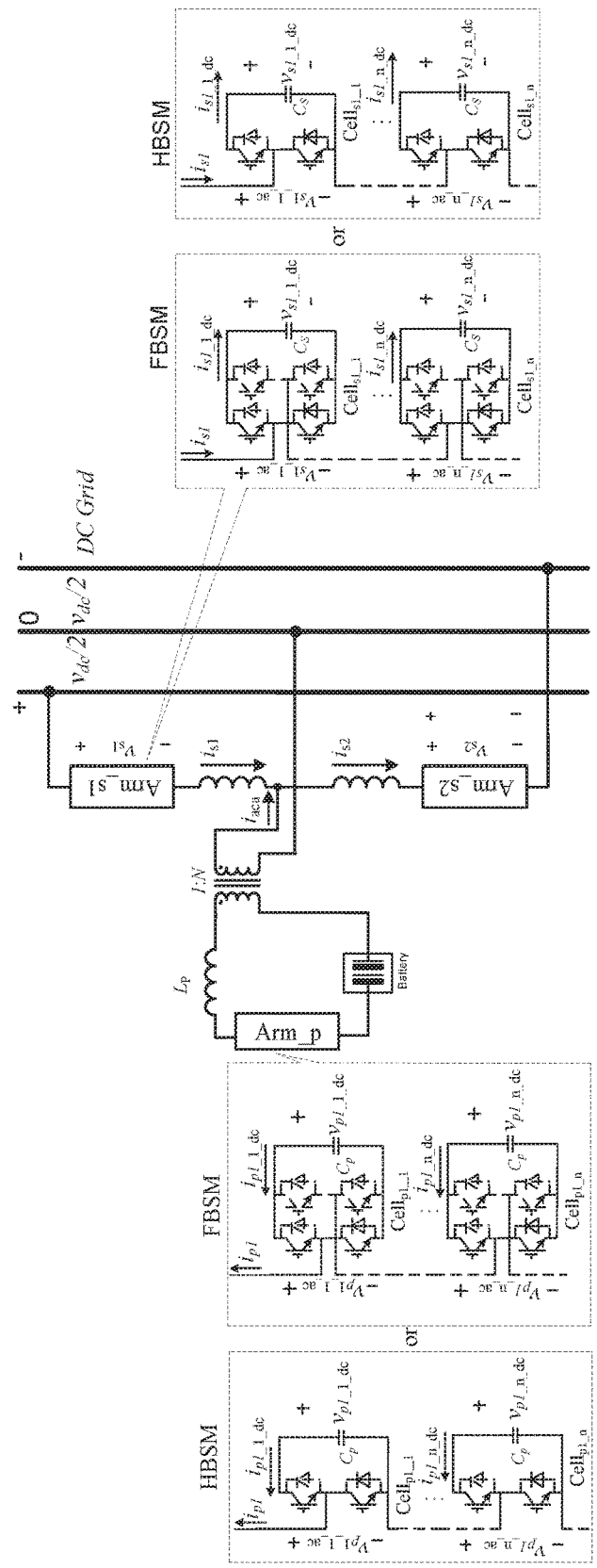
FIG. 40 is a schematic illustration of a $20^{th}$ topology for a BESS, in accordance with an embodiment of the present invention.
Figure 41:
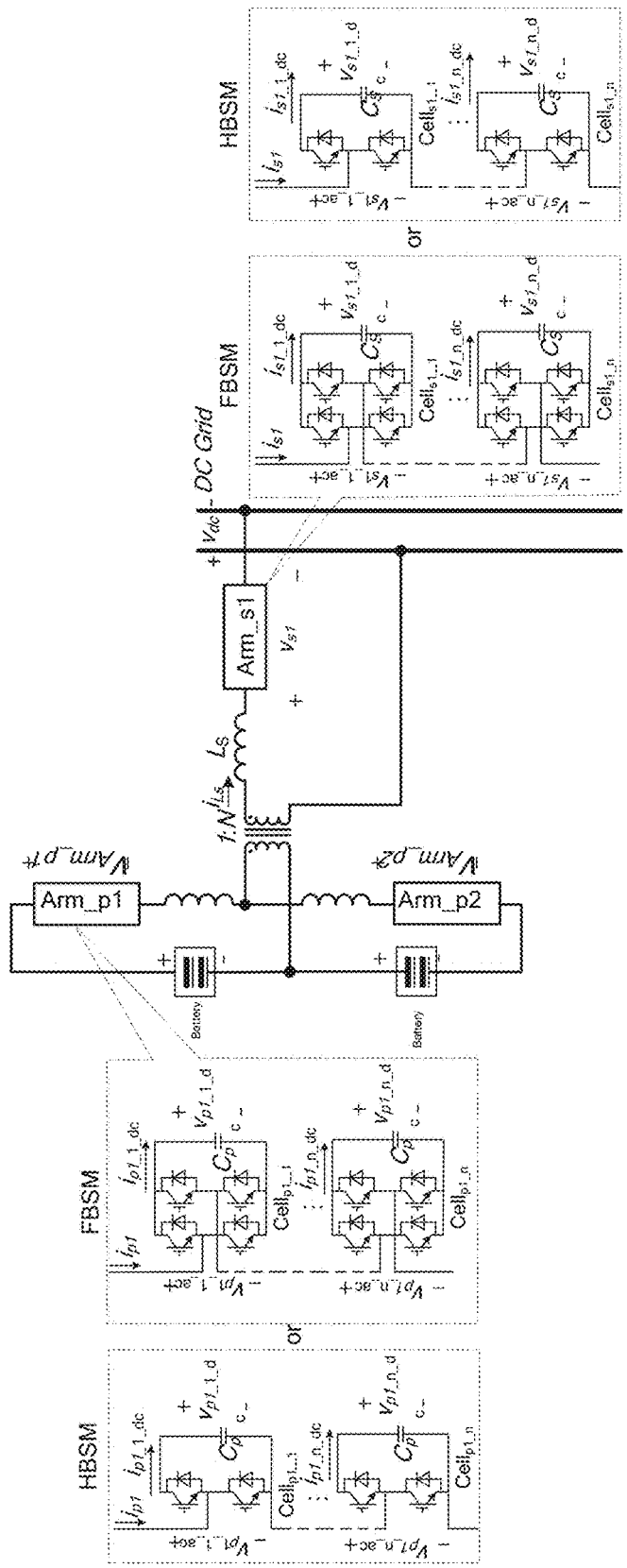
FIG. 41 is a schematic illustration of a $21^{st}$ topology for a BESS, in accordance with an embodiment of the present invention.
Figure 42:
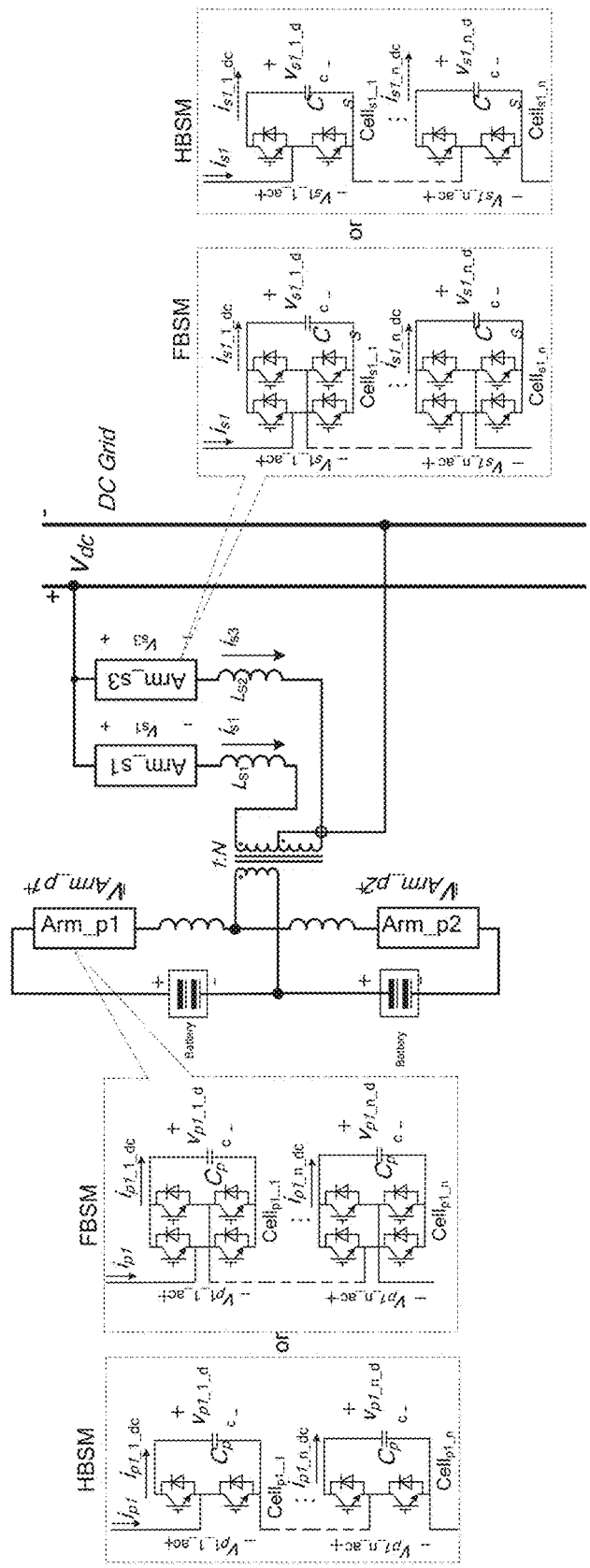
FIG. 42 is a schematic illustration of a $22^{nd}$ topology for a BESS, in accordance with an embodiment of the present invention.
Figure 43:
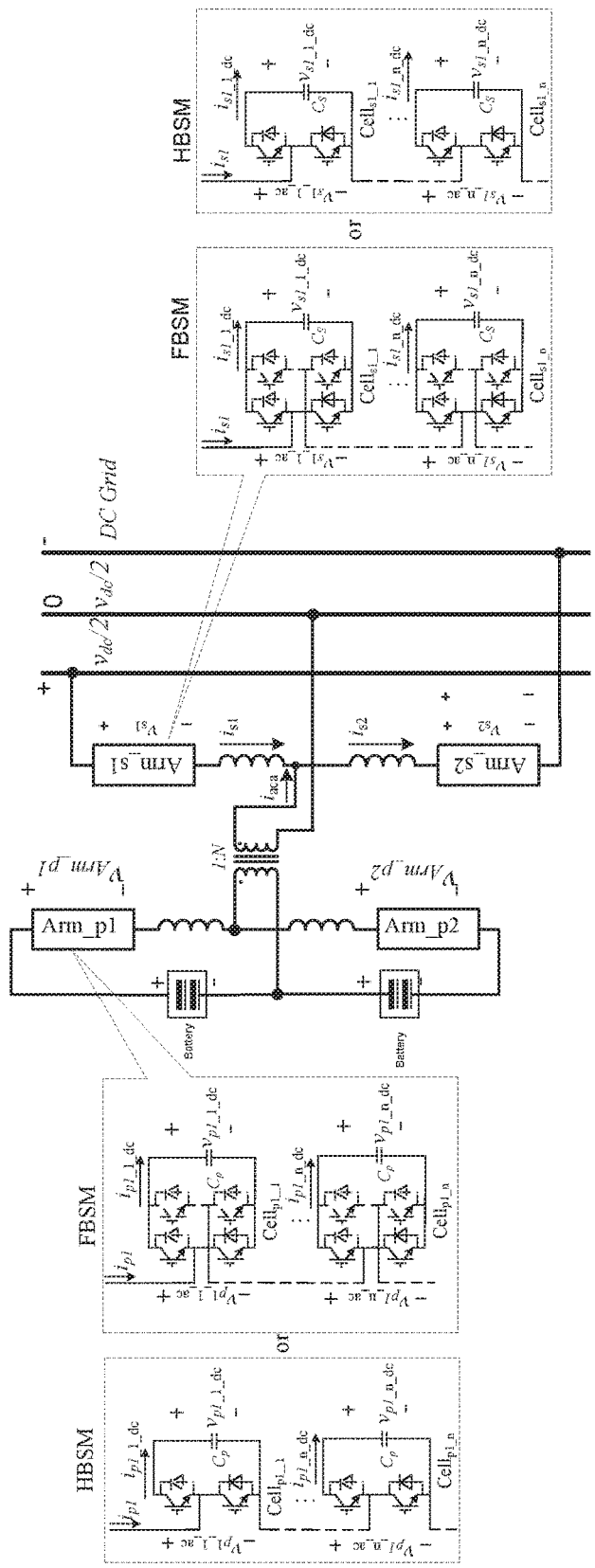
FIG. 43 is a schematic illustration of a $23^{rd}$ topology for a BESS, in accordance with an embodiment of the present invention.
Figure 44:
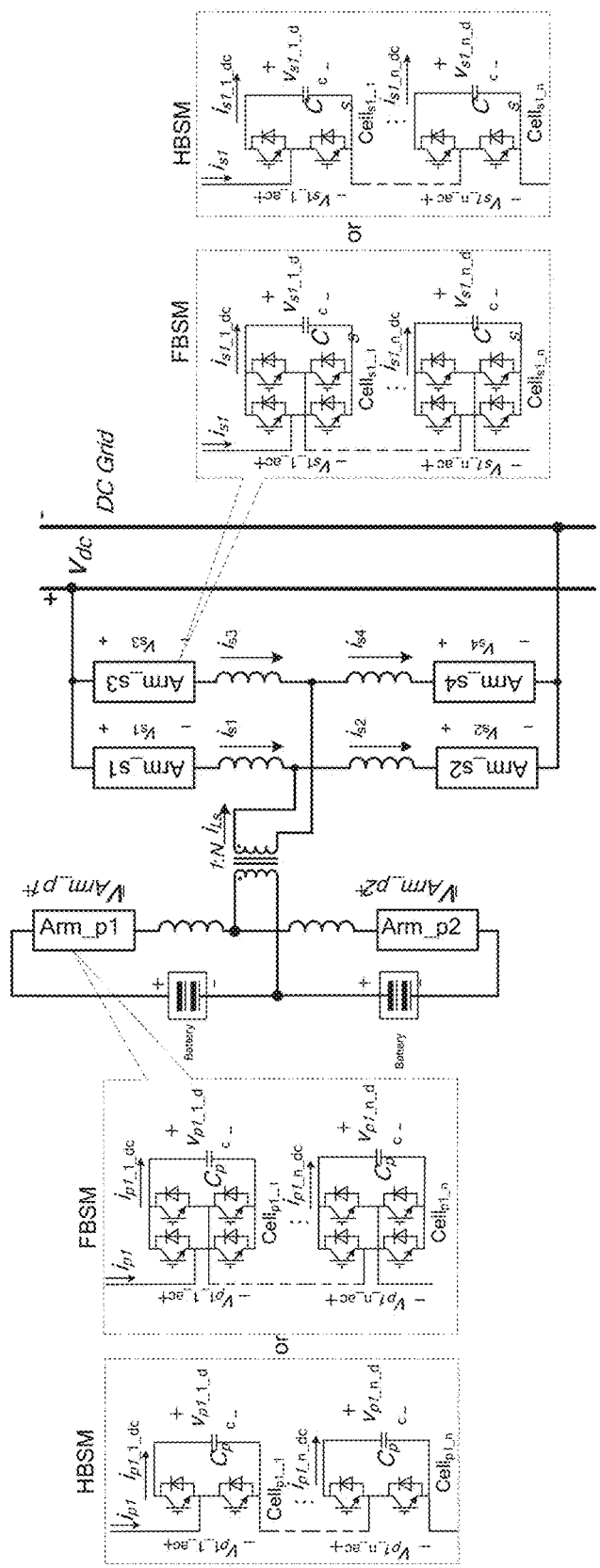
FIG. 44 is a schematic illustration of a $24^{th}$ topology for a BESS, in accordance with an embodiment of the present invention.
Figure 45:
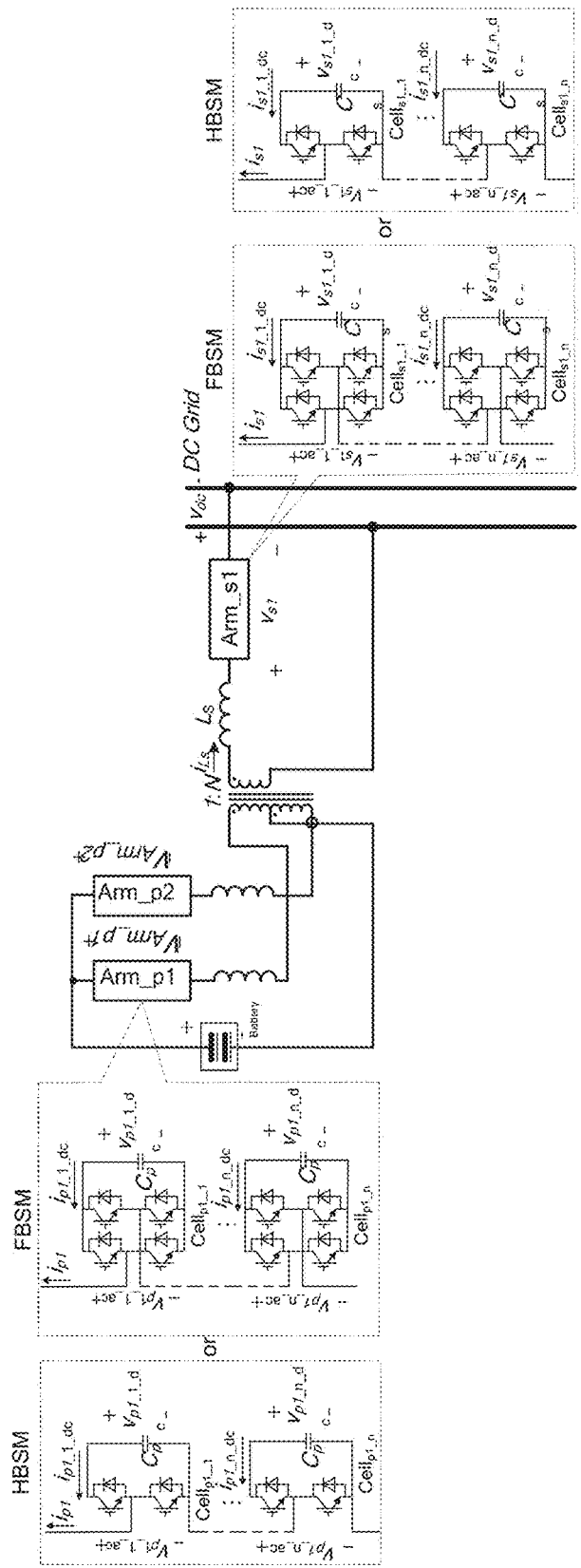
FIG. 45 is a schematic illustration of a $25^{th}$ topology for a BESS, in accordance with an embodiment of the present invention.
Figure 46:
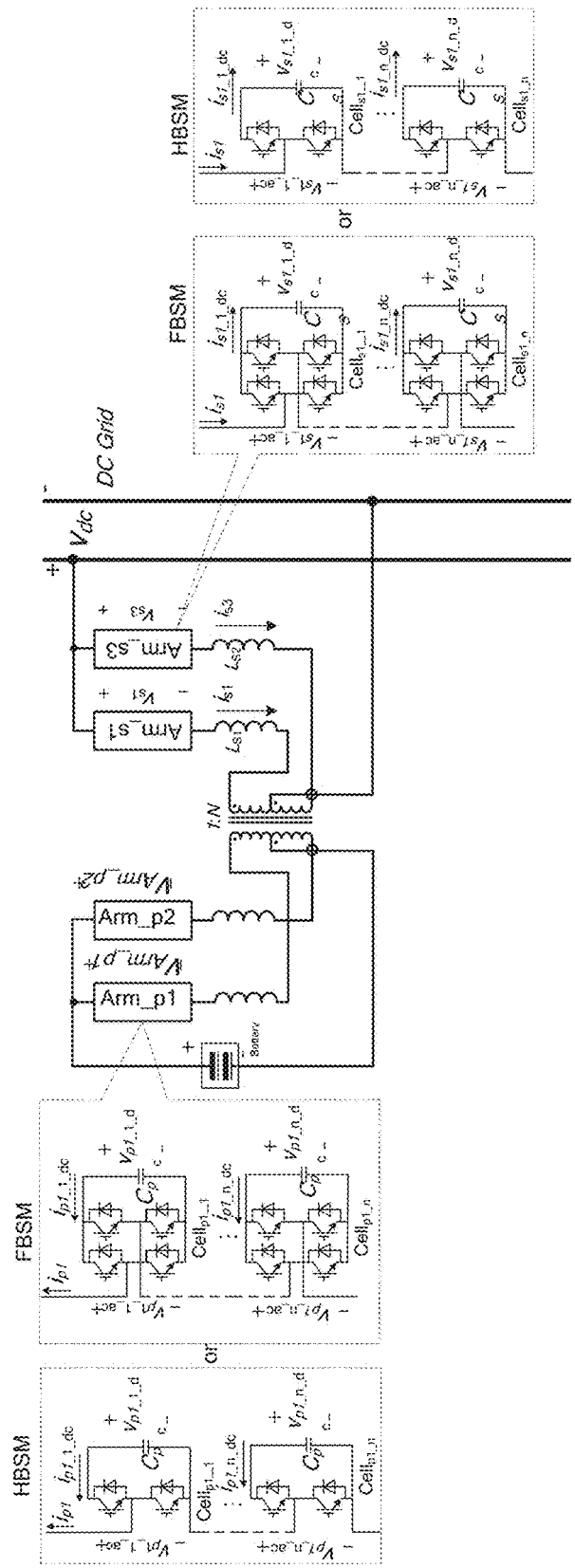
FIG. 46 is a schematic illustration of a $26^{th}$ topology for a BESS, in accordance with an embodiment of the present invention.
Figure 47:
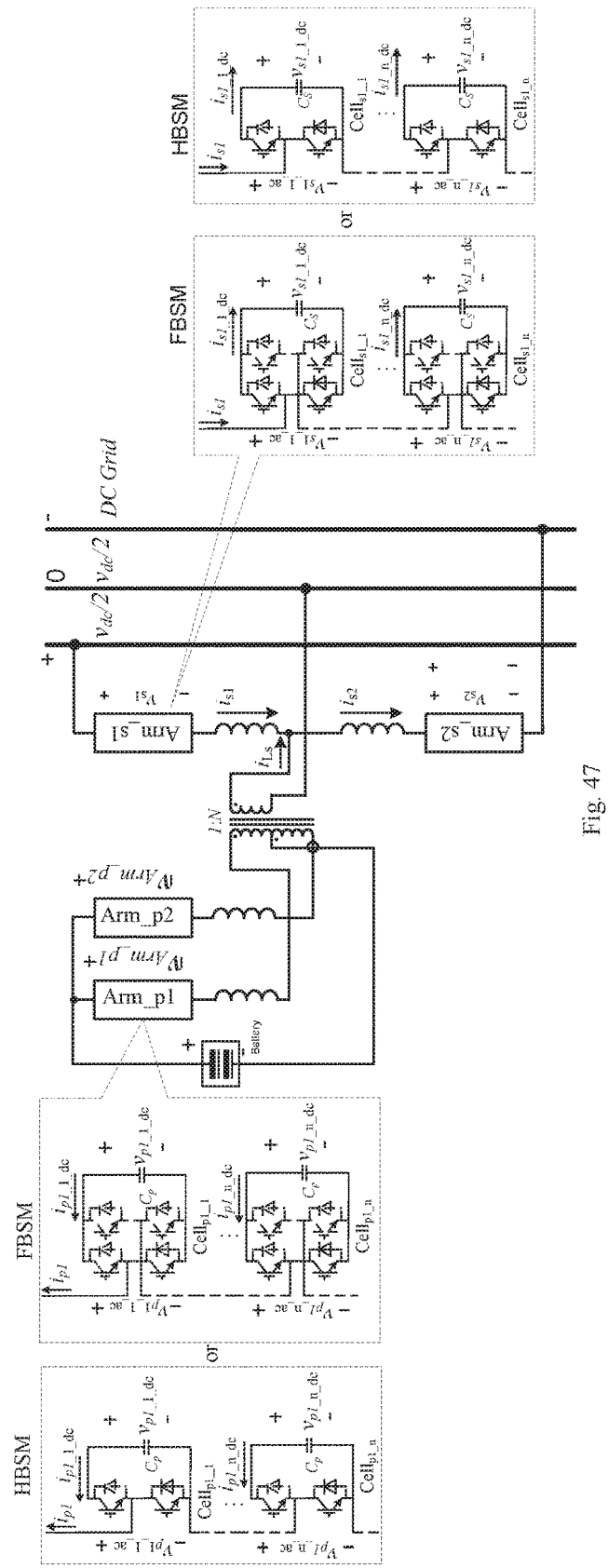
FIG. 47 is a schematic illustration of a $27^{th}$ topology for a BESS, in accordance with an embodiment of the present invention.
Figure 48:
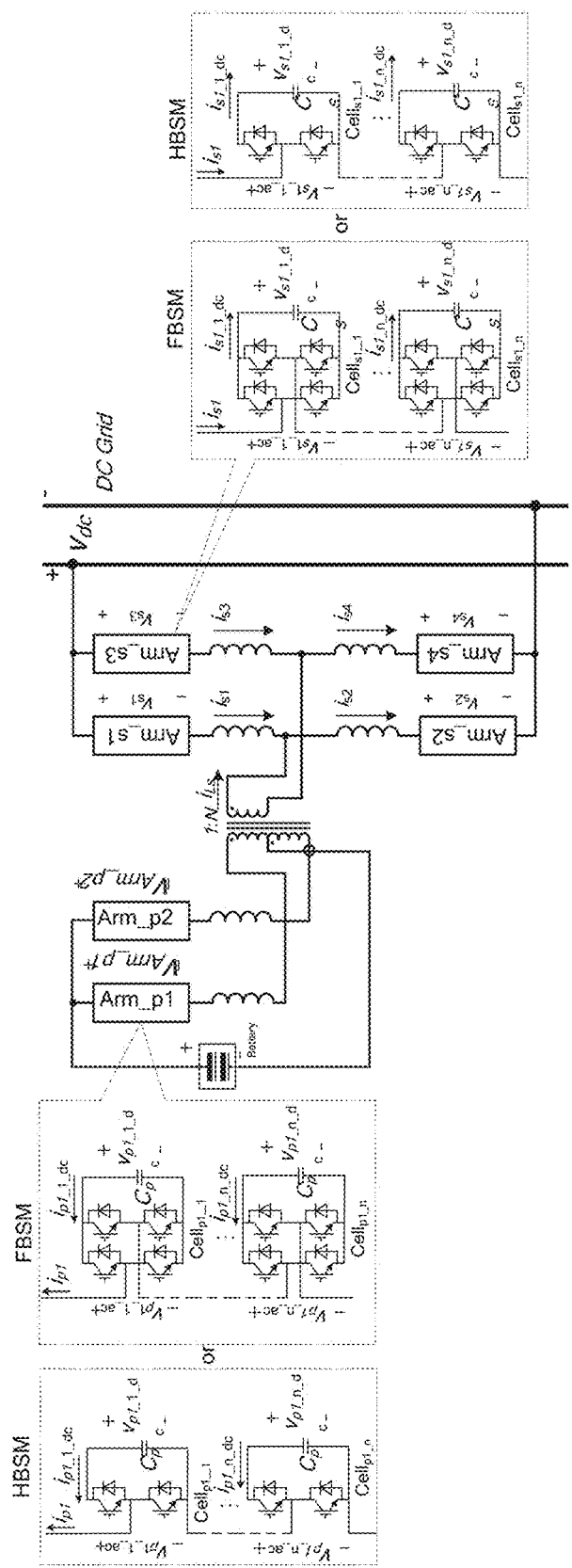
FIG. 48 is a schematic illustration of a $28^{th}$ topology for a BESS, in accordance with an embodiment of the present invention.
Figure 49:
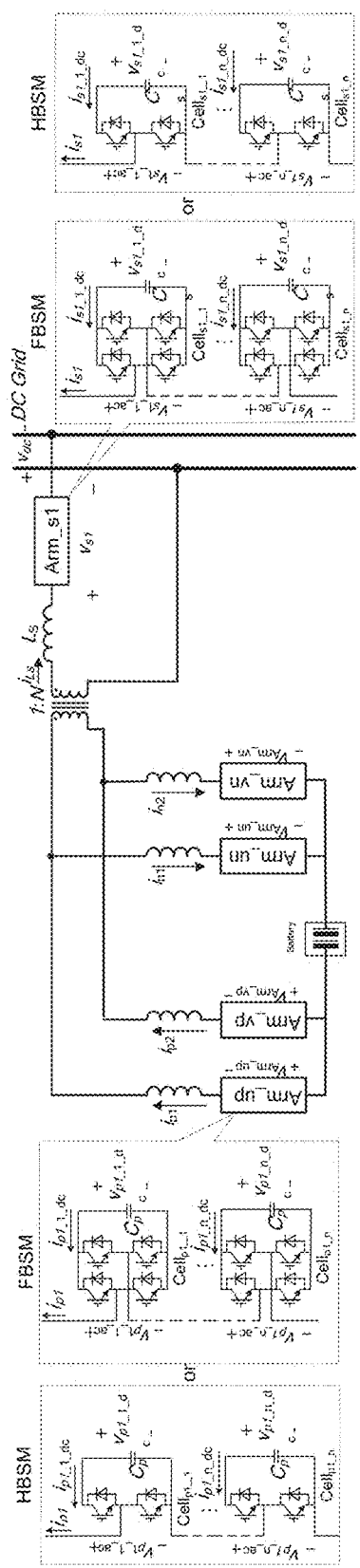
FIG. 49 is a schematic illustration of a $29^{th}$ topology for a BESS, in accordance with an embodiment of the present invention.
Figure 50:
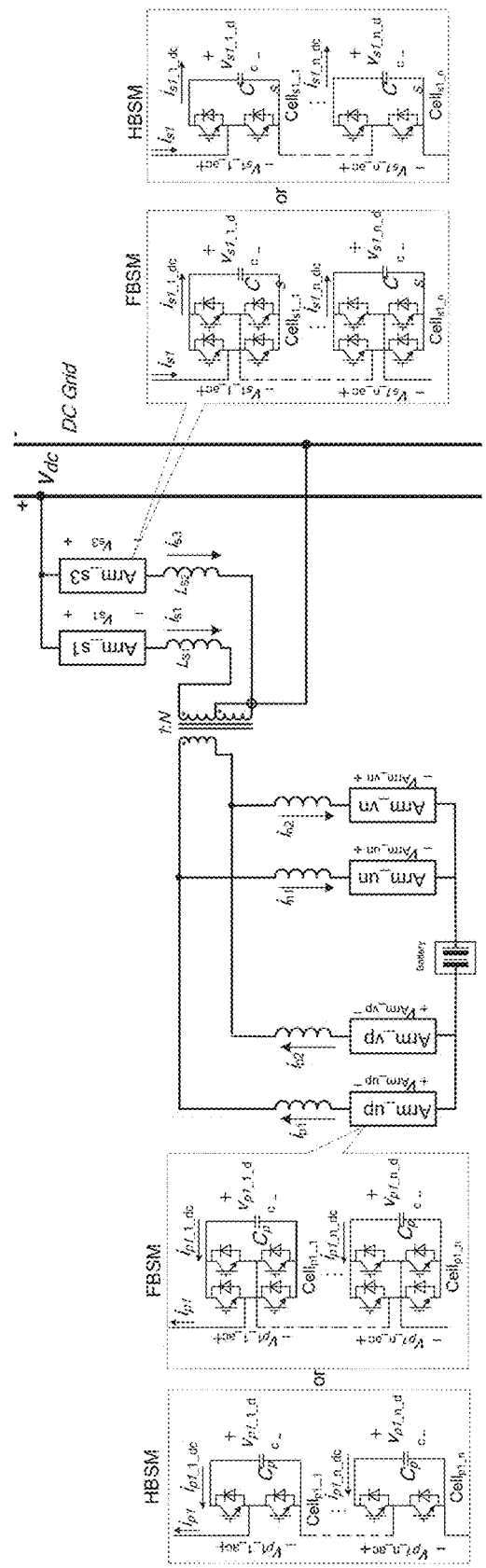
FIG. 50 is a schematic illustration of a $30^{th}$ topology for a BESS, in accordance with an embodiment of the present invention.
Figure 51:
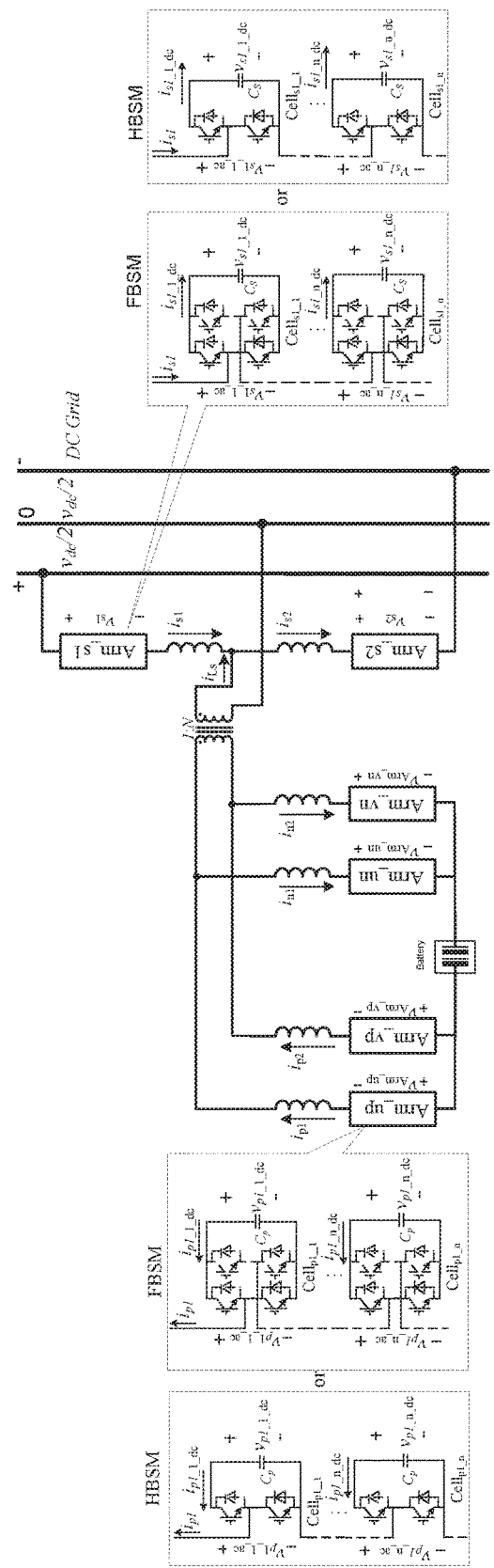
FIG. 51 is a schematic illustration of a 31$^{st}$ topology for a BESS, in accordance with an embodiment of the present invention.
Figure 52:
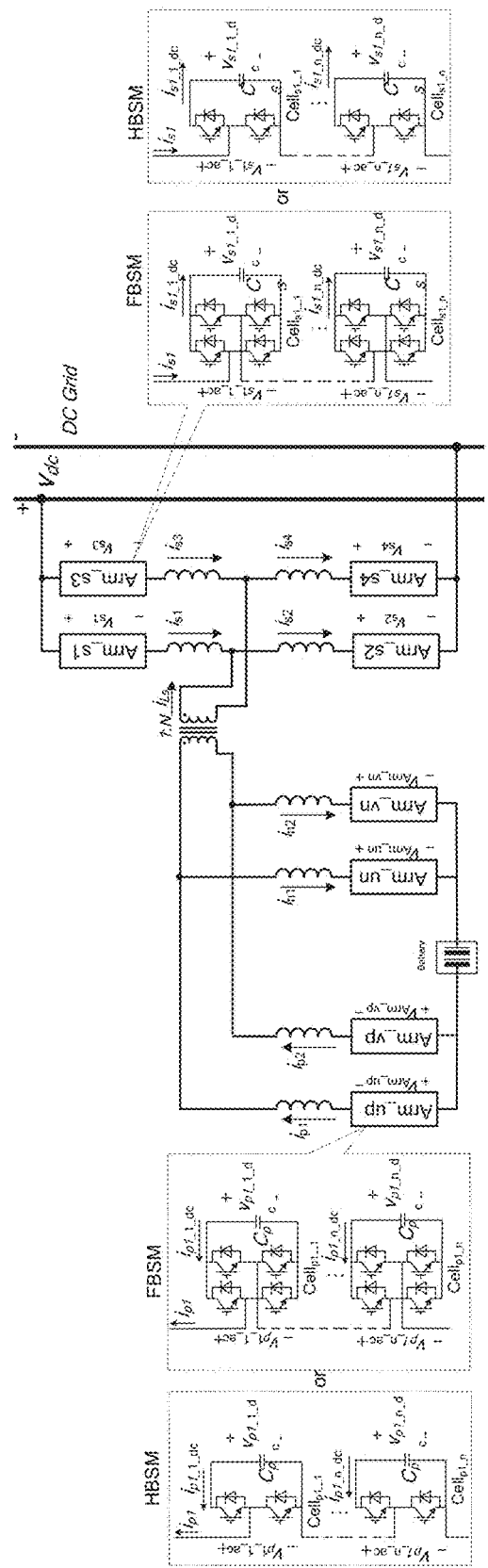
FIG. 52 is a schematic illustration of a 32$^{nd}$ topology for a BESS, in accordance with an embodiment of the present invention.
Figure 53:
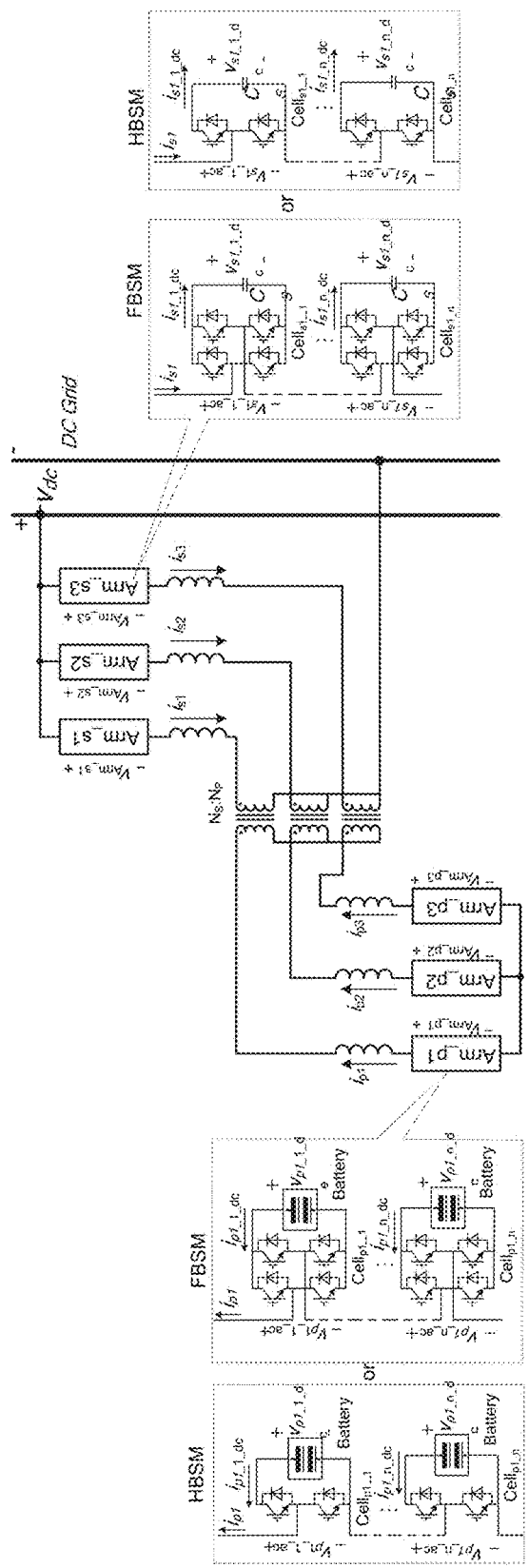
FIG. 53 is a schematic illustration of a 33$_{rd}$ topology for a BESS, in accordance with an embodiment of the present invention.
Figure 54:
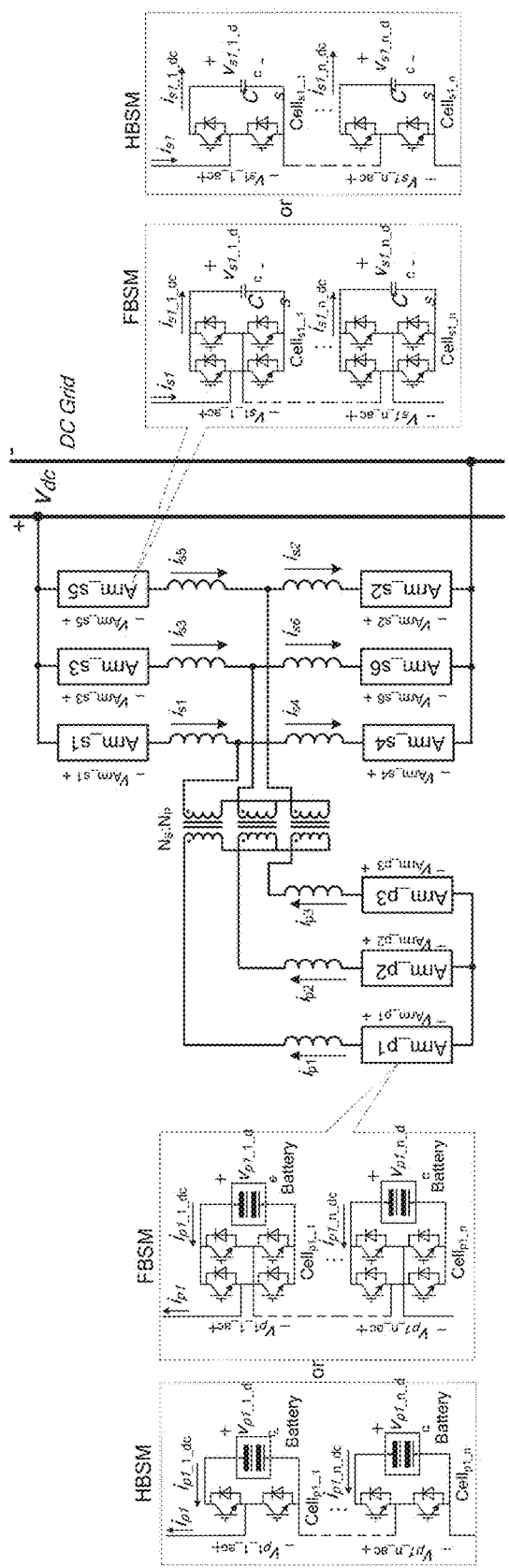
FIG. 54 is a schematic illustration of a 34$^{th}$ topology for a BESS, in accordance with an embodiment of the present invention.
Figure 55:
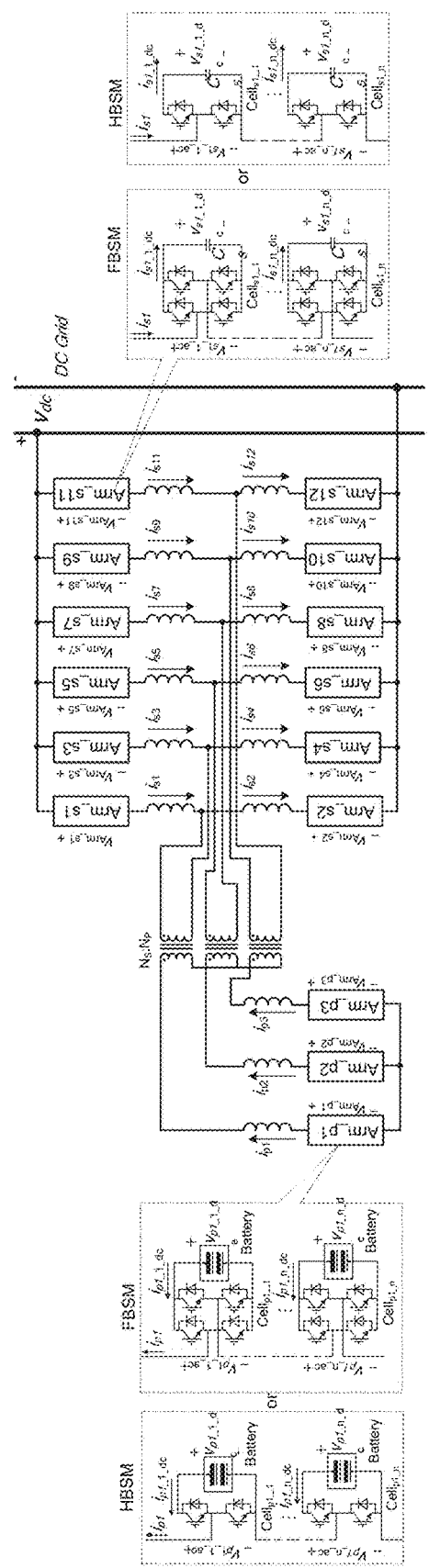
FIG. 55 is a schematic illustration of a 35$^{th}$ topology for a BESS, in accordance with an embodiment of the present invention.
Figure 56:
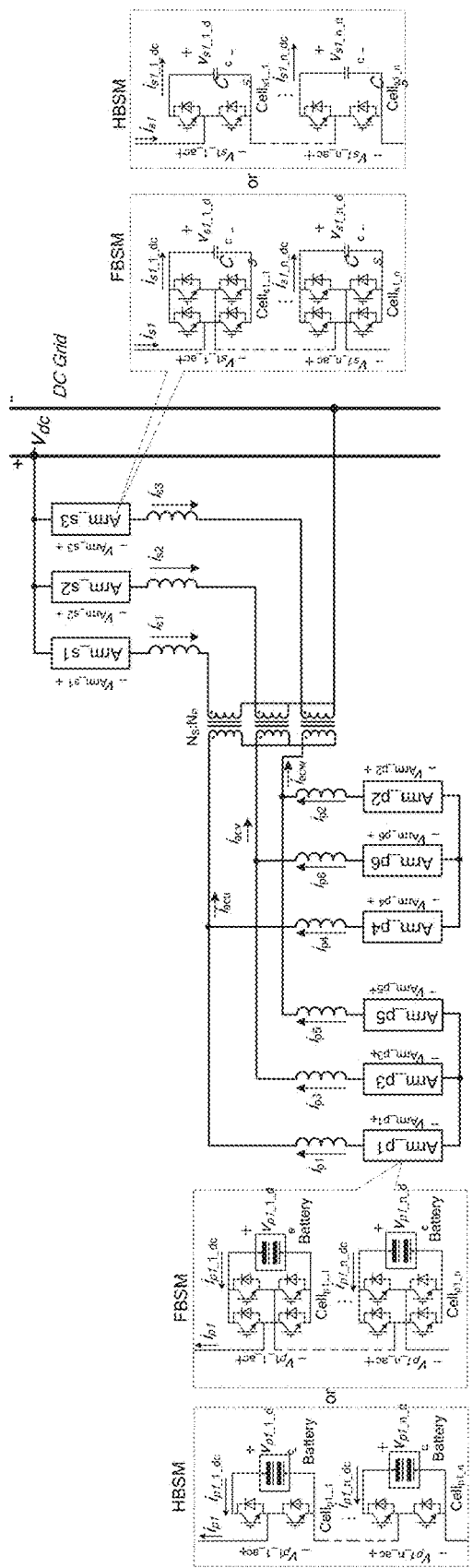
FIG. 56 is a schematic illustration of a 36$^{th}$ topology for a BESS, in accordance with an embodiment of the present invention.
Figure 57:
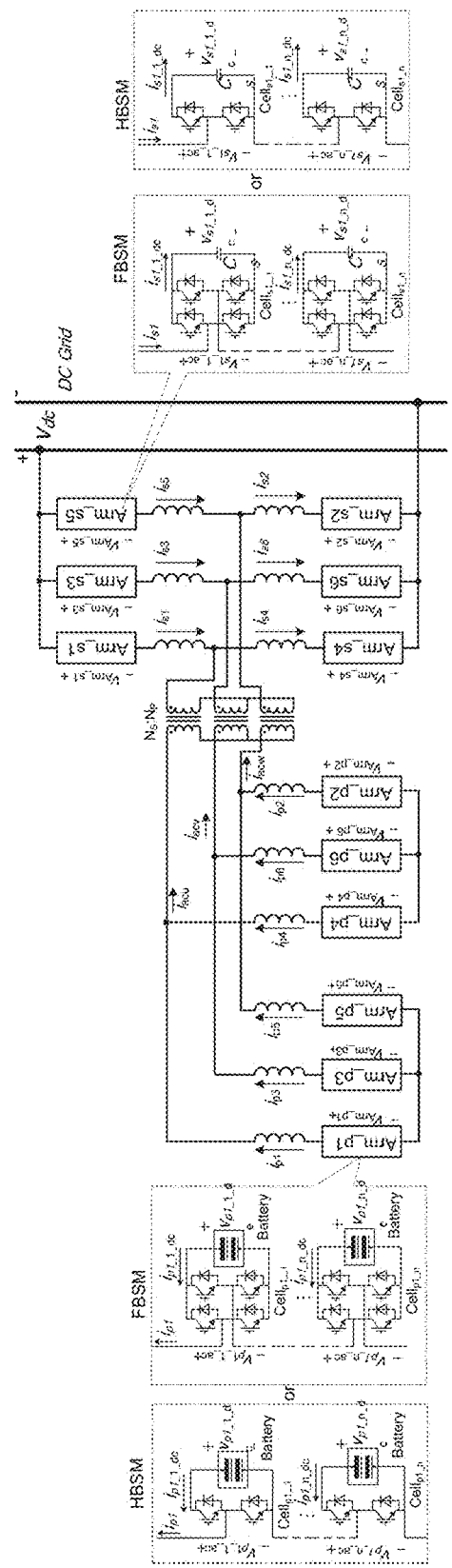
FIG. 57 is a schematic illustration of a 37$^{th}$ topology for a BESS, in accordance with an embodiment of the present invention.
Figure 58:
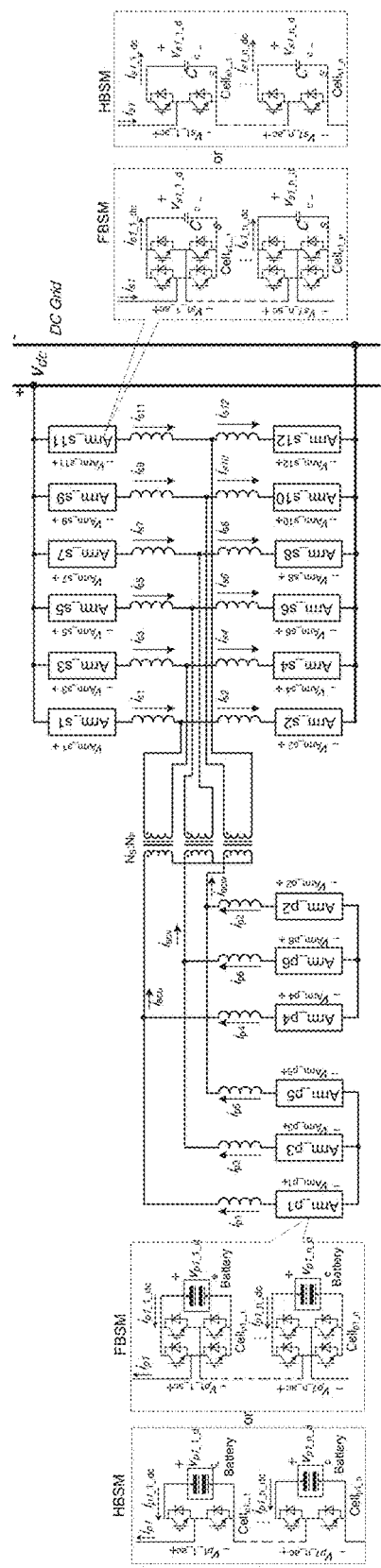
FIG. 58 is a schematic illustration of a 38$^{th}$ topology for a BESS, in accordance with an embodiment of the present invention.
Figure 59:
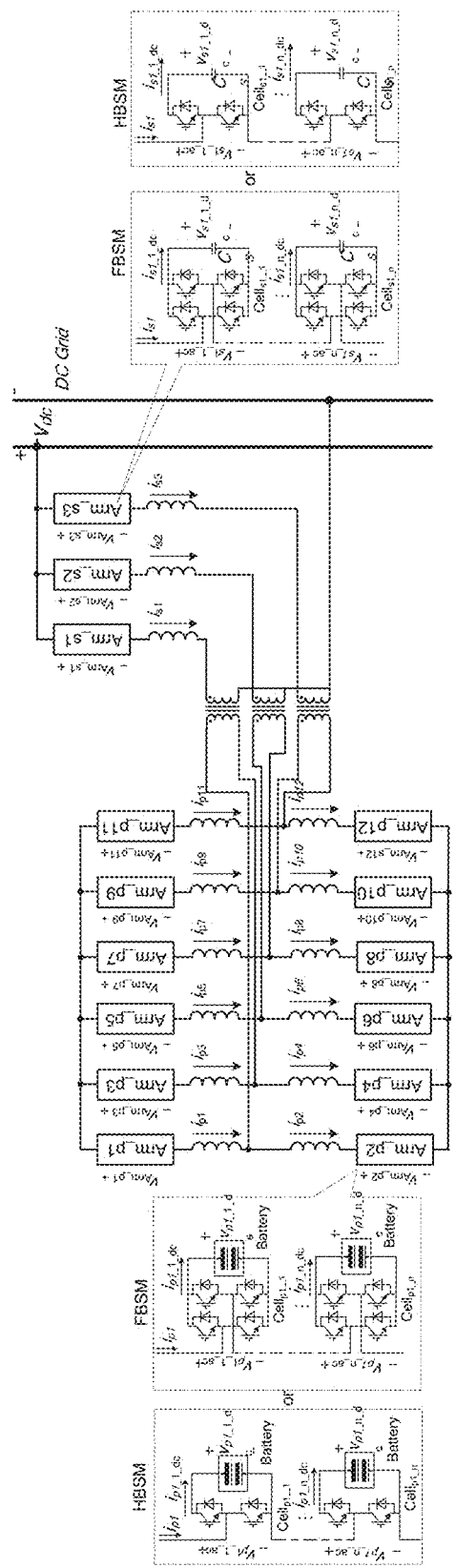
FIG. 59 is a schematic illustration of a 39$^{th}$ topology for a BESS, in accordance with an embodiment of the present invention.
Figure 60:
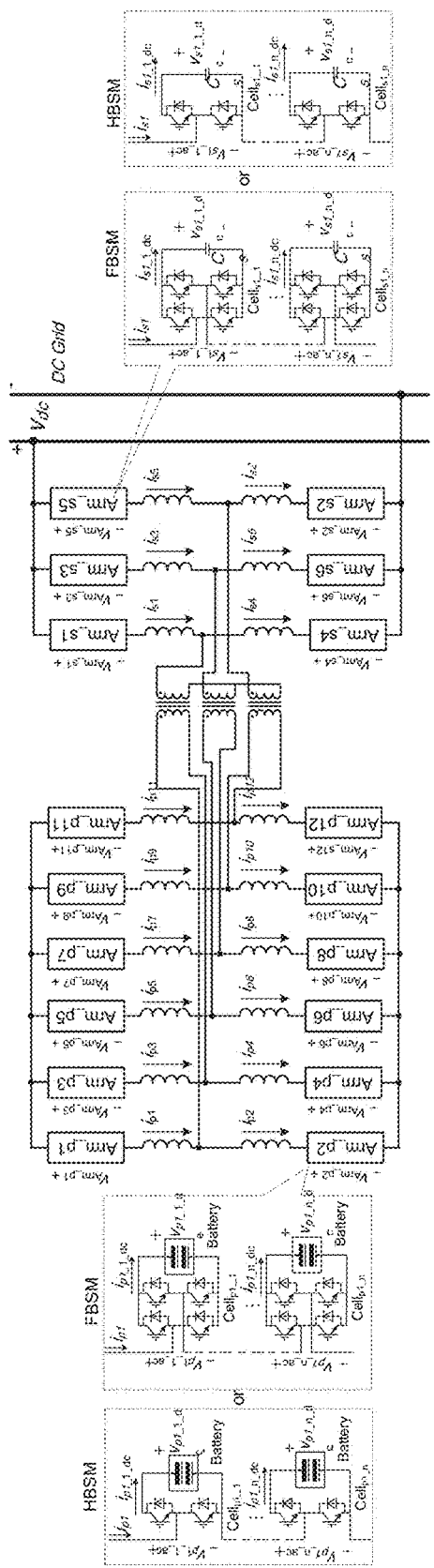
FIG. 60 is a schematic illustration of a 40$^{th}$ topology for a BESS, in accordance with an embodiment of the present invention.
Figure 61:
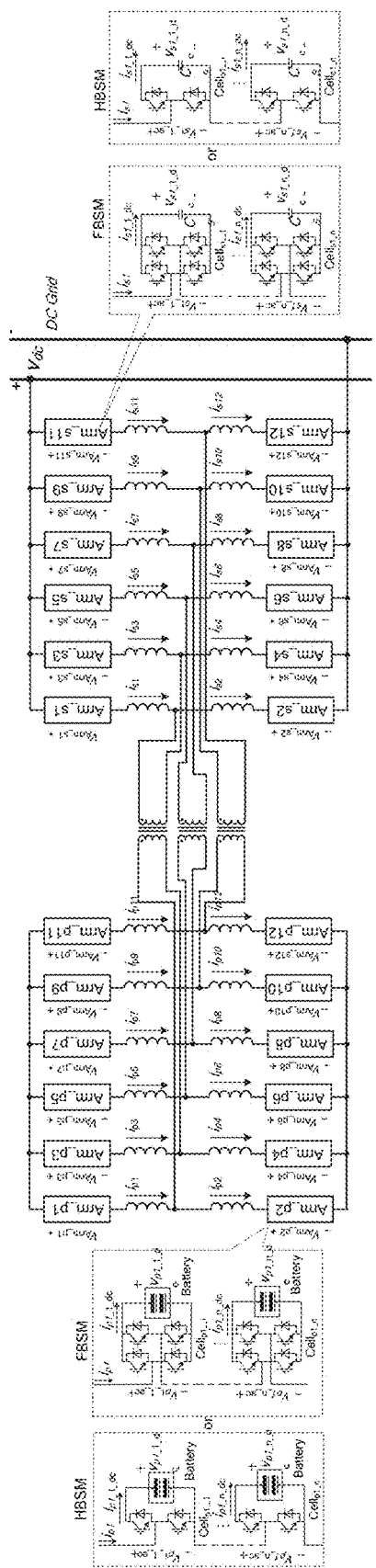
FIG. 61 is a schematic illustration of a 41$^{st}$ topology for a BESS, in accordance with an embodiment of the present invention.
Figure 62:
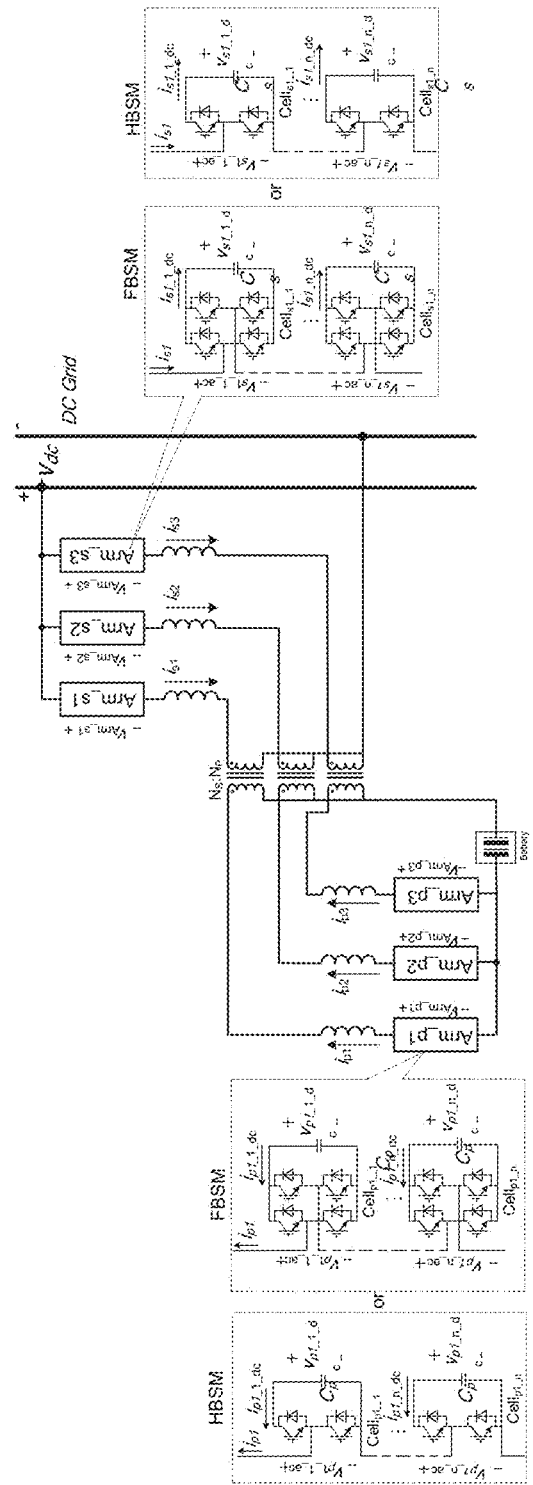
FIG. 62 is a schematic illustration of a 42$^{nd}$ topology for a BESS, in accordance with an embodiment of the present invention.
Figure 63:
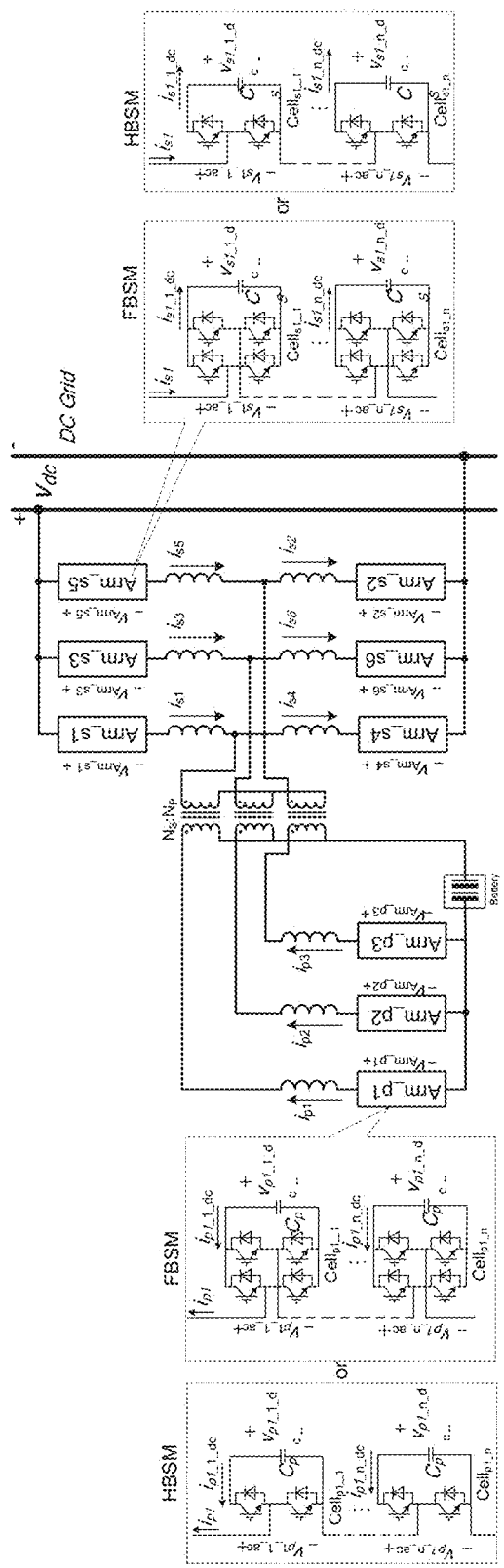
FIG. 63 is a schematic illustration of a 43$^{rd}$ topology for a BESS, in accordance with an embodiment of the present invention.
Figure 64:
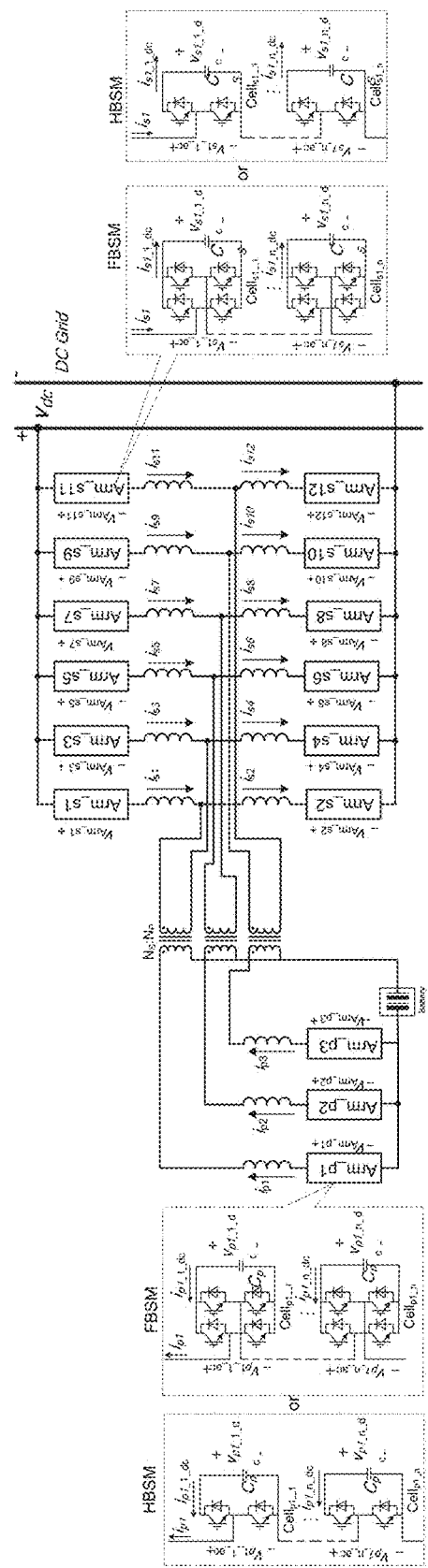
FIG. 64 is a schematic illustration of a 44$^{th}$ topology for a BESS, in accordance with an embodiment of the present invention.
Figure 65:
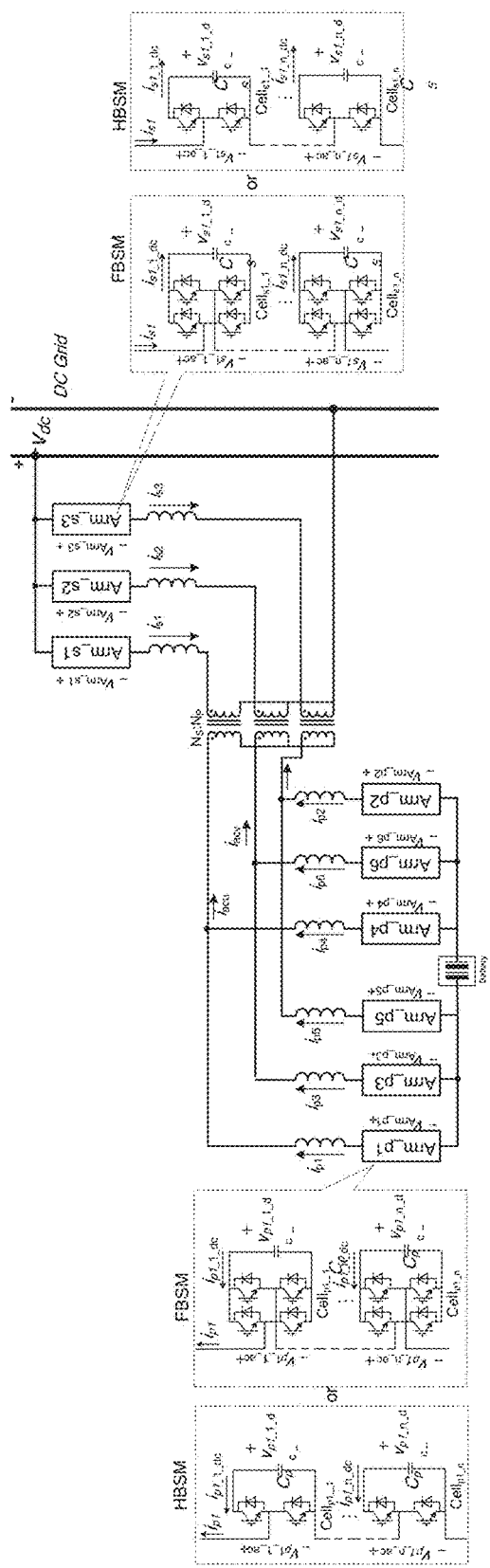
FIG. 65 is a schematic illustration of a 45$^{th}$ topology for a BESS, in accordance with an embodiment of the present invention.
Figure 66:
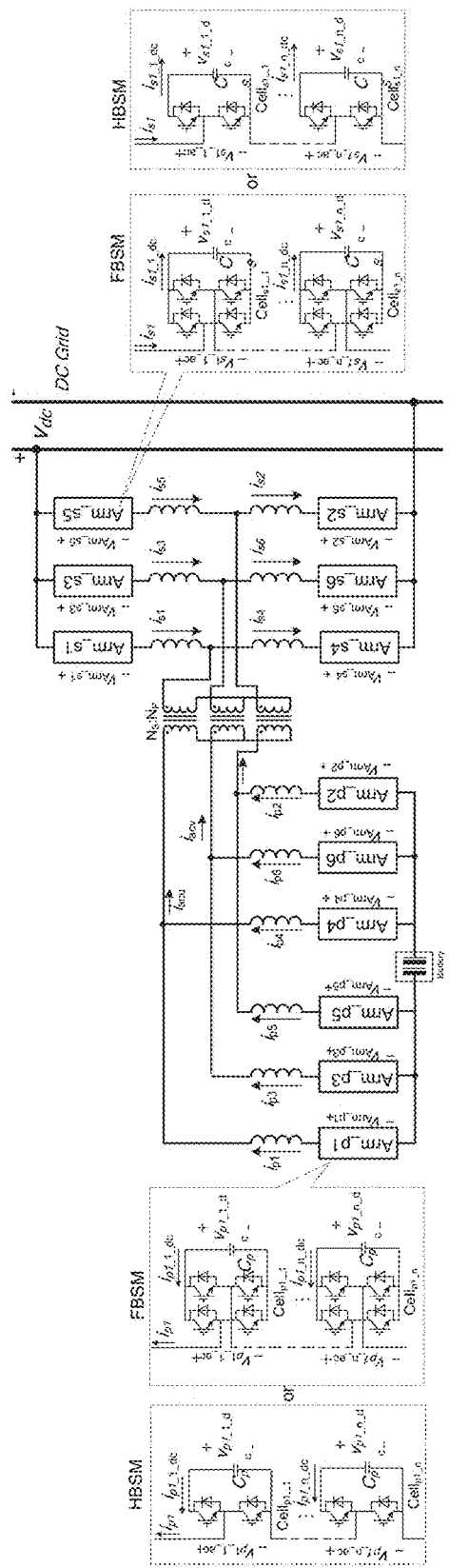
FIG. 66 is a schematic illustration of a 46$^{th}$ topology for a BESS, in accordance with an embodiment of the present invention.
Figure 67:
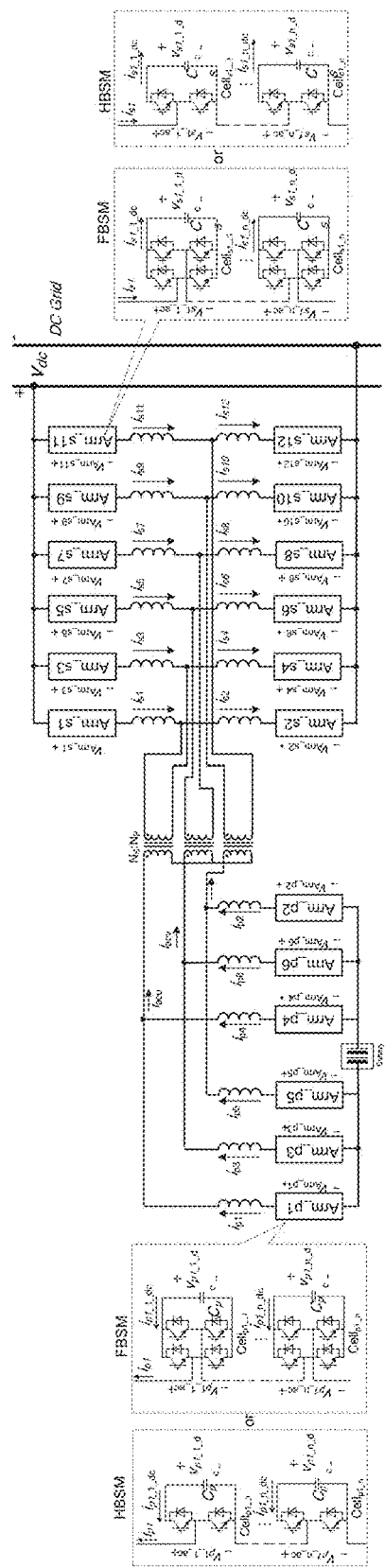
FIG. 67 is a schematic illustration of a 47$^{th}$ topology for a BESS, in accordance with an embodiment of the present invention.
Figure 68:
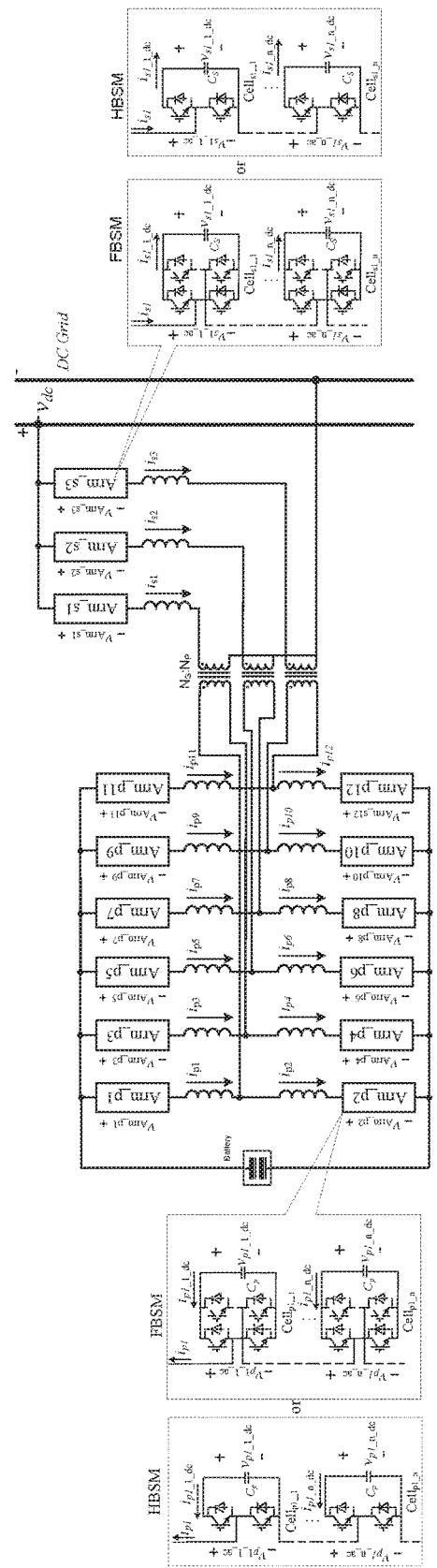
FIG. 68 is a schematic illustration of a 48$^{th}$ topology for a BESS, in accordance with an embodiment of the present invention.
Figure 69:
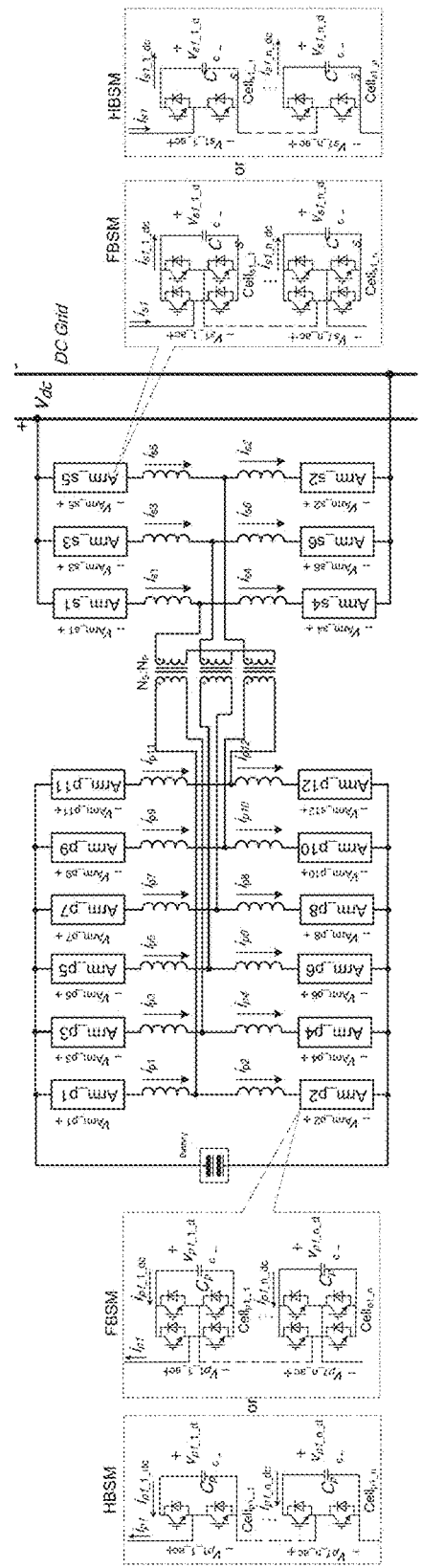
FIG. 69 is a schematic illustration of a 49$^{th}$ topology for a BESS, in accordance with an embodiment of the present invention.
Figure 70:
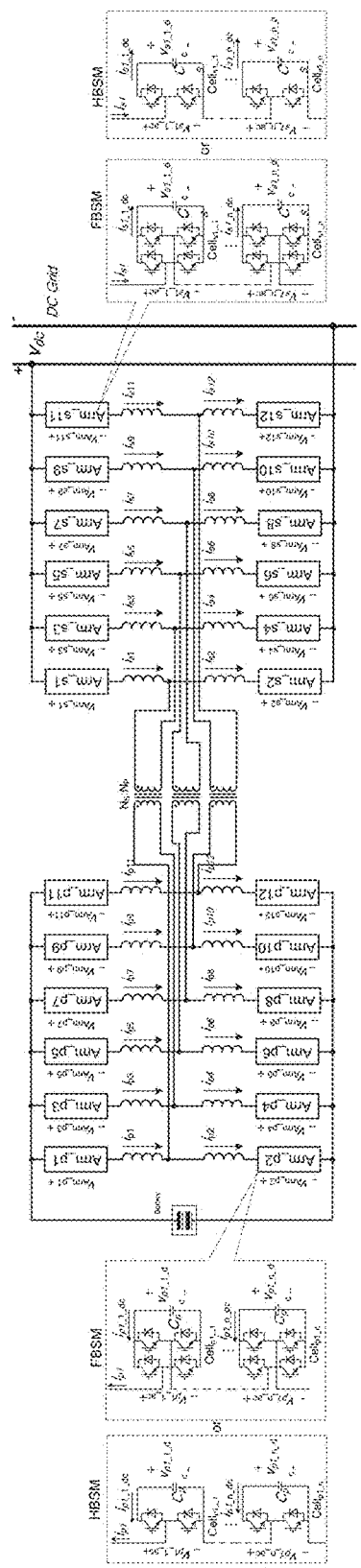
FIG. 70 is a schematic illustration of a 50$^{th}$ topology for a BESS, in accordance with an embodiment of the present invention.
Figure 71:
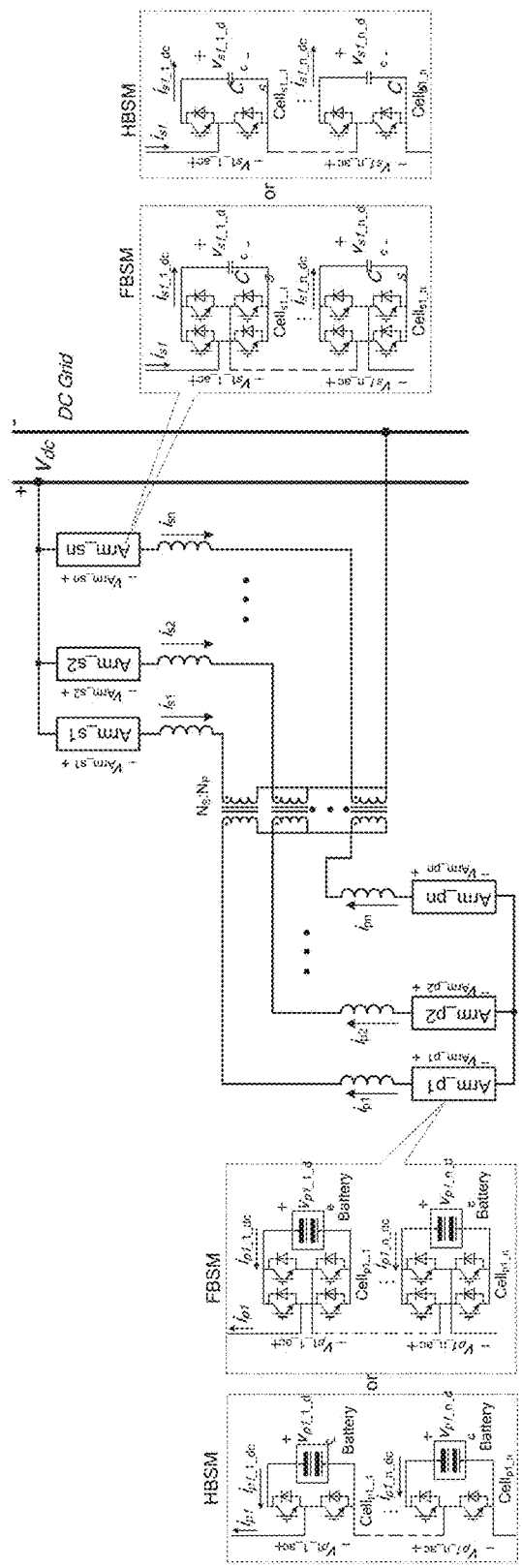
FIG. 71 is a schematic illustration of a 51$^{st}$ topology for a BESS, in accordance with an embodiment of the present invention.
Figure 72:
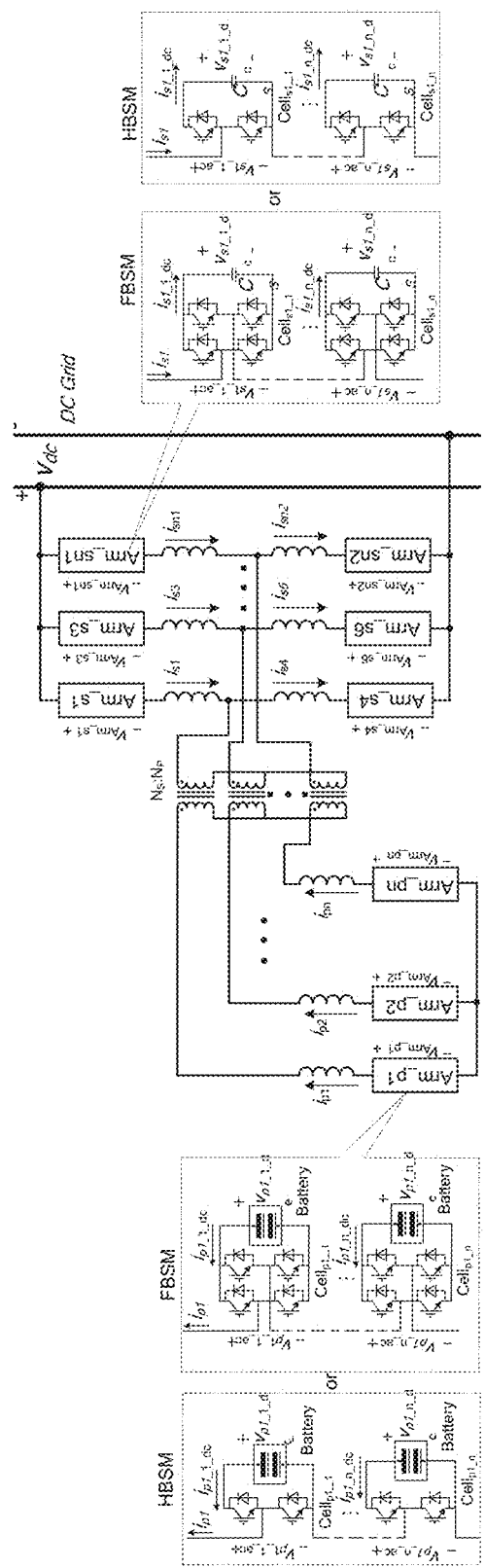
FIG. 72 is a schematic illustration of a 52$^{nd}$ topology for a BESS, in accordance with an embodiment of the present invention.
Figure 73:
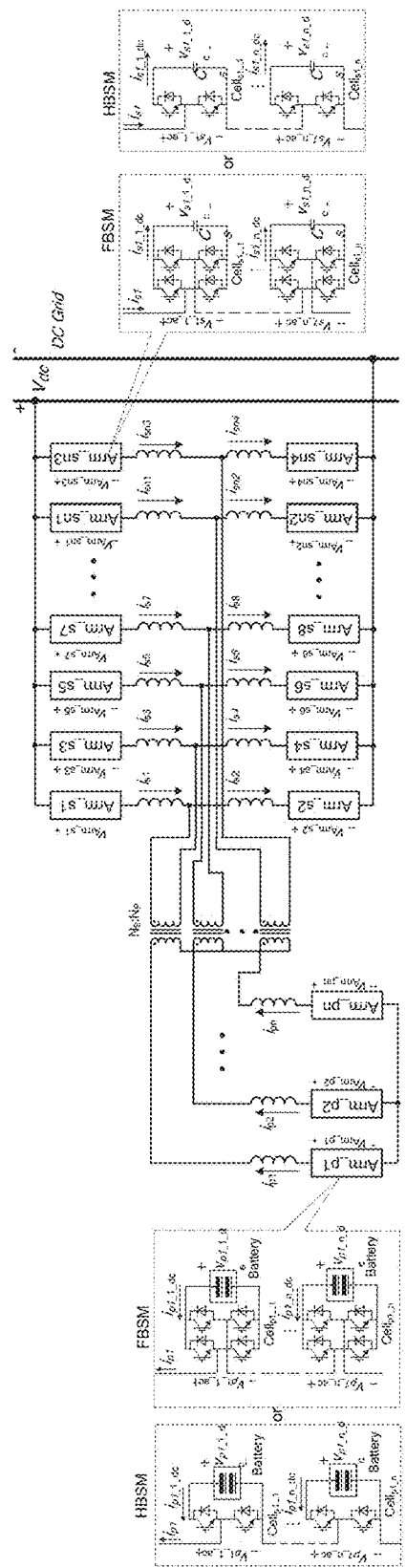
FIG. 73 is a schematic illustration of a 53$^{rd}$ topology for a BESS, in accordance with an embodiment of the present invention.
Figure 74:
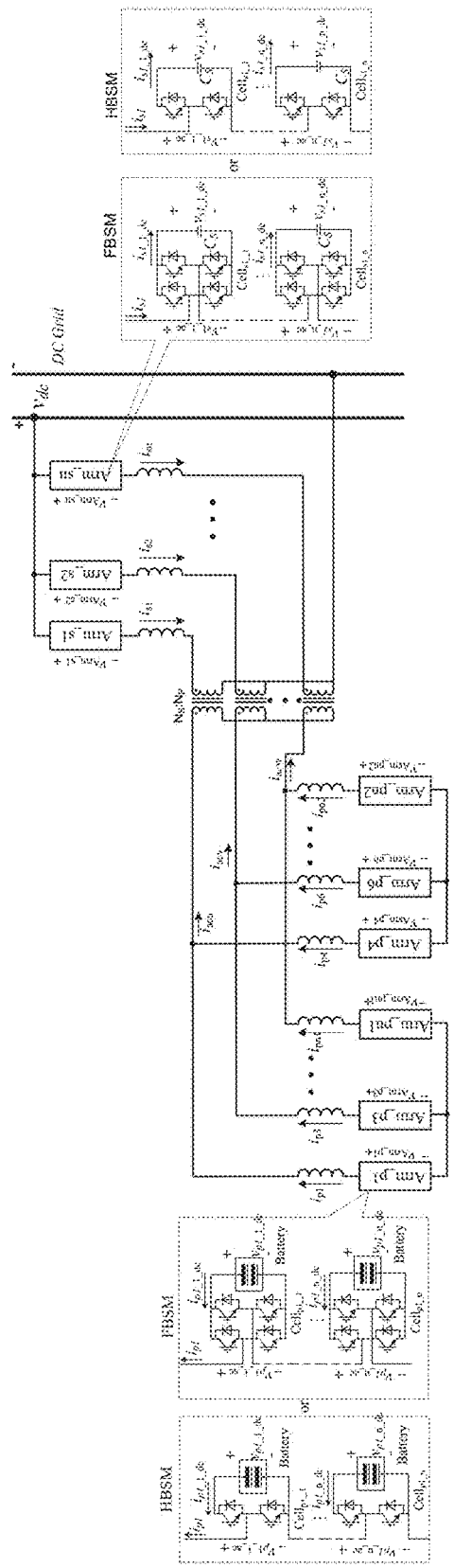
FIG. 74 is a schematic illustration of a 54$^{th}$ topology for a BESS, in accordance with an embodiment of the present invention.
Figure 75:
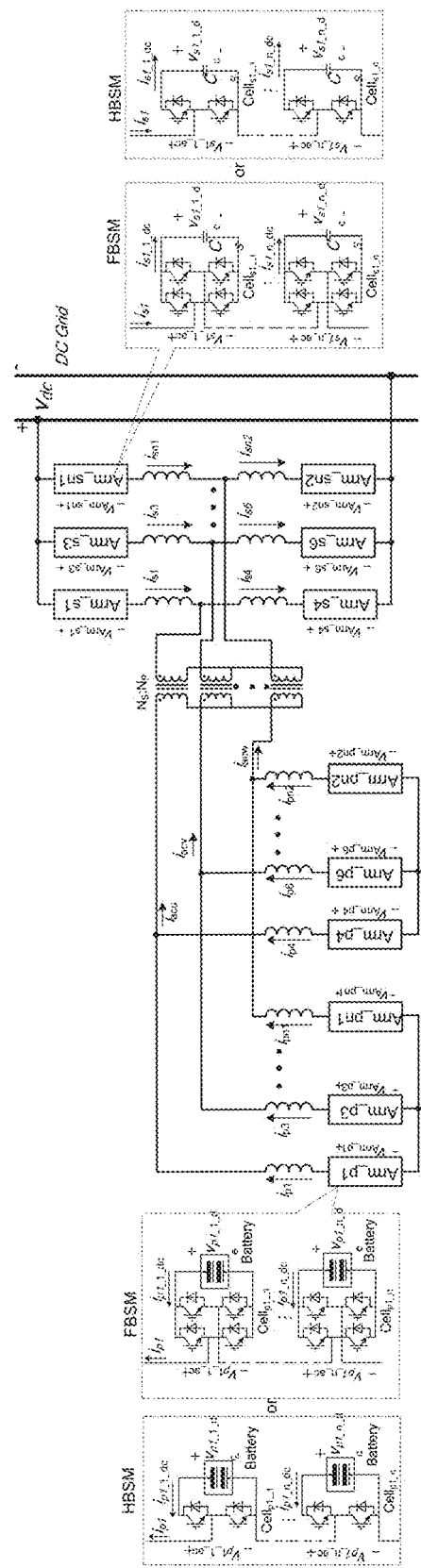
FIG. 75 is a schematic illustration of a 55$^{th}$ topology for a BESS, in accordance with an embodiment of the present invention.
Figure 76:
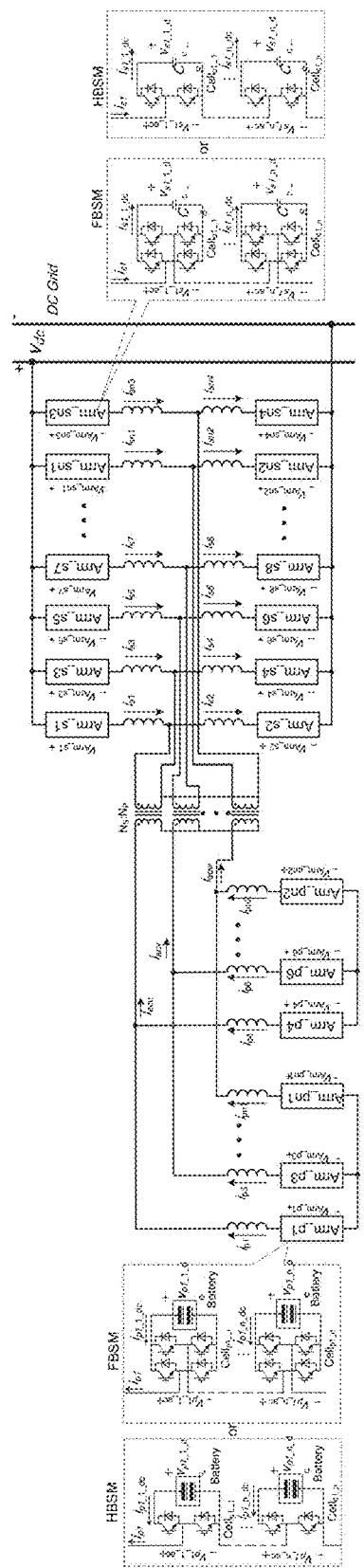
FIG. 76 is a schematic illustration of a 56$^{th}$ topology for a BESS, in accordance with an embodiment of the present invention.
Figure 77:
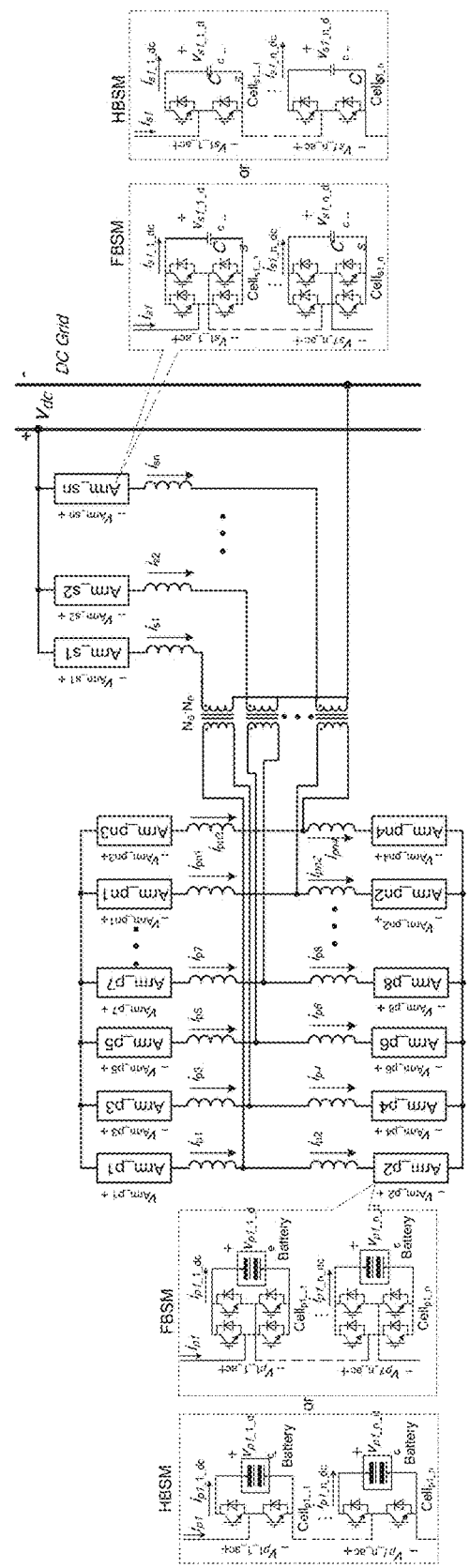
FIG. 77 is a schematic illustration of a 57$^{th}$ topology for a BESS, in accordance with an embodiment of the present invention.
Figure 78:
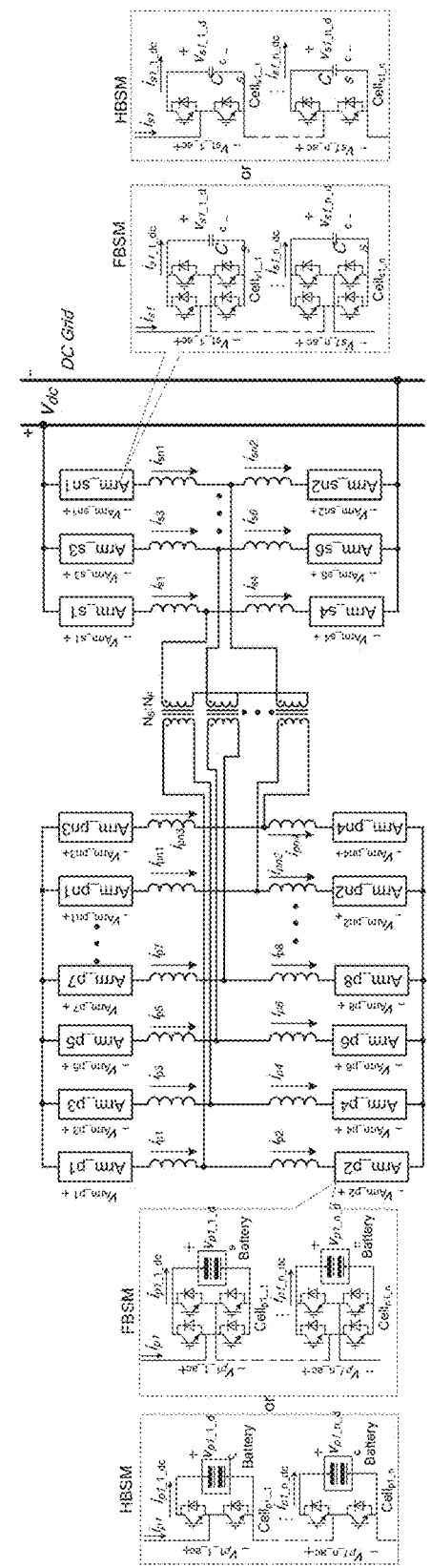
FIG. 78 is a schematic illustration of a 58$^{th}$ topology for a BESS, in accordance with an embodiment of the present invention.
Figure 79:
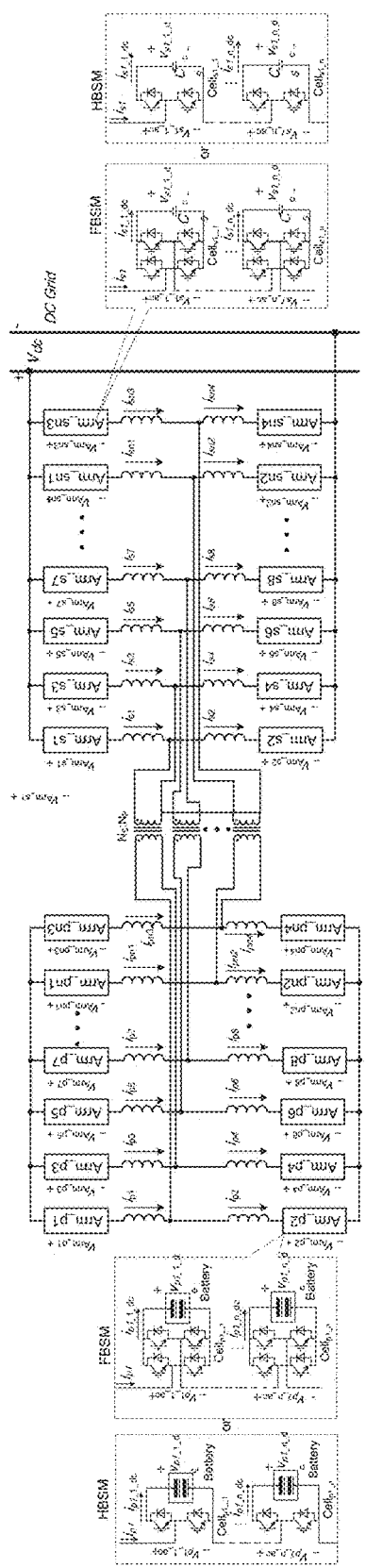
FIG. 79 is a schematic illustration of a 59$^{th}$ topology for a BESS, in accordance with an embodiment of the present invention.
Figure 80:
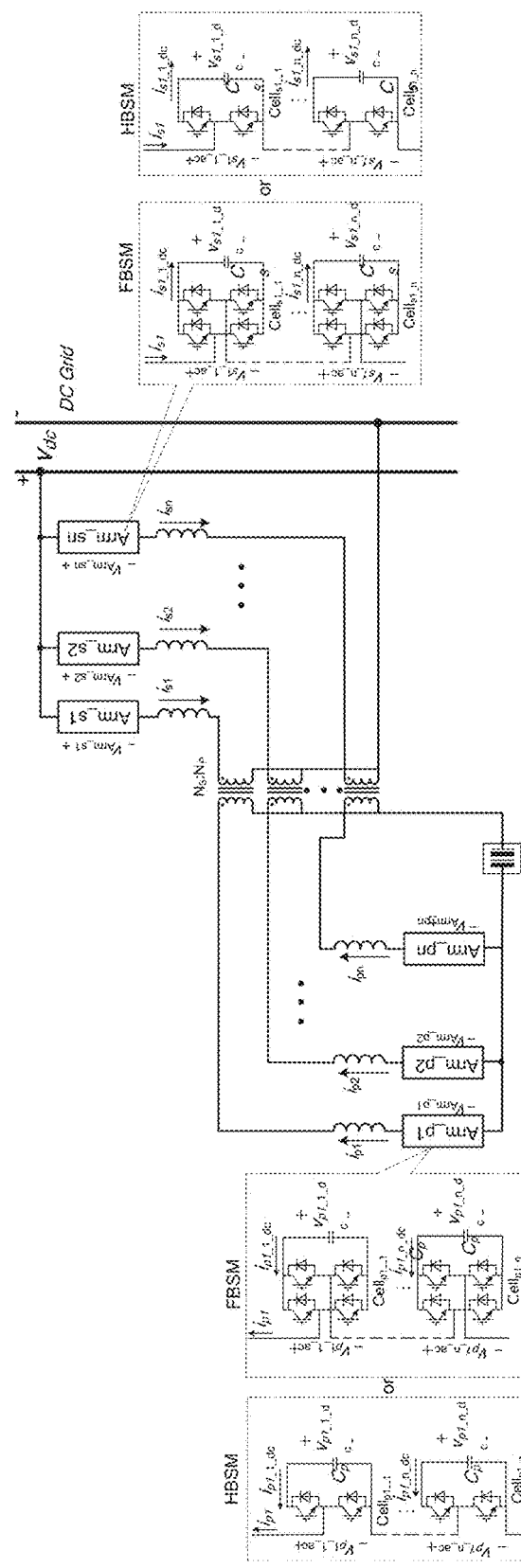
FIG. 80 is a schematic illustration of a 60$^{th}$ topology for a BESS, in accordance with an embodiment of the present invention.
Figure 81:
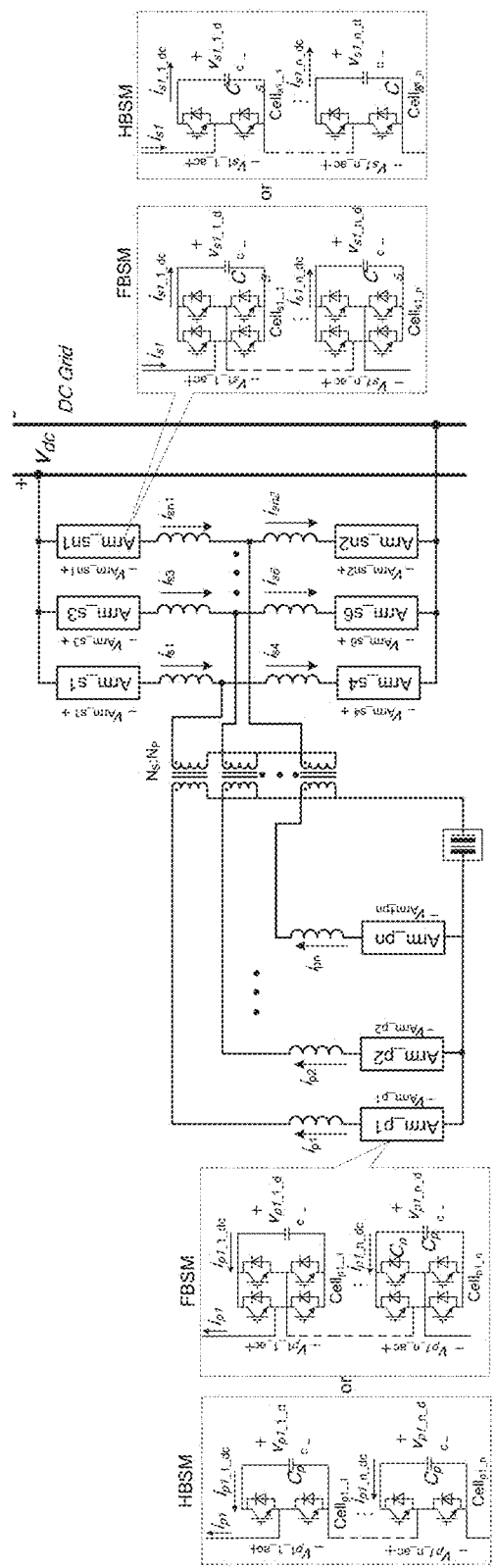
FIG. 81 is a schematic illustration of a 61$^{st}$ topology for a BESS, in accordance with an embodiment of the present invention.
Figure 82:
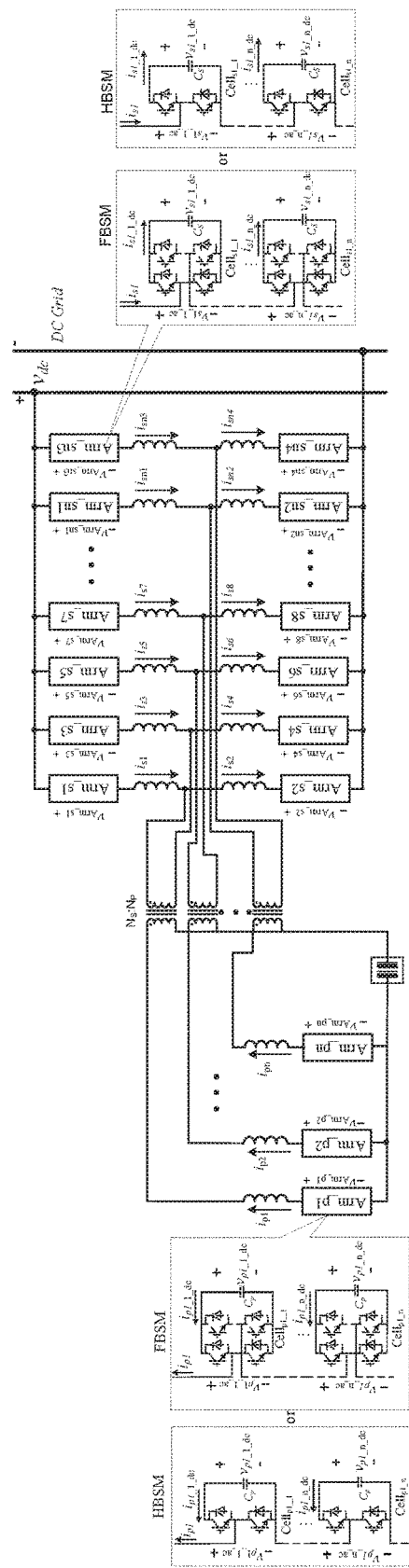
FIG. 82 is a schematic illustration of a 62$^{nd}$ topology for a BESS, in accordance with an embodiment of the present invention.
Figure 83:
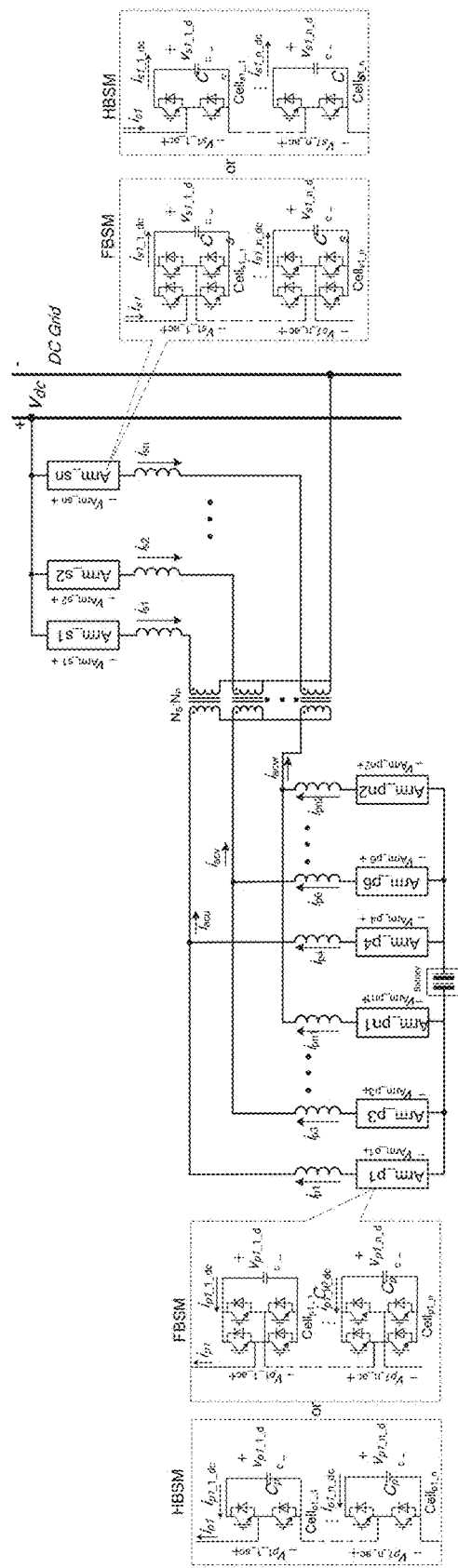
FIG. 83 is a schematic illustration of a 63$^{rd}$ topology for a BESS, in accordance with an embodiment of the present invention.
Figure 84:
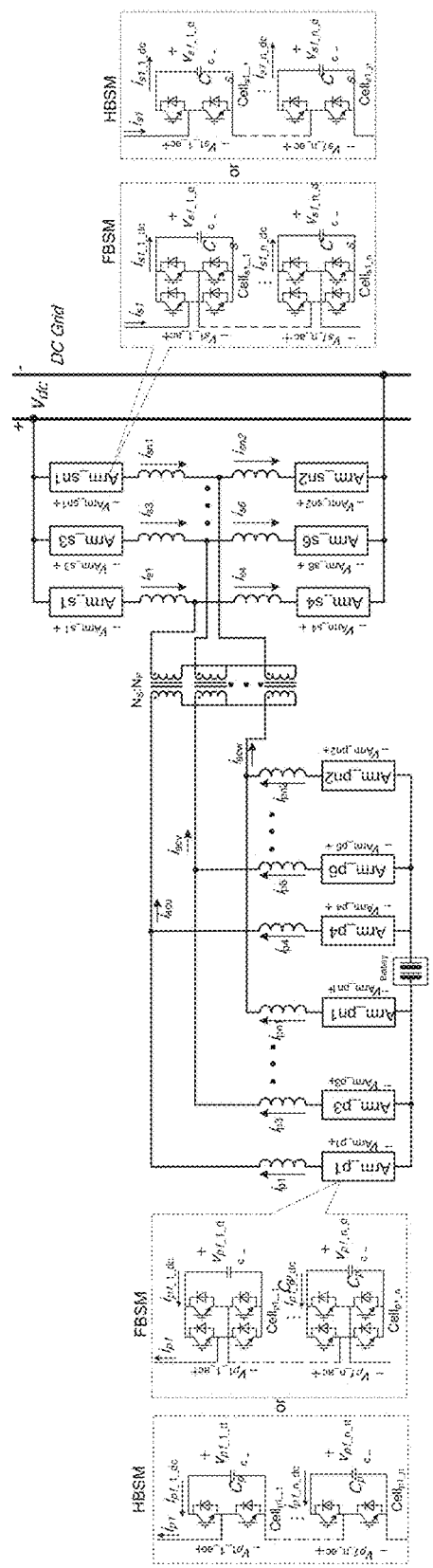
FIG. 84 is a schematic illustration of a 64$^{th}$ topology for a BESS, in accordance with an embodiment of the present invention.
Figure 85:
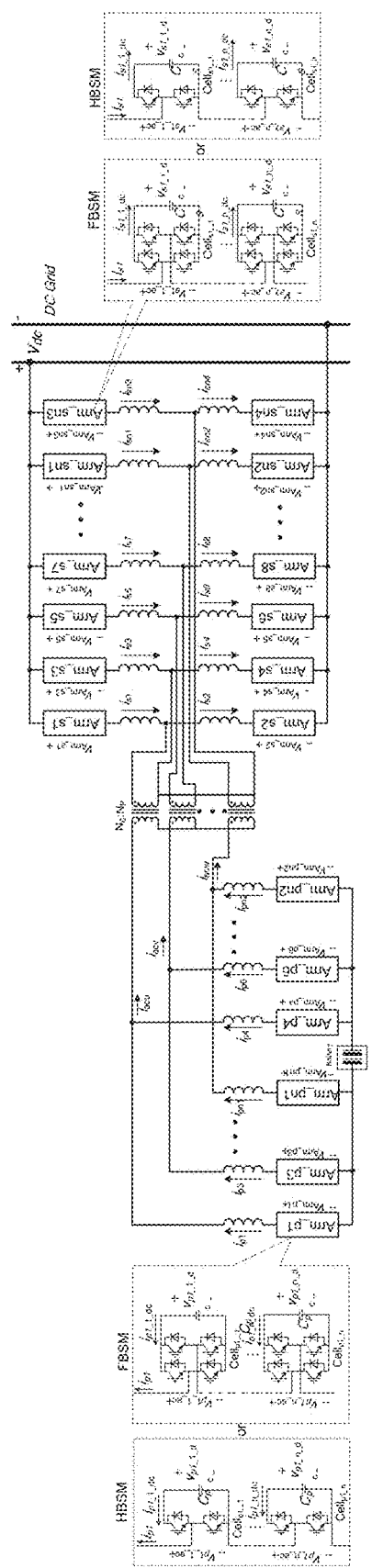
FIG. 85 is a schematic illustration of a 65$^{th}$ topology for a BESS, in accordance with an embodiment of the present invention.
Figure 86:
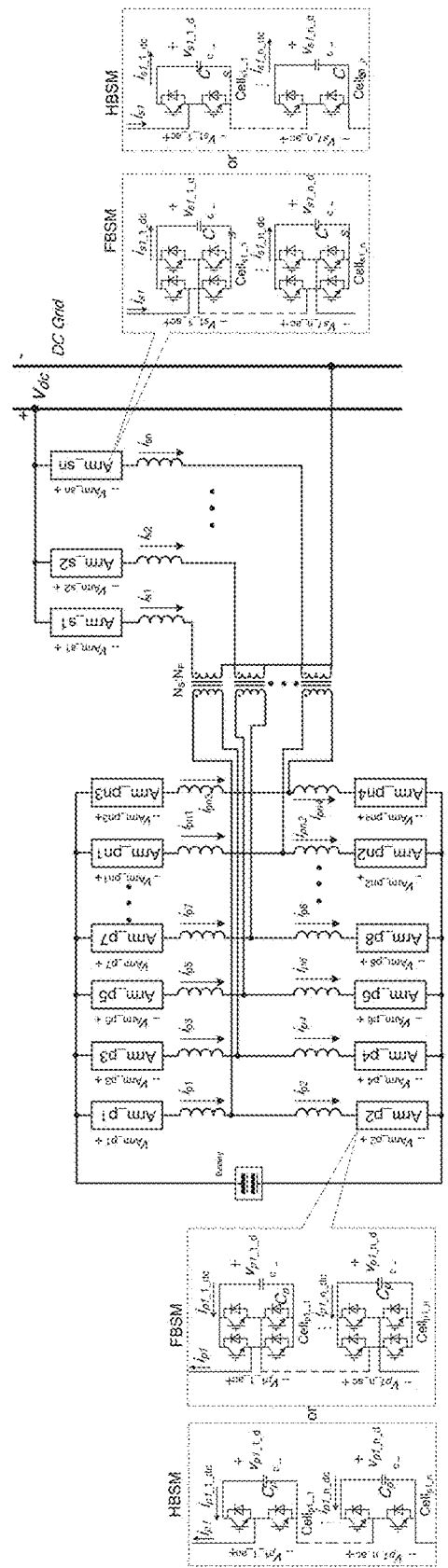
FIG. 86 is a schematic illustration of a 66$^{th}$ topology for a BESS, in accordance with an embodiment of the present invention.
Figure 87:
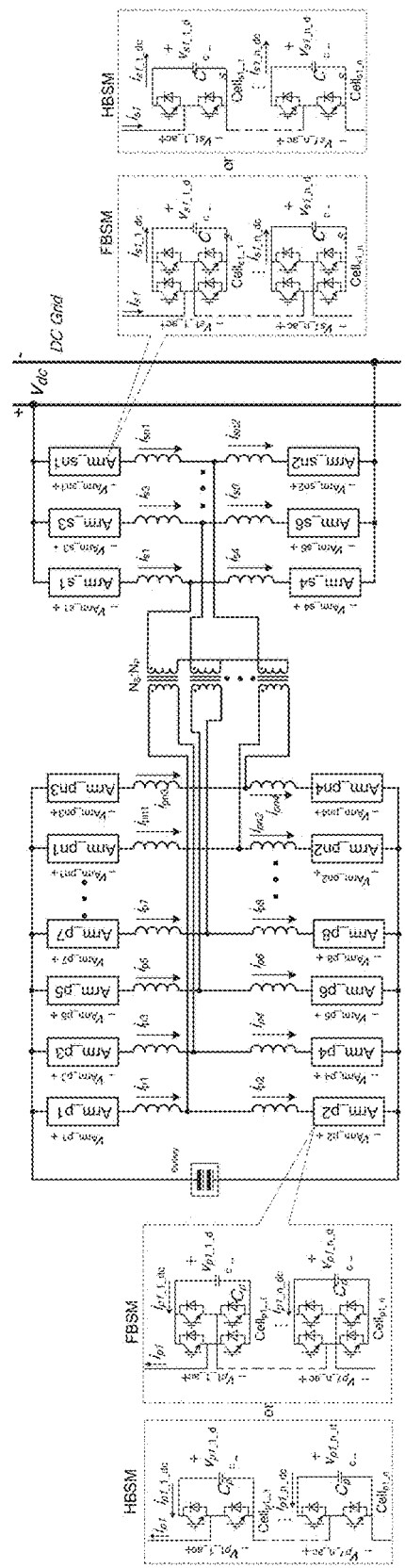
FIG. 87 is a schematic illustration of a 67$^{th}$ topology for a BESS, in accordance with an embodiment of the present invention.
Figure 88:
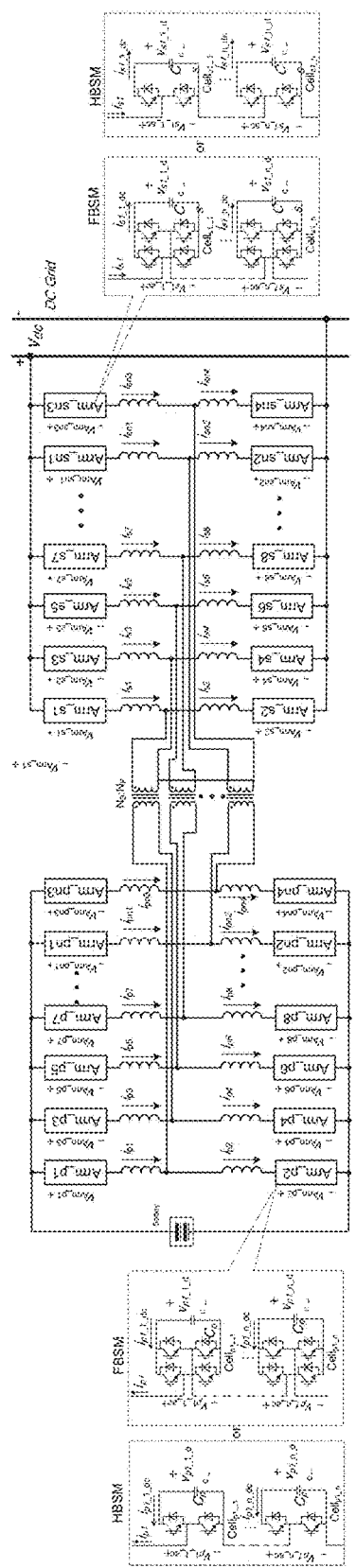
FIG. 88 is a schematic illustration of a 68$^{th}$ topology for a BESS, in accordance with an embodiment of the present invention.

Like the BESS topologies described in detail above, a family of BESS topologies can be proposed, which are shown from FIG. 25 to FIG. 88. Based upon the isolation transformer's phase number, these topologies can be separated to single phase BESS topologies (FIG. 25 to FIG. 42), three phase BESS topologies (FIG. 53 to FIG. 70) and multi-phase BESS topologies (FIG. 71 to FIG. 88). Though these topologies are different from each other, their modulation and control methods are consistent with the topology first's to topology fourth's modulation and control methods, which are described in detail above. Not only energy storage function, but also active filter functions, low voltage fault ride through functions and current limiting functions can be realized in these proposed BESS topologies. As with the analysis above, both full bridge sub-module (FBSM) and half bridge sub-module (HBSM) can serve as Arm_s1's sub-module topology. Under DC grid low voltage fault condition, in order to realize low voltage fault ride through function, at least part of Arm_si's sub-module should be full bridge sub-module (FBSM). Of course, if low voltage fault ride through function is not the indispensable function, Arm_si can certainly be composed of HBSMs only. Hybrid energy storage systems integrating battery and ultra-capacitor can also be realized in these proposed topologies, especially in the topologies from FIG. 39 to FIG. 52, from FIG. 62 to FIG. 70, from FIG. 80 to FIG. 88.

Figure 89:
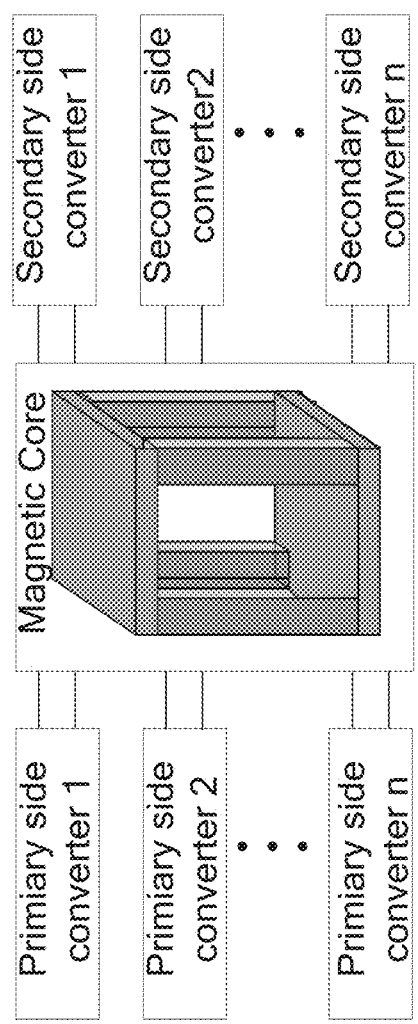
FIG. 89 is a diagram illustrating a BESS topology construction method, in accordance with an embodiment of the present invention.

Additionally, BESS topology construction method for three-phase to n-phase BESS converters are also within the scope of the present invention, which is shown in FIG. 89. In a multi-phase BESS converter, every primary side converter in FIG. 25-88 can server as a primary side converter and every secondary side converter in FIG. 25-88 can serve as a secondary side converter.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A battery energy storage system (BESS) for direct current (DC) grid applications, the BESS comprising:
    an alternating current (AC) transformer having a primary side and a secondary side;
    at least one primary side arm coupled to the primary side of the AC transformer, the at least one primary side arm comprising a plurality of cascade connected voltage source converter sub-modules and each of the plurality of cascade connected voltage source converter sub-modules comprising one or more direct current (DC) energy storage units, each of the plurality of cascade connected voltage source converter sub-modules for converting a direct current (DC) voltage of the one or more DC energy storage units to an AC voltage and the at least one primary side arm for providing a sum of the AC voltages from each of the plurality of cascade connected voltage source converter sub-modules to the primary side of the AC transformer; and
    at least one secondary side arm coupled between the secondary side of the AC transformer and a DC grid voltage bus, the at least one secondary side arm comprising a plurality of cascade connected voltage source converter sub-modules, wherein the at least one second side arm converts an AC voltage at the secondary side of the AC transformer to a DC voltage on the DC grid voltage bus.

2. The BESS of claim 1, wherein the AC transformer is a high frequency AC transformer.

3. The BESS of claim 1, wherein the AC transformer is selected from a single-phase AC transformer, a three-phase AC transformer and a multi-phase transformer.

4. The BESS of claim 1, further comprising a primary side filter inductor connected to the primary side of the AC transformer.

5. The BESS of claim 1, further comprising a secondary side filter inductor connected to the secondary side of the AC transformer.

6. The BESS of claim 1, wherein each of the plurality of cascade connected voltage source converter sub-modules in the primary side arm are full-bridge sub-modules (FBSM).

7. The BESS of claim 1, wherein each voltage converter sub-module in the primary side arm comprises an AC side and a DC side and wherein the one or more energy storage units are connected to the DC side of each of the plurality of voltage source converter sub-modules of the primary side arm.

8. The BESS of claim 1, further comprising one or more energy storage units connected between the primary side arm and the primary side of the AC transformer.

9. The BESS of claim 8, wherein each of the plurality of cascade connected voltage source converter sub-modules in the primary side arm are selected from a full-bridge sub-module (FBSM) and a half-bridge sub-module (HBSM).

10. The BESS of claim 1, wherein each of the one or more energy storage units are selected from energy storage battery units and ultra capacitors.

11. The BESS of claim 1, wherein each of the plurality of cascade connected voltage source converter sub-modules in the secondary side arm are selected from a full-bridge sub-module (FBSM) and a half-bridge sub-module (HBSM).

12. The BESS of claim 1, wherein an output waveform of the primary side of the AC transformer is selected from a sinusoidal waveform, a square waveform, a rectangular waveform and a quasi-square waveform.

13. The BESS of claim 1, wherein an output waveform of the secondary side of the AC transformer is selected from a sinusoidal waveform, a square waveform, a rectangular waveform and a quasi-square waveform.

14. The BESS of claim 1, wherein the at least one secondary side arm comprises a plurality of secondary side arms, each of the plurality of secondary side arms coupled between the secondary side of the AC transformer and the DC grid voltage bus, each of the plurality of secondary side arms comprising a plurality of cascade connected voltage source converter sub-modules.

15. A battery energy storage system (BESS) for direct current (DC) grid applications, the BESS comprising:
    an alternating current (AC) transformer having a primary side and a secondary side;
    at least one primary side arm coupled to the primary side of the AC transformer, the at least one primary side arm comprising a plurality of cascade connected voltage source converter sub-modules and each of the plurality of cascade connected voltage source converter sub-modules comprising one or more direct current (DC) energy storage units, each of the plurality of cascade connected voltage source converter sub-modules for converting a direct current (DC) voltage of the one or more DC energy storage units to an AC voltage and the at least one primary side arm for providing a sum of the AC voltages from each of the plurality of cascade connected voltage source converter sub-modules to the primary side of the AC transformer; and
    a primary side filter inductor connected to the primary side of the AC transformer;
    a secondary side filter inductor connected to the secondary side of the AC transformer; and
    at least one secondary side arm coupled between the secondary side of the AC transformer and a DC grid voltage bus, the at least one secondary side arm comprising a plurality of cascade connected voltage source converter sub-modules, wherein the at least one second side arm converts an AC voltage at the secondary side of the AC transformer to a DC voltage on the DC grid voltage bus.

16. The BESS of claim 15, wherein the AC transformer is selected from a single-phase AC transformer, a three-phase AC transformer and a multi-phase transformer.

17. A method for battery energy storage in a direct current (DC) grid application, the method comprising:
    coupling at least one primary side arm to a primary side of an AC transformer, the at least one primary side arm comprising a plurality of cascade connected voltage source converter sub-modules and each of the plurality of cascade connected voltage source converter sub-modules comprising one or more direct current (DC) energy storage units;
    converting, with each of the plurality of cascade connected voltage source converter sub-modules, a direct current (DC) voltage of the one or more DC energy storage units connected to the voltage source converter sub-module, to an AC voltage;
    summing the AC voltages from each of the plurality of cascade connected voltage source converter sub-modules and providing the summed AC voltage to a primary side of the AC transformer;
    coupling at least one secondary side arm between the secondary side of the AC transformer and a DC grid voltage bus, the at least one secondary side arm comprising a plurality of cascade connected voltage source converter sub-modules;

converting, with the at least one secondary side arm, an AC voltage at the secondary side of the AC transformer to a DC voltage; and providing the DC voltage to the DC grid voltage bus from the at least one secondary side arm.

18. The method of claim 17, further comprising modulating the DC voltage using square wave modulation, rectangular wave modulation, quasi square wave modulation or sinusoidal wave modulation.

19. The method of claim 17, further comprising performing active filter functions and current limiting functions of the DC voltage.

20. The method of claim 17, further comprising performing low voltage fault ride through functions for the DC voltage.

* * * * *